(12) United States Patent
Akutagawa et al.

(10) Patent No.: US 9,389,339 B2
(45) Date of Patent: *Jul. 12, 2016

(54) METHOD FOR PRODUCING ANTIREFLECTION FILM, ANTIREFLECTION FILM, AND COATING COMPOSITION

(75) Inventors: Nobuyuki Akutagawa, Kanagawa (JP); Hiroyuki Yoneyama, Kanagawa (JP); Daiki Wakizaka, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 1037 days.

This patent is subject to a terminal disclaimer.

(21) Appl. No.: 13/451,214

(22) Filed: Apr. 19, 2012

(65) Prior Publication Data

US 2012/0270021 A1 Oct. 25, 2012

(30) Foreign Application Priority Data

Apr. 22, 2011 (JP) ................ P2011-096610

(51) Int. Cl.
| | | |
|---|---|---|
| *G02B 1/111* | (2015.01) | |
| *B05D 5/06* | (2006.01) | |
| *B05D 3/10* | (2006.01) | |
| *B05D 5/00* | (2006.01) | |
| *B32B 7/02* | (2006.01) | |
| *C08L 27/12* | (2006.01) | |
| *C08K 9/06* | (2006.01) | |
| *C08K 9/04* | (2006.01) | |

(52) U.S. Cl.
CPC ............. *G02B 1/111* (2013.01); *B05D 3/108* (2013.01); *B05D 5/00* (2013.01); *B05D 5/063* (2013.01); *B32B 7/02* (2013.01); *C08K 9/04* (2013.01); *C08K 9/06* (2013.01); *C08L 27/12* (2013.01); *Y10T 428/24975* (2015.01); *Y10T 428/3154* (2015.04)

(58) Field of Classification Search
CPC .......... C08K 9/04; C08K 9/06; C08L 127/12; C08L 27/12; B32B 7/02; B05D 3/108; B05D 5/00; B05D 5/063

See application file for complete search history.

(56) References Cited

U.S. PATENT DOCUMENTS

| | | | | |
|---|---|---|---|---|
| 2006/0182945 | A1* | 8/2006 | Yoneyama | ........ B32B 17/10018 428/304.4 |
| 2009/0202819 | A1* | 8/2009 | Asahi | ..................... G02B 1/111 428/336 |

FOREIGN PATENT DOCUMENTS

| | | |
|---|---|---|
| JP | 2004-163610 | 6/2004 |
| JP | 2005-292203 | 10/2005 |
| JP | 2006-206832 A | 8/2006 |
| JP | 2007-038199 A | 2/2007 |
| JP | 2007-238897 A | 9/2007 |
| JP | 2009-198748 A | 9/2009 |
| JP | 2010-152331 | 7/2010 |

OTHER PUBLICATIONS

Notice of Reasons for Rejection issued by JPO on Sep. 16, 2014 in connection with corresponding Japanese Patent Application No. 2012-096996.

\* cited by examiner

*Primary Examiner* — James M Mellott
(74) *Attorney, Agent, or Firm* — Jean C. Edwards, Esq.; Edwards Neils LLC

(57) ABSTRACT

The method for producing an antireflection film is provided. The method includes, a step of coating a coating composition including the following components (A) to (D) on a base material to form a coating film, a step of volatilizing the solvent from the coating film for drying the coating film, and a step of curing the coating film to form a cured layer, in which a multilayer structure having different refractive indices from the coating composition is formed: (A) a fluorine-containing polymer with a specific structure, having a polyalkylene oxide group in the molecule, (B) non-surface-modified inorganic fine particles, or inorganic fine particles that are surface-treated with a silane coupling agent having a molecular weight of 600 or less, (C) a curable binder having no fluorine atom in the molecule, and (D) a solvent, provided that the mass ratio of [component (A)+component (B)]/[component (C)] is from 1/199 to 60/40.

14 Claims, No Drawings

METHOD FOR PRODUCING ANTIREFLECTION FILM, ANTIREFLECTION FILM, AND COATING COMPOSITION

CROSS-REFERENCE TO RELATED APPLICATIONS

This application claims priority from Japanese Patent Application No. 2011-096610, filed Apr. 22, 2011, the contents of which are hereby incorporated by reference in their entirety.

BACKGROUND OF THE INVENTION

1. Field of the Invention

The present invention relates to a method for producing an antireflection film, an antireflection film, and a coating composition. More specifically, the present invention relates to a coating composition which is capable of forming a multilayer structure in a single coating step and has high production efficiency, a method for producing an antireflection film having a multilayer structure with two or more layers using the coating composition, and an antireflection film produced by the method.

2. Description of the Related Art

An antireflection film is arranged on the surface of a display and required to have a low reflectance in order to prevent decrease in the contrast due to reflection of external light or reflection of an image in image display devices such as a liquid crystal display apparatus (LCD), a cathode ray tube display apparatus (CRT), a plasma display panel (PDP), and an electroluminescence display (ELD). In addition, it is also required to have high physical strength (scratch resistance and the like), transparency, and the like.

Accordingly, in the antireflection film, a functional layer such as a hard coat layer or a high refractive index layer, and a low refractive index layer with an appropriate film thickness, having a lower refractive index than a base material, are generally formed on the base material in this order.

Although this antireflection film is usually produced by a coating method, lamination of a plurality of thin films having different refractive indices has a problem in productivity in that the process should include a film-forming step starting with at least plural coating steps; it is essential to provide equipment required for the plurality of film-forming steps; and a process time for operating the equipment is also required.

In addition, the antireflection film is required to have further improvement in terms of adhesion properties between the respective layers and the scratch resistance of the surface.

With regard to such productivity, there has been proposed a technology for forming two or more layers from one coating liquid (see, for example, JP2006-206832A, JP2007-038199A, JP2007-238897A, and JP2009-198748A).

SUMMARY OF THE INVENTION

However, such a technology is excellent in that an antireflection film can be produced in a small number of coating steps, but is poor in that there is no degree of freedom in choice of a coating solvent, it is difficult to control a drying step after coating, and it is also difficult to obtain an antireflection film having a high antireflection function, by precisely controlling a film thickness due to variation in conditions and irregularity in drying.

With the methods of JP2007-238897A and JP2009-198748A, in order to segregate inorganic fine particles in the upper part of a coating film, the inorganic fine particles are surface-treated with a fluorine-containing compound, but it is not easy to control the reaction conditions of the treatment because the treatment is carried out using the compound that forms covalent bonds with the surface of the inorganic fine particles. As a result, aggregation of the inorganic fine particles during the treatment and progress of unintended reactions of the unreacted compounds in the coating composition easily occur. Therefore further improvement is desired.

The present invention has been made in order to solve the above-described problems in the related art, and it has an object to provide a method for producing an antireflection film which is capable of improving the production efficiency by forming a multilayer structure with two or more layers in a single coating step, an antireflection film having excellent adhesion properties, reflectance, and scratch resistance that is obtained by the production method, and a coating composition that is used to form the multilayer structure.

The present inventors have made extensive studies in order to solve the above-described problems, and as a result, they have found that the problems are solved and thus the objects are accomplished by using the configuration as described later, thereby completing the present invention.

The present invention is a technology relating to a coating composition which improves the production efficiency by forming a multilayer structure with two or more layers in a single coating step, particularly a technology in which the surface energy of the surface-coated inorganic fine particles is lowered and the inorganic fine particles are controlled to be spontaneously distributed unevenly in the coating film by coating the surface of the inorganic fine particles with a fluorine-containing polymer having a polyalkylene oxide group, which has low surface energy and interacts with inorganic fine particles.

Particularly, the inorganic fine particles having lowered surface energy as described above can be distributed unevenly in the air-interface side in the coating film, and can form a multilayer structure having two or more layers in the coated film. Further, by using a curable binder that easily undergoes phase separation from the compound having low surface energy in the coating composition, it is possible to form a layer in which the inorganic fine particles are present in the upper layer and a layer in which the inorganic fine particles are not present in the lower layer. Herein, the upper layer means a layer located in the position far from the base material (in the air-interface side) in the coating film and the under layer located in the position closer to the base material in the coating film.

Furthermore, the interaction between the fluorine-containing polymer having a polyalkylene oxide group as a component (A) and the inorganic fine particles as a component (B) is hydrogen bonding between the polyalkylene oxide groups and hydroxyl groups that are generally present on the surface of the inorganic fine particles, and as a result, covalent bonds between the component (A) and the component (B) are not formed prior to the step of forming a cured layer by curing the coating composition in the present invention.

The objects of the present invention are accomplished by the configuration as follows.

[1] A method for producing an antireflection film, which includes, in this order, a step of preparing a coating composition formed by mixing the following components (A) to (D), a step of coating the coating composition on a base material to form a coating film, a step of volatilizing the solvent from the coating film for drying the coating film, and a step of curing the coating film to form a cured layer, in which a multilayer structure having different refractive indices from the coating composition is formed:

(A) a fluorine-containing polymer having a polyalkylene oxide group in the molecule, represented by the following general formula (1);
(B) non-surface-modified inorganic fine particles, or inorganic fine particles that are surface-treated with a silane coupling agent having a molecular weight of 600 or less;
(C) a curable binder having no fluorine atom in the molecule; and
(D) a solvent,
provided that the mass ratio of [component (A)+component (B)]/[component (C)] is from 1/199 to 60/40.

$$(MF1)a\text{-}(MF2)b\text{-}(MF3)c\text{-}(MA)d\text{-}(MB)e\text{-}(MC)f\text{-}(MD)g \qquad \text{General Formula (1)}$$

In the general formula (1), a to f each represent the molar fraction of each constituent unit, and g represents % by mass in the fluorine-containing polymer, representing values satisfying the relationships of $0 \leq a \leq 70$, $0 \leq b \leq 70$, $0 \leq c \leq 80$, $30 \leq a+b+c \leq 90$, $0 \leq d \leq 50$, $0 \leq e \leq 50$, $0.1 \leq f \leq 50$, and $0 \leq g \leq 15$, respectively.

(MF1) represents a constituent unit that is polymerized from a monomer represented by $CF_2=CF-Rf_1$. $Rf_1$ represents a perfluoroalkyl group having 1 to 5 carbon atoms.

(MF2) represents a constituent unit that is polymerized from a monomer represented by $CF_2=CF-ORf_{12}$. $Rf_{12}$ represents a fluorine-containing alkyl group having 1 to 30 carbon atoms.

(MF3) represents a constituent unit that is polymerized from a monomer represented by $CH_2=CR_o\text{-}L\text{-}Rf_{13}$. $R_o$ represents a hydrogen atom, a halogen atom, or a methyl group, L represents a divalent linking group, and $Rf_{13}$ represents a fluorine-containing alkyl group having 1 to 20 carbon atoms.

(MA) represents a constituent unit having at least one of a group having an unsaturated double bond and a ring-opening polymerization reactive group.

(MB) represents a non-crosslinkable constituent unit.

(MC) represents a constituent unit that is polymerized from a monomer having at least one polyalkylene oxide group of the following general formula (2).

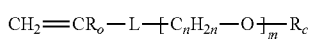

(2)

In the general formula (2), $R_o$ represents a hydrogen atom, a halogen atom, or a methyl group, L represents a divalent linking group, $R_c$ represents a hydrogen atom or an alkyl group having 1 to 10 carbon atoms, m represents an integer of 2 to 50, and n represents an integer of 1 to 5. Further, when m is 2 or more, a plurality of $-(C_nH_{2n}-O)-$ may be repeating units that are different from each other.

(MD) represents a constituent unit having at least one polysiloxane structure.

[2] The method for producing an antireflection film according to [1], wherein the component (B) is inorganic fine particles that are surface-treated with a silane coupling agent and the silane coupling agent has a molecular weight of 90 to 600.

[3] The method for producing an antireflection film according to [1] or [2], wherein the inorganic fine particles of the component (B) are metal oxide fine particles having a metal oxide with silicon as a constituent at least on the surface of particles.

[4] The method for producing an antireflection film according to [3], wherein the component (B) is inorganic fine particles surface-treated with a silane coupling agent and the surface modification rate α thereof is from 0.1% to 9%.

[5] The method for producing an antireflection film according to any one of [1] to [4], wherein L in the general formula (2) is a divalent linking group having 1 to 9 carbon atoms.

[6] The method for producing an antireflection film according to any one of [1] to [5], wherein the component (A) contains a polymerizable functional group in the molecule.

[7] The method for producing an antireflection film according to any one of [1] to [6], wherein the inorganic fine particles of the component (B) are metal oxide fine particles having an average particle diameter of 1 to 150 nm and a refractive index of 1.46 or less.

[8] The method for producing an antireflection film according to any one of [1] to [7], wherein the curable binder of the component (C) contains a compound having at least a plurality of unsaturated double bonds in the molecule.

[9] The method for producing an antireflection film according to any one of [1] to [8], wherein the coating composition further includes a curable compound having a fluorine atom in the molecule as a component (E).

[10] The method for producing an antireflection film according to [9], wherein the component (A) and the component (E) are both fluorine-containing copolymers and each of the copolymer has at least two kinds of common constituent units that form a copolymer.

[11] The method for producing an antireflection film according to any one of [1] to [10], wherein the free energy of mixing ($\Delta G = \Delta H - T \cdot \Delta S$) of the curable binder of the component (C) and the fluorine-containing polymer of the component (A) is more than zero.

[12] The method for producing an antireflection film according to any one of [9] to [11], wherein the mass ratio of [component (A)+component (B)+component (E)]/[component (C)] in the coating composition is from 1/199 to 60/40.

[13] The method for producing an antireflection film according to any one of [1] to [12], wherein the solvent of the component (D) contains a volatile solvent having a boiling point of higher than 100° C.

[14] An antireflection film obtained by the production method according to any one of [1] to [13].

[15] The antireflection film according to [14], wherein the film thickness of the cured layer formed from the coating composition is from 0.1 to 20 μm, the cured layer includes a low refractive index layer comprising the component (B) which is distributed unevenly in the air-interface side of the cured layer, and the film thickness of the low refractive index layer is from 40 to 300 nm.

[16] The antireflection film according to [14] or [15], wherein the film thickness of the cured layer formed from the coating composition is from 0.6 to 20 μm.

[17] The antireflection film according to [15] or [16], wherein the refractive index of the low refractive index layer in which the component (B) is distributed unevenly in the air-interface side is from 1.25 to 1.48.

[18] A coating composition formed by mixing the following components (A) to (D):
(A) a fluorine-containing polymer having a polyalkylene oxide group in the molecule, represented by the following general formula (1);
(B) non-surface-modified inorganic fine particles, or inorganic fine particles that are surface-treated with a silane coupling agent having a molecular weight of 600 or less;
(C) a curable binder having no fluorine atom in the molecule; and
(D) a solvent, provided that the mass ratio of [component (A)+component (B)]/[component (C)] is from 1/199 to 60/40.

$$(MF1)a\text{-}(MF2)b\text{-}(MF3)c\text{-}(MA)d\text{-}(MB)e\text{-}(MC)f\text{-}(MD)g \quad \text{General Formula (1)}$$

In the general formula (1), a to f each represent the molar fraction of each constituent unit, and g represents % by mass in the fluorine-containing polymer, representing values satisfying the relationships of $0 \le a \le 70$, $0 \le b \le 70$, $0 \le c \le 80$, $30 \le a+b+c \le 90$, $0 \le d \le 50$, $0 \le e \le 50$, $0.1 \le f \le 50$, and $0 \le g \le 15$, respectively.

(MF1) represents a constituent unit that is polymerized from a monomer represented by $CF_2=CF-Rf_1$. $Rf_1$ represents a perfluoroalkyl group having 1 to 5 carbon atoms.

(MF2) represents a constituent unit that is polymerized from a monomer represented by $CF_2=CF-ORf_{12}$. $Rf_{12}$ represents a fluorine-containing alkyl group having 1 to 30 carbon atoms.

(MF3) represents a constituent unit that is polymerized from a monomer represented by $CH_2=CRo\text{-}L\text{-}Rf_{13}$. $R_o$ represents a hydrogen atom, a halogen atom, or a methyl group, L represents a divalent linking group, and $Rf_{13}$ represents a fluorine-containing alkyl group having 1 to 20 carbon atoms.

(MA) represents a constituent unit having at least one of a group having an unsaturated double bond and a ring-opening polymerization reactive group.

(MB) represents a non-crosslinkable constituent unit.

(MC) represents a constituent unit that is polymerized from a monomer having at least one polyalkylene oxide group of the following general formula (2):

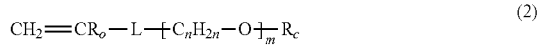

(2)

In the general formula (2), $R_o$ represents a hydrogen atom, a halogen atom, or a methyl group, L represents a divalent linking group, $R_c$ represents a hydrogen atom or an alkyl group having 1 to 10 carbon atoms, m represents an integer of 2 to 50, and n represents an integer of 1 to 5. Further, when m is 2 or more, a plurality of $-(C_nH_{2n}-O)-$ may be repeating units that are different from each other.

(MD) represents a constituent unit having at least one polysiloxane structure.

According to the present invention, a coating composition which is capable of forming a multilayer structure with two or more layers in a single coating step can be provided. A method for producing an antireflection film having excellent productivity (having a simplified production step) can further be provided by using the coating composition. In addition, an antireflection film having favorably low reflectance, high scratch resistance, and excellent adhesion properties can further be provided.

DESCRIPTION OF THE PREFERRED EMBODIMENTS

The present invention relates to a method for producing an antireflection film, which includes, in this order, a step of preparing a coating composition formed by mixing the following components (A) to (D), a step of coating the coating composition on a base material to form a coating film, a step of volatilizing the solvent from the coating film for drying the coating film, and a step of curing the coating film to form a cured layer, in which a multilayer structure having different refractive indices from the coating composition is formed:

(A) a fluorine-containing polymer having a polyalkylene oxide group in the molecule, represented by the following general formula (1);
(B) non-surface-modified inorganic fine particles or inorganic fine particles that are surface-treated with a silane coupling agent having a molecular weight of 600 or less;
(C) a curable binder having no fluorine atom in the molecule; and
(D) a solvent,
provided that the mass ratio of [component (A)+component (B)]/[component (C)] is from 1/199 to 60/40.

$$(MF1)a\text{-}(MF2)b\text{-}(MF3)c\text{-}(MA)d\text{-}(MB)e\text{-}(MC)f\text{-}(MD)g \quad \text{General Formula (1)}$$

In the general formula (1), a to f each represent the molar fraction of each constituent unit, and g represents % by mass in the fluorine-containing polymer, representing values satisfying the relationships of $0 \le a \le 70$, $0 \le b \le 70$, $0 \le c \le 80$, $30 \le a+b+c \le 90$, $0 \le d \le 50$, $0 \le e \le 50$, $0.1 \le f \le 50$, and $0 \le g \le 15$, respectively.

(MF1) represents a constituent unit that is polymerized from a monomer represented by $CF_2=CF-Rf_1$. $Rf_1$ represents a perfluoroalkyl group having 1 to 5 carbon atoms.

(MF2) represents a constituent unit that is polymerized from a monomer represented by $CF_2=CF-ORf_{12}$. $Rf_{12}$ represents a fluorine-containing alkyl group having 1 to 30 carbon atoms.

(MF3) represents a constituent unit that is polymerized from a monomer represented by $CH_2=CRo\text{-}L\text{-}Rf_{13}$. $R_o$ represents a hydrogen atom, a halogen atom, or a methyl group, L represents a divalent linking group, and $Rf_{13}$ represents a fluorine-containing alkyl group having 1 to 20 carbon atoms.

(MA) represents a constituent unit having at least one of a group having an unsaturated double bond and a ring-opening polymerization reactive group.

(MB) represents a non-crosslinkable constituent unit.

(MC) represents a constituent unit that is polymerized from a monomer having at least one polyalkylene oxide group of the following general formula (2).

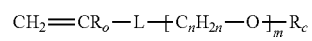

(2)

In the general formula (2), $R_o$ represents a hydrogen atom, a halogen atom, or a methyl group, L represents a divalent linking group, $R_c$ represents a hydrogen atom or an alkyl group having 1 to 10 carbon atoms, m represents an integer of 2 to 50, and n represents an integer of 1 to 5. Further, when m is 2 or more, a plurality of $-(C_nH_{2n}-O)-$ may be repeating units that are different from each other.

(MD) represents a constituent unit having at least one polysiloxane structure.

Moreover, the present invention relates to an antireflection film obtained by the coating composition and the method for producing an antireflection film.

<Component (A): Fluorine-Containing Polymer Having Polyalkylene Oxide Group in Molecule, Represented by General Formula (1)>

In the present invention, the coating composition contains a fluorine-containing polymer having a polyalkylene oxide group in the molecule, represented by the following general formula (1) as a component (A).

$$(MF1)a\text{-}(MF2)b\text{-}(MF3)c\text{-}(MA)d\text{-}(MB)e\text{-}(MC)f\text{-}(MD)g \quad \text{General Formula (1)}$$

In the general formula (1), a to f each represent the molar fraction of each constituent unit, and g represents % by mass in the fluorine-containing polymer, representing values satisfying the relationships of $0 \le a \le 70$, $0 \le b \le 70$, $0 \le c \le 80$, $30 \le a+b+c \le 90$, $0 \le d \le 50$, $0 \le e \le 50$, $0.1 \le f \le 50$, and $0 \le g \le 15$, respectively.

(MF1) represents a constituent unit that is polymerized from a monomer represented by $CF_2=CF-Rf_1$. $Rf_1$ represents a perfluoroalkyl group having 1 to 5 carbon atoms.

(MF2) represents a constituent unit that is polymerized from a monomer represented by $CF_2=CF-ORf_{12}$. $Rf_{12}$ represents a fluorine-containing alkyl group having 1 to 30 carbon atoms.

(MF3) represents a constituent unit that is polymerized from a monomer represented by $CH_2=CRo-L-Rf_{13}$. $R_o$ represents a hydrogen atom, a halogen atom, or a methyl group, L represents a divalent linking group, and $Rf_{13}$ represents a fluorine-containing alkyl group having 1 to 20 carbon atoms.

(MA) represents a constituent unit having at least one of a group having an unsaturated double bond and a ring-opening polymerization reactive group.

(MB) represents a non-crosslinkable constituent unit.

(MC) represents a constituent unit that is polymerized from a monomer having at least one polyalkylene oxide group of the following general formula (2):

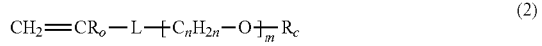

$$CH_2=CR_o-L-(C_nH_{2n}-O)_m R_c \qquad (2)$$

In the general formula (2), $R_o$ represents a hydrogen atom, a halogen atom, or a methyl group, L represents a divalent linking group, $R_c$ represents a hydrogen atom or an alkyl group having 1 to 10 carbon atoms, m represents an integer of 2 to 50, and n represents an integer of 1 to 5. Further, when m is 2 or more, a plurality of $-(C_nH_{2n}-O)-$ may be repeating units that are different from each other.

(MD) represents a constituent unit having at least one polysiloxane structure.

Examples of the fluorine-containing polymer include a polymer having a fluorine-containing hydrocarbon structure such as a group containing a fluorine-containing hydrocarbon and a monomer unit containing a fluorine-containing hydrocarbon (a unit obtained from a monomer containing a fluorine-containing hydrocarbon).

Examples of the fluorine-containing hydrocarbon structure include a fluorine-containing aliphatic hydrocarbon group, a fluorine-containing aromatic hydrocarbon group, a monomer unit containing a fluorine-containing aliphatic hydrocarbon, and a monomer unit containing a fluorine-containing aromatic hydrocarbon, with a fluorine-containing aliphatic hydrocarbon group or a monomer unit containing a fluorine-containing aliphatic hydrocarbon being preferred.

The molecular weight of the fluorine-containing hydrocarbon structure is preferably from 500 to 100000, more preferably from 1000 to 80000, and still more preferably from 2000 to 50000. The molecular weight of the fluorine-containing hydrocarbon structure is easily and preferably carried out by changing the degree of polymerization of the fluorine-containing vinyl monomer in the case of a monomer containing a fluorine-containing hydrocarbon. Specific examples of the fluorine-containing vinyl monomer unit include fluoroolefins (for example, fluoroethylene, vinylidene fluoride, tetrafluoroethylene, perfluorooctylethylene, and hexafluoropropylene), alkyl ester derivatives in which (meth)acrylic acid is partially or fully fluorinated (for example, Viscoat 6FM (manufactured by Osaka Yuki Kagaku), and M-2020 (manufactured by Daikin), and partially or fully fluorinated vinyl ethers.

In the component (A), the fluorine-containing hydrocarbon structure may be used singly or in combination of two or more kinds thereof.

Preferred Embodiment of Method for Synthesizing Component (A)

A preferred embodiment of a method for synthesizing the component (A) will be described in detail.

A preferred embodiment of a method for synthesizing the component (A) in the present invention is a synthesis method in which a polymerizable polyalkylene oxide compound (Y) containing an unsaturated double bond, represented by the general formula (2), is reacted with a polymerizable compound (Z) containing an unsaturated double bond having a fluorine-containing hydrocarbon structure.

For the compound represented by the general formula (2) as a component (Y), in order to attain sufficient interaction with the inorganic fine particles and sufficient solubility in a solvent for preparing a coating composition, n preferably satisfies $2 \le n \le 4$, and more preferably $2 \le n \le 3$, and m preferably satisfies $3 \le m \le 20$, and more preferably $5 \le m \le 10$ in the general formula (2).

$R_o$ represents a hydrogen atom, a halogen atom, or a methyl group, and preferably a hydrogen atom or a methyl group.

$R_c$ represents a hydrogen atom or an alkyl group having 1 to 10 carbon atoms, and the alkyl group is preferably an alkyl group having 1 to 6 carbon atoms.

L represents a divalent linking group, and preferably an alkylene group having 1 to 10 carbon atoms, an allylene group having 6 to 10 carbon atoms, $-O-$, $-S-$, $-N(R)-$, $-CO-$, and a divalent linking group obtained by combination of two or more kinds thereof. However, R represents a hydrogen atom or an alkyl group having 1 to 5 carbon atoms. L is preferably a divalent linking group having 1 to 9 carbon atoms, and more preferably a divalent linking group having 1 to 7 carbon atoms, from the viewpoint of having little steric hindrance and not interfering with the interaction with the inorganic fine particles. L is particularly preferably $-COO-$, $-CONH-$, or $-CO-S-$, and most preferably $-COO-$.

For the component (Y) in the present invention, for instance, examples of the monomer include methoxypolyethylene glycol acrylate and methacrylate, (methoxypolyethylene glycol)acrylamide and methacrylamide, methoxypoly(propylene-block-ethylene)glycol acrylate and methacrylate, (methoxypoly(propylene-block-ethylene)glycol)acrylamide and methacrylamide, ethoxypolyethylene glycol acrylate and methacrylate, (ethoxypolyethylene glycol)acrylamide and methacrylamide, ethoxypoly(propylene-block-ethylene)glycol acrylate and methacrylate and (ethoxypoly(propylene-block-ethylene)glycol)acrylamide, and methacrylamide. The total length of the side chain of the polyalkylene glycol is advantageously such that the average molecular weight of the side chain is from 30 to 4300 g/mol, preferably from 132 to 1440 g/mol, and more preferably from 220 to 580 g/mol. Among these monomers, a methoxypolyalkylene glycol acrylate and methacrylate having a number average molecular weight of preferably 100 to 4500, more preferably 200 to 1600, and still more preferably 300 to 700 is desirable. Specific examples thereof include Blemmer PE-20, PE-200, PE-350, PME-100, PME-200, PME-400, and AE-350 (all manufactured by NOF Corporation), and MA-30, MA-50, MA-100, MA-150, RA-1120, RA-2314, RMA-564, RMA-568, RMA-1114, and MPG130-MA (all manufactured by Nippon Nyukazai Co., Ltd.). Further, the component (Y) may be produced by carrying out a reaction of a commercially available hydroxypoly(alkyleneoxy) material such as trade name "Pluronic" (manufactured by ASAHI DENKA CO., LTD.), "Adeka Polyether" (manufactured by ASAHI DENKA Co., Ltd.), "Carbowax" (manufactured by Glyco Products "Toriton" (manufactured by Rohm and Haas), or "P.E.G" (manufactured by DAI-ICHI KOGYO SEIYAKU CO., LTD.) with acrylic acid, methacrylic acid, acryl chloride, methacryl chloride, acrylic acid anhydride, or the like according to any known method. In addition, the above-described monomers may be used singly or in combination of two or more kinds thereof.

Examples of the polymerizable polyalkyleneoxy compound having an unsaturated double bond, represented by the general formula (2), that is, a component (Y) are set forth below, but are not limited thereto. Among the compounds, the number of repeating units of the alkyleneoxy group are represented by an integer that is closest to the average mass value.

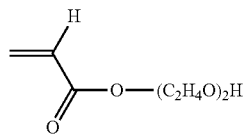

A-1

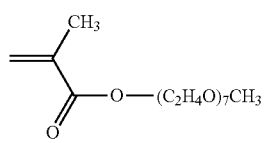

A-2

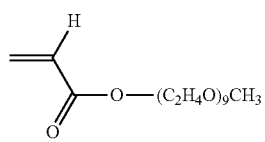

A-3

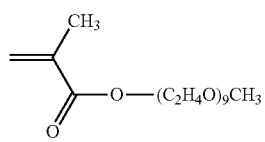

A-4

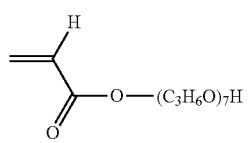

A-5

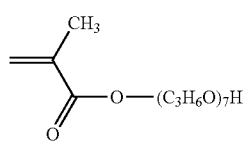

A-6

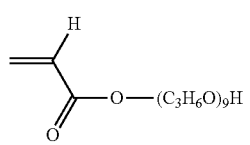

A-7

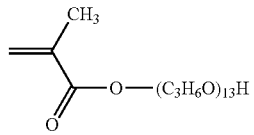

A-8

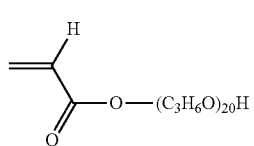

A-9

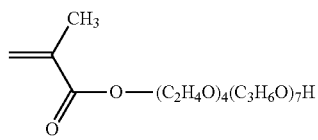

A-10

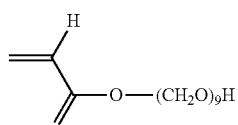

A-11

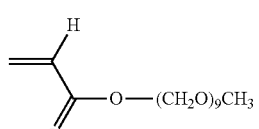

A-12

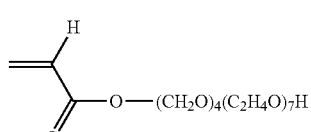

A-13

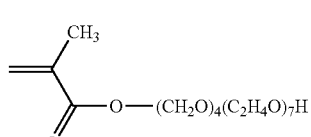

A-14

A-15

(Z) Component Having Polymerizable Fluorine-Containing Hydrocarbon Compound Containing Unsaturated Double Bond In the present invention, the compound (Z) may be used for reaction with the compound (Y) to form the component (A).

Examples of the component (Z) include a fluorine-containing hydrocarbon-based monomer having an unsaturated double bond.

Examples of the fluorine-containing hydrocarbon-based monomer having an unsaturated double bond include compounds represented by the general formula (1-1), the general formula (1-2), and the general formula (1-3) as described below.

In a preferred production method of the present invention, the mass average molecular weight of the component (A) is preferably from 1000 to 100000, more preferably from 2000 to 50000, and still more preferably from 3000 to 30000.

Here, the mass average molecular weight and the molecular weight are each a molecular weight determined by differential refractometer detection with THF as a solvent in a GPC analyzer using a TSKgel GMHxL, TSKgel G4000HxL, or TSKgel G2000HxL column (trade names, all manufactured by Tosoh Corporation) and indicated as the molecular weight of polystyrene.

The component (A) of the present invention can be produced by a well-known ordinary method. For example, it can be produced by polymerizing fluorine-containing hydrocarbon-based monomers having unsaturated double bonds and fluorine-containing hydrocarbon-based monomers having unsaturated double bonds with the addition of a widely used radical polymerization initiator in to an organic solvent. Alternatively, it may be produced by adding other additional polymerizable unsaturated compounds, as desired, in the above-described method. A dropwise addition polymerization method, corresponding to the polymerizability of the respective monomers, in which polymerization is carried out while adding monomers and an initiator dropwise to a reaction vessel, or other methods are also effective to obtain a polymer having uniform composition.

As the component (A) in the present invention, from the viewpoints of easiness of synthesis, and excellent compatibility with materials when low refractive index curable materials are used in combination in a coating composition, a copolymer containing a polymerization unit having a polyalkylene oxide group in the molecule as well as a fluorine-containing hydrocarbon structure are further preferable.

The fluorine-containing polymer represented by the general formula (1) may be either a random copolymer or a block copolymer.

The respective monomers in (MF1) to (MF3) in the general formula (1) (compounds represented by the following general formulae (1-1) to (1-3)) will be described.

(MF1);$CF_2=CF-Rf_{12}$:  General Formula (1-1)

In the formula, $Rf_1$ represents a perfluoroalkyl group having 1 to 5 carbon atoms.

As the compound of the general formula (1-1), perfluoropropylene or perfluorobutylene is preferred from the viewpoint of the polymerization reactivity, and perfluoropropylene is particularly preferred from the viewpoint of easiness of availability.

(MF2);$CF_2=CF-ORf_{12}$:  General Formula (1-2)

In the formula, $Rf_{12}$ represents a fluorine-containing alkyl group having 1 to 30 carbon atoms. The fluorine-containing alkyl group may have a substituent. Further, $Rf_{12}$ may have an ether bond between carbon and carbon.

$Rf_{12}$ is a fluorine-containing alkyl group, preferably having 1 to 20 carbon atoms, and more preferably having 1 to 10 carbon atoms, and still more preferably a perfluoroalkyl group having 1 to 10 carbon atoms. Specific examples of $Rf_{12}$ include the following groups, but are not limited thereto: $-CF_3$, $-CF_2CF_3$, $-CF_2CF_2CF_3$, $-CF_2CF(OCF_2CF_2CF_3)CF_3$.

(MF3):$CH_2=CRo-L-Rf_{13}$:  General Formula (1-3)

$R_o$ represents a hydrogen atom, a halogen atom, or a methyl group, L represents a divalent linking group, and $Rf_{13}$ represents a fluorine-containing alkyl group having 1 to 20 carbon atoms.

$Rf_{13}$ is preferably a fluorine-containing alkyl group having 1 to 15 carbon atoms, and may have a linear structure (for example, $-CF_2CF_3$, $-CH_2(CF_2)_4H$, $-CH_2(CF_2)_8CF_3$, and $-CH_2CH_2(CF_2)_4H$), a branched structure (for example, $-CH(CF_3)_2$, $-CH_2CF(CF_3)_2$, $-CH(CH_3)CF_2CF_3$, and $-CH(CH_3)(CF_2)_5CF_2H$), and an alicyclic structure (preferably a 5-membered ring or 6-membered ring, for example, a perfluorocyclohexyl group, a perfluorocyclopentyl group, or an alkyl group substituted therewith).

(MF3) is preferably a constituent unit obtained by polymerization of the monomers represented by the following general formula (1-3-1) or (1-3-2).

$CH_2=CR_O-L-(CH_2)_{n1}(CF_2)_{n2}H$  (1-3-1)

In the general formula (1-3-1), $R_o$ represents a hydrogen atom, a halogen atom, or a methyl group, L represents a divalent linking group, n1 represents an integer of 0 to 20, and n2 represents an integer of 1 to 30.

$CH_2=CR_O-L-(CH_2)_{n3}(CF_2)_{n4}F$  (1-3-2)

In the general formula (1-3-2), $R_o$ represents a hydrogen atom, a halogen atom, or a methyl group, L represents a divalent linking group, n3 represents an integer of 0 to 20, and n4 represents an integer of 1 to 30.

In the general formulae (1-3-1) and (1-3-2), Ro and L have the same preferable ranges as in the general formula (2). n1 is preferably an integer of 1 to 10, and more preferably an integer of 1 to 6. n2 is preferably an integer of 1 to 25, and more preferably an integer of 1 to 18. n3 is preferably an integer of 1 to 10, and more preferably an integer of 1 to 6. n4 is preferably an integer of 1 to 20, and more preferably an integer of 2 to 15.

Specific examples of the general formula (1-3-1) or (1-3-2) that can be used for MF3 are set forth below, but the compounds that can be used in the present invention are by no means limited to the following specific examples.

| | $R_O$ | L | $n_1$ | $n_2$ |
|---|---|---|---|---|
| MF3-1 | H | COO | 1 | 4 |
| MF3-2 | CH3 | COO | 1 | 4 |
| MF3-3 | H | COO | 1 | 6 |
| MF3-4 | CH3 | COO | 1 | 6 |
| MF3-5 | H | COO | 1 | 8 |
| MF3-6 | CH3 | COO | 1 | 8 |
| MF3-7 | H | COO | 1 | 10 |
| MF3-8 | CH3 | COO | 1 | 10 |
| MF3-9 | H | COO | 1 | 12 |
| MF3-10 | CH3 | COO | 1 | 12 |
| MF3-11 | H | COO | 1 | 14 |
| MF3-12 | CH3 | COO | 1 | 14 |
| MF3-13 | H | COO | 1 | 16 |
| MF3-14 | CH3 | COO | 1 | 16 |
| MF3-15 | H | COO | 1 | 18 |
| MF3-16 | CH3 | COO | 1 | 18 |
| MF3-17 | H | COO | 2 | 8 |
| MF3-18 | CH3 | COO | 2 | 8 |
| MF3-19 | CH3 | COO | 3 | 8 |
| MF3-20 | F | COO | 1 | 8 |
| MF3-21 | H | CONH | 1 | 8 |
| MF3-22 | CH3 | CONH | 1 | 8 |
| MF3-23 | H | CO—S— | 1 | 8 |
| MF3-24 | CH3 | CO—S— | 1 | 8 |

| | $R_O$ | L | $n_3$ | $n_4$ |
|---|---|---|---|---|
| MF3-25 | H | COO | 1 | 4 |
| MF3-26 | CH3 | COO | 1 | 4 |
| MF3-27 | H | COO | 1 | 7 |
| MF3-28 | CH3 | COO | 1 | 7 |
| MF3-29 | H | COO | 1 | 10 |
| MF3-30 | CH3 | COO | 1 | 10 |

-continued

| $CH_2 = CR_o\text{-}L\text{-}(CH_2)_{n3}(CF_2)_{n4}F$ (1-3-2) | | | |
|---|---|---|---|
| | $R_0$ | L | $n_3$ | $n_4$ |
| MF3-31 | H | COO | 2 | 8 |
| MF3-32 | CH3 | COO | 2 | 8 |
| MF3-33 | H | CONH | 2 | 4 |
| MF3-34 | CH3 | CONH | 2 | 4 |
| MF3-35 | H | CONH | 2 | 6 |
| MF3-36 | CH3 | CONH | 2 | 6 |
| MF3-37 | H | CO—S— | 2 | 6 |
| MF3-38 | CH3 | CO—S— | 2 | 6 |

(MA) of the general formula (1) represents a constituent unit having at least one of a group having an unsaturated double bond and a ring-opening polymerization reactive group. In view of improvement of the strength of the coating film formed using the coating liquid in the present invention, the fluorine-containing polymer that is a component (A) preferably contains a repeating group having the reactive groups in the polymer molecule.

Examples of the group having a reactive unsaturated double bond include a (meth)acryloyl group, an allyl group, and a vinyloxy group, and examples of the ring-opening polymerization reactive group include an epoxy group, an oxetanyl group, and an oxazolyl group. (MA) is more preferably a group having a reactive unsaturated double bond.

Preferable specific examples of the constituent represented by (MA) in the general formula (1) are set forth below, but the present invention should not be construed to be limited thereto.

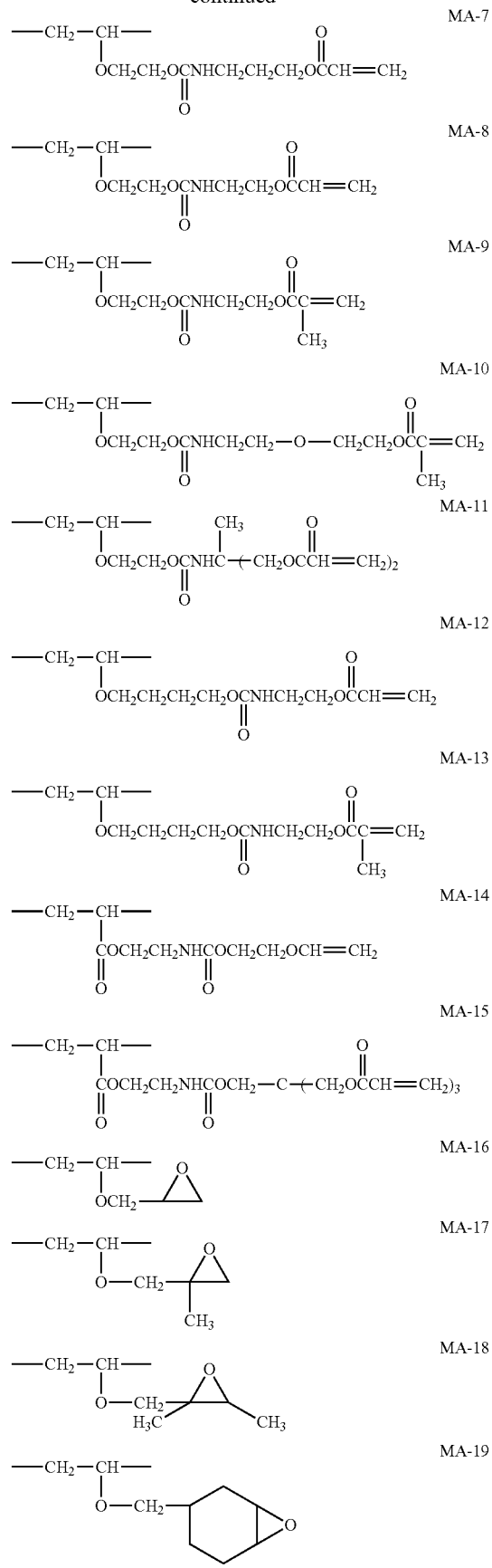

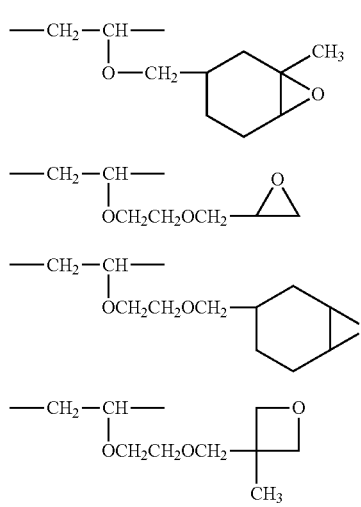

(MB) in the general formula (1) represents a non-crosslinkable constituent unit. The constituent unit formed from the non-crosslinkable group indicates that the constituent becomes non-crosslinkable after forming a fluorine-containing polymer by copolymerization or the like with other constituents constituting the fluorine-containing polymer in the present invention. (MB) can be suitably selected from the viewpoints of stability of a coating composition, solubility in a solvent, affinity with inorganic fine particles, dispersion stability of inorganic fine particles, or the like in order to prevent formation of a three-dimensional network structure by a dehydration-condensation reaction, a hydrolysis reaction, or the like.

Examples of the monomer for forming (MB) include vinyl esters such as methyl vinyl ether, ethyl vinyl ether, n-butyl vinyl ether, cyclohexyl vinyl ether, and isopropyl vinyl ether, vinyl esters such as vinyl acetate, vinyl propionate, vinyl butyrate, and vinyl cyclohexanecarboxylate, and (meth)acrylic esters such as methyl(meth)acrylate and ethyl (meth)acrylate.

(MD) in the general formula (1) represents a constituent unit having at least one polysiloxane structure. By incorporating the polysiloxane structure, uneven distribution in the upper part of the inorganic fine particles in the present invention can be enhanced and the inorganic fine particles remaining in a trace amount in the lower layer, which will cause failure in the surface state can be reduced.

That is, it is preferable that the component (A) contain both of the fluorine-containing hydrocarbon unit and the polysiloxane unit in the molecule, and more specifically it is more preferable that (MD) contain a polysiloxane repeating unit represented by the following general formula (20) in the main chain or side chain.

General Formula (20)

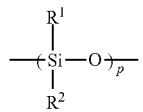

In the formula, $R^1$ and $R^2$ each independently represent an alkyl group or an aryl group.

The alkyl group preferably has 1 to 4 carbon atoms and may have a substituent. Specific examples thereof include a methyl group, a trifluoromethyl group, and an ethyl group.

The aryl group preferably has 6 to 20 carbon atoms and may have a substituent. Specific examples thereof include a phenyl group and a naphthyl group.

$R^1$ and $R^2$ are each preferably a methyl group or phenyl group, and more preferably a methyl group.

p represents an integer of 2 to 500, preferably 5 to 350, and more preferably 8 to 250.

The polymer having a polysiloxane structure represented by the general formula (20) in the side chain can be synthesized by a method of introducing a polysiloxane (for example, Silaplane Series (manufactured by Chisso Corp.)) having, at one terminal, a corresponding reactive group (for example, an epoxy group, an amino group for an acid anhydride group, a mercapto group, a carboxyl group, or a hydroxyl group) into a polymer having a reactive group such as an epoxy group, a hydroxyl group, a carboxyl group, and an acid anhydride group, through a polymer reaction described, for example, in J. Appl. Polym. Sci., 2000, 78, 1955 and JP1981-28219A (JP-S56-28219A); or a method of polymerizing polysiloxane-containing silicon macromers.

The method for introducing a polysiloxane structure into the main chain is not particularly limited and examples thereof include a method using a polymer-type initiator such as an azo group-containing polysiloxane amide (as a commercially available product, VPS-0501 and 1001 (trade names, manufactured by Wako Pure Chemicals Industries, Ltd.)) described in JP1995-93100A (JP-H06-93100A), a method of introducing a polymerization initiator and a chain transfer agent-derived reactive group (for example, a mercapto group, a carboxyl group, and a hydroxyl group) into the polymer terminal and reacting it with a polysiloxane containing a reactive group (for example, an epoxy group and an isocyanate group) at one terminal or both terminals, and a method of copolymerizing a cyclic cyclohexane oligomer such as hexamethylcyclotrisiloxane by anionic ring-opening polymerization. Among these, a method using an initiator having a polysiloxane partial structure is easy and preferred.

In the general formula (1), a to f each represent the molar fraction of each constituent unit, and g represents % by mass in the fluorine-containing polymer, representing values satisfying the relationships of $0 \le a \le 70$, $0 \le b \le 70$, $0 \le c \le 80$, $30 \le a+b+c \le 90$, $0 \le d \le 50$, $0 \le e \le 50$, $0.1 \le f \le 50$, and $0 \le g \le 15$, respectively.

By increasing the molar fractions (%) a+b+c of the component (MF1), the component (MF2), and the component (MF3), the surface free energy of the polymer is reduced and the inorganic fine particles modified with the polymer are easily distributed unevenly in the upper part, but from the standpoint of adsorptivity to the inorganic fine particles, solubility in a widely used solvent, or the like, $30 \le a+b+c \le 90$ is preferred, and $40 \le a+b+c \le 80$ is more preferred.

The introduction of (MF1) contributes to the performance of uneven distribution of the inorganic fine particles in the upper part. As described above, the molar fraction a of the component (MF1) satisfies $0 \le a \le 70$, and preferably $5 \le a \le 40$.

Furthermore, the introduction of (MF2) also contributes to the performance of uneven distribution of the inorganic fine particles in the upper part. As described above, the molar fraction b of the component (MF2) satisfies $0 \le b \le 70$, and preferably $5 \le c \le 40$.

In addition, the introduction of (MF3) also contributes to the performance of uneven distribution of the inorganic fine particles in the upper part. As described above, the molar fraction c of the component (MF3) satisfies 0≤c≤80, and preferably 5≤c≤40.

Since the constituent having at least one polyalkylene oxide group represented by (MC) has sufficient coating properties regarding coating onto the inorganic fine particles of the polymer, and can secure an amount of the fluorine-containing component required for the uneven distribution of the inorganic fine particles in the upper part, its molar fraction is preferably in the range of 01≤f≤50, more preferably 0.5≤f≤40, and still more preferably 1≤f≤30. Further, when the solubility of the monomer composition of the fluorine-containing copolymer during formation of a copolymer in a coating solvent is sufficiently high, the ratio of the monomers having a polyalkylene oxide group can be increased, and preferably satisfy 6≤f≤40. In addition, L and $R_o$ included in the component (MC) in the general formula (2) may be the same as or different from L and $R_o$ included in (MF3).

The constituent having at least one of a group having an unsaturated double bond and a ring-opening polymerization reactive group, represented by (MA), preferably incorporates a polymer therein from the standpoint of increase in the hardness of the coating film. The molar fraction of the component (MA) is preferably in the range of 0≤d≤50. In the present invention, particularly, the component (A) preferably has a polymerizable functional group in the molecule. As such, the preferable lower limit of d is 5, and specifically, d is preferably in the range satisfying 5≤d≤40, and particularly preferably in the range satisfying 5≤d≤30.

The molar fraction e of the constituent formed with a non-crosslinkable group, represented by (MB), is preferably in the range satisfying 0≤e≤50, more preferably in the range satisfying 0≤e≤20, and still more preferably in the range satisfying 0≤e≤10.

(MC) represents a constituent unit polymerized from the monomers having at least one polyalkylene oxide group of the general formula (2). The preferable range of the general formula (2) in (MC) is the same as above.

Incorporation of the polysiloxane structure represented by (MD) is preferable in view of uneven distribution of the fine particles in the upper part and improvement of the surface state of the coating film. The content of the polysiloxane structure in the fluorine-containing polymer is preferably from 0.5 to 15% by mass, and more preferably from 1 to 10% by mass, with respect to the entire polymer.

The mass average molecular weight of the fluorine-containing polymer is preferably from 1000 to 100000, more preferably from 2000 to 50000, and still more preferably from 3000 to 30000.

Here, the mass average molecular weight and is each a molecular weight determined by differential refractometer detection with THF as a solvent in a GPC analyzer using a TSKgel GMHxL, TSKgel G4000HxL, or TSKgel G2000HxL column (trade names, all manufactured by Tosoh Corporation) and indicated as the molecular weight of polystyrene.

Specific examples of the fluorine-containing copolymer represented by the general formula (1) as a component (A) of the present invention are set forth below, but the present invention should not be construed to be limited thereto. Incidentally, in Table 1, the copolymer is denoted by a combination of monomers that form (MF1), (MF2), (MF3), (MC), (MA), (MB), or (MD) of the general formula (1) by the polymerization. In the Table, a to f represent the molar ratio (%) of monomers of the respective components. In the Table, "wt %" of the (MD) component indicates % by mass of the component in the entire polymer.

TABLE 1

| | (MF1) | (MF2) | (MF3) | (MC) | (MA) | (MB) | (MD) | a | b | c | f | d | e | g | (Mw) |
|---|---|---|---|---|---|---|---|---|---|---|---|---|---|---|---|
| IPF-1 | HFP | — | — | A-3 | — | EVE | — | 50 | — | — | 5 | — | 45 | | 2.2 |
| IPF-2 | HFP | — | — | A-3 | (MA-8) | EVE | — | 50 | — | — | 5 | 25 | 20 | | 2.3 |
| IPF-3 | HFP | — | — | A-3 | (MA-8) | EVE | VPS-1001 | 50 | — | — | 5 | 25 | 20 | 2 wt % | 2.4 |
| IPF-4 | HFP | FPVE | — | A-3 | (MA-8) | EVE | VPS-1001 | 45 | 5 | — | 5 | 25 | 20 | 2 wt % | 2.3 |
| IPF-5 | HFP | FPVE | MF3-3 | A-3 | (MA-8) | EVE | — | 45 | 5 | 5 | 5 | 25 | 15 | | 2.2 |
| IPF-6 | HFP | — | — | A-3 | (MA-8) | EVE | FM-0721 | 50 | — | — | 5 | 25 | 20 | 2 wt % | 2.3 |
| IPF-7 | HFP | — | — | A-3 | (MA-12) | EVE | FM-0721 | 50 | — | — | 5 | 25 | 20 | 3 wt % | 2.5 |
| IPF-8 | HFP | FPVE | — | A-3 | (MA-12) | EVE | FM-0721 | 45 | 5 | — | 5 | 25 | 20 | 2 wt % | 2.4 |
| IPF-9 | HFP | — | — | A-5 | (MA-8) | EVE | VPS-1001 | 50 | — | — | 5 | 25 | 20 | 2 wt % | 2.6 |
| IPF-10 | HFP | FPVE | — | A-5 | (MA-8) | EVE | VPS-1001 | 45 | 5 | — | 5 | 25 | 20 | 2 wt % | 2.7 |
| IPF-11 | — | — | MF3-3 | A-3 | — | — | — | — | — | 60 | 40 | — | — | | 1.3 |
| IPF-12 | — | — | MF3-3 | A-3 | — | — | — | — | — | 80 | 20 | — | — | | 2.4 |
| IPF-13 | — | — | MF3-3 | A-3 | — | EVE | — | — | — | 60 | 20 | — | 20 | | 1.8 |
| IPF-14 | — | — | MF3-3 | A-3 | — | EVE | — | — | — | 60 | 10 | — | 30 | | 1.9 |
| IPF-15 | — | — | MF3-3 | A-8 | — | EVE | VPS-1001 | — | — | 60 | 10 | — | 30 | 2 wt % | 2.3 |
| IPF-16 | — | — | MF3-3 | A-4 | — | EVE | FM-0721 | — | — | 60 | 10 | — | 30 | 2 wt % | 2.3 |
| IPF-17 | — | — | MF3-3 | A-4 | — | EVE | FM-0721 | — | — | 60 | 10 | — | 30 | 2 wt % | 2.3 |
| IPF-18 | — | — | MF3-3 | A-4 | — | EVE | FM-0721 | — | — | 60 | 10 | — | 30 | 2 wt % | 2.4 |
| IPF-19 | — | — | MF3-3 | A-4 | — | EVE | — | — | — | 60 | 8 | — | 32 | | 2.1 |
| IPF-20 | — | — | MF3-3 | A-4 | (MA-15) | EVE | — | — | — | 60 | 8 | 12 | 20 | | 2.0 |
| IPF-21 | — | — | MF3-3 | A-4 | (MA-15) | EVE | VPS-1001 | — | — | 60 | 8 | 12 | 20 | 2 wt % | 2.5 |
| IPF-22 | — | — | MF3-3 | A-4 | (MA-15) | EVE | FM-0721 | — | — | 60 | 8 | 12 | 20 | 2 wt % | 2.2 |
| IPF-23 | — | — | MF3-3 | A-4 | (MA-14) | EVE | VPS-1001 | — | — | 60 | 8 | 12 | 20 | 2 wt % | 2.3 |
| IPF-24 | — | FPVE | MF3-3 | A-4 | (MA-15) | EVE | VPS-1001 | — | 5 | 55 | 8 | 12 | 20 | 2 wt % | 2.3 |
| IPF-25 | — | — | MF3-3 | A-3 | (MA-21) | EVE | FM-0721 | — | — | 60 | 8 | 22 | 10 | 2 wt % | 2.6 |
| IPF-26 | — | — | MF3-3 | A-3 | (MA-22) | EVE | FM-0721 | — | — | 60 | 8 | 22 | 10 | 2 wt % | 2.5 |
| IPF-27 | — | — | MF3-3 | A-10 | (MA-21) | EVE | FM-0721 | — | — | 60 | 8 | 22 | 10 | 2 wt % | 2.1 |
| IPF-28 | — | — | MF3-6 | A-3 | (MA-8) | EVE | — | — | — | 60 | 10 | 10 | 20 | | 1.8 |
| IPF-29 | — | — | MF3-6 | A-3 | (MA-8) | EVE | — | — | — | 60 | 10 | 10 | 20 | | 1.9 |
| IPF-30 | — | — | MF3-6 | A-8 | (MA-8) | EVE | VPS-1001 | — | — | 60 | 10 | 10 | 20 | 2 wt % | 2.3 |
| IPF-31 | — | — | MF3-6 | A-4 | (MA-8) | EVE | FM-0721 | — | — | 60 | 10 | 10 | 20 | 2 wt % | 2.3 |

TABLE 1-continued

| | (MF1) | (MF2) | (MF3) | (MC) | (MA) | (MB) | (MD) | a | b | c | f | d | e | g | (Mw) |
|---|---|---|---|---|---|---|---|---|---|---|---|---|---|---|---|
| IPF-34 | HFP | FPVE | MF3-6 | A-4 | (MA-1) | EVE | FM-0721 | 50 | 5 | 5 | 10 | 10 | 20 | 2 wt % | 2.3 |
| IPF-35 | HFP | FPVE | MF3-3 | A-4 | (MA-1) | EVE | VPS-1001 | 50 | 5 | 5 | 10 | 10 | 20 | 2 wt % | 2.2 |
| IPF-36 | HFP | — | — | A-4 | (MA-1) | EVE | — | 50 | — | — | 10 | 10 | 30 | | 2.4 |

(Mw) represents molecular weight. (Value in ten thousands)
The abbreviations in the Table above indicate the following:
HFP: Hexafluoropropylene
FPVE: Perfluoropropyl vinyl ether
EVE: Ethyl vinyl ether
VPS-1001: Azo group-containing polydimethylsiloxane, molecular weight of polysiloxane moiety: about 10,000, manufactured by Wako Pure Chemicals Industries, Ltd.
FM-0721: One-end methacryloyl-modified dimethylsiloxane, average molecular weight: 5000, manufactured by Chisso Corp.

<Method for Preparing Coating Composition>

When preparing the coating composition of the present invention, the respective components may be mixed after being dissolved or dispersed in a solvent, or preferably, fluorine-containing hydrocarbon compound having a polyalkylene oxide group as a component (A) and inorganic fine particles as a component (B) are mixed with a solvent as a component (D) in advance, and then mixed with a binder as a component (C).

<Component (B): Inorganic Fine Particles>

The inorganic fine particles of the component (B) used in the present invention are non-surface-modified inorganic fine particles or inorganic fine particles that are surface-treated with a silane coupling agent having a molecular weight of 600 or less.

Here, the non-surface-modified inorganic fine particles refer to inorganic fine particles in which the surfaces of the inorganic fine particles are not treated with a silane coupling agent or the like.

The inorganic fine particles of the component (B) used in the present invention are preferably inorganic fine particles having an average particle diameter from 1 nm to 150 nm, more preferably inorganic fine particles having an average particle diameter from 5 nm to 100 nm, and still more preferably inorganic fine particles having an average particle diameter from 10 nm to 80 nm.

When the particle diameter of the inorganic fine particles is too small, the effect of improving the scratch resistance decreases, whereas when it is too large, fine irregularities are generated on the surface of the cured layer and the appearance, for example, dense blackness, or the integral reflectance may be deteriorated in some cases, and thus, the particle diameter is preferably set within the above-described ranges. The inorganic fine particles may be crystalline or amorphous, and may be monodisperse particles or aggregate particles as long as a predetermined particle diameter is satisfied. The shape thereof is most preferably spherical, but it may be an amorphous form.

Moreover, the average particle diameter of the inorganic fine particles is an average diameter taking the mass of the particles as a weight, and can be measured by a light scattering method or observation with electron microscopy (microscopic method).

The composition of the inorganic fine particles of the present invention is not particularly limited and, for example, oxides of silicon, titanium, aluminum, tin, zinc, antimony, or the like, or a mixture thereof may be used. However, in order to make the inorganic fine particles be distributed unevenly in the upper part with the component (A) in the present invention in the coating film, metal oxide fine particles are preferred, and those having metal oxides with silicon as a constituent at least on the surface of the particles are more preferred. For example, the inorganic fine particles may be core shell particles having the surface including silicon dioxide or may form mixed crystals with silicon and other inorganic elements. In view of attaining a particularly low refractive index, particles with silicon dioxide (silica) are preferred.

The refractive index of the inorganic fine particles of the component (B) in the present invention is 1.46 or less, more preferably from 1.15 to 1.46, particularly preferably from 1.15 to 1.40, still more preferably from 1.15 to 1.35, and most preferably from 1.17 to 1.32. The inorganic fine particles of the component (B) are distributed unevenly in the upper part of the cured layer and thus contribute to improvement of scratch resistance and reduction in a refractive index, and therefore, a low refractive index is preferred.

Furthermore, the refractive index of the inorganic fine particles can be measured by an Abbe's refractometer (manufactured by ATAGO K. K.), and is a value at 25° C. for the D line.

The inorganic fine particles of the component (B) more preferably have a hollow structure. In the case of the inorganic fine particles having a hollow structure, the refractive index does not represent the refractive index of only the inorganic composition in the outer shell, but represents an average value of the entire particles. In this case, when the radius of the pore in the particles is denoted as a and the radius of the outer shell of the particle is denoted as b, the porosity x is expressed in the following equation (II).

$$x = (4\pi a^3/3)/(4\pi b^3/3) \times 100 \quad \text{(Equation II)}$$

The porosity x is preferably from 10 to 60%, more preferably from 20 to 60%, and still more preferably from 30 to 60%. With the porosity in these ranges, the low refractive index properties and the strength of the particles themselves can be adjusted to suitable ranges.

The inorganic fine particles are preferably inorganic fine particles surface-treated with a silane coupling agent, which has a molecular weight of 600 or less, so as to promote the dispersion stability in a dispersion or a coating liquid, or enhance the affinity and the binding properties with a binder component. In order to attain sufficient dispersion stability in a dispersion or a coating liquid while not interfering with the interaction with the component (A) of the present invention, the molecular weight of the silane coupling agent is preferably from 90 to 600, more preferably from 100 to 400, and most preferably from 120 to 300. In the present invention, the molecular weight of the silane coupling agent represents a molecular weight in the state in which a hydrolyzable group bonded to an Si atom of a silane coupling agent contributing to the bonding with the surface of the inorganic fine particles is hydrolyzed with a silanol group (Si—OH).

Examples of the preferable silane coupling agent of the present invention include trimethylmethoxysilane, triethylmethoxysilane, trimethylethoxysilane, triethylethoxysilane, methyltrimethoxysilane, dimethyldimethoxysilane, vinyltrimethoxysilane, vinyltriethoxysilane, 2-(3,4-epoxycyclohexyl)ethyltrimethoxysilane, 3-glicycloxypropyltrimethoxysilane, 3-acryloyloxypropyl trimethoxysilane, and 3-methacryloyloxypropyl trimethoxysilane. Among the silane coupling agents, those having an alkyl group, or an alkyl group having a polymerizable functional group are preferred. As the polymerizable functional group, an epoxy group, a vinyl group, a (meth)acryloyl group, or the like is preferred, and an acryloyl group is most preferred. By incorporating these functional groups, the coating film strength of the layer having inorganic fine particles distributed unevenly on the upper part can be improved.

From the viewpoint of inhibition of steric repulsion for dispersion stability or for interaction with the component (A) of the inorganic fine particles in a dispersion or coating liquid, the surface modification rate α of the inorganic fine particles is preferably in the range from 0.1% to 9%, more preferably in the range from 1% to 9%, still more preferably in the range from 3% to 8%, and particularly preferably in the range from 4% to 7%.

The surface modification rate of the inorganic fine particles can be measured by a known method such as solid $^{29}$Si CP-MAS NMR. The CP-MAS method is an indirect method in which a $^1$H nucleus is excited, the magnetization is shifted to a $^{29}$Si nucleus by alternate polarization, and is observed. Accordingly, the peak behavior of Si on the outermost surface can be measured, and by observing the size of the peaks of the obtained different chemical shift, the binding fashion in the solid can be determined. The surface modification rate α can be expressed in M/Q, D/Q, or T/Q (strength ratio of a peak derived from the coupling agent/a silica peak) according to the kind of the coupling agent, and for example, the surface modification rate α1 of the trimethylsilane can be determined as M/Q and the surface modification rate α2 of the γ-acryloyl oxypropyl trimethoxysilane can be determined as T/Q.

By measuring the solid NMR of Si, it is possible to quantitatively evaluate the surface state of the particles including Si. First, information obtained by a solid $^{29}$Si CP-MAS NMR will be described. Since $^{29}$Si-NMR has different chemical shifts depending on a partner to which Si is bonded, the binding mode in the solid can be determined by observing the side of each peak. Ordinarily, tetrafunctional Si, trifunctional Si, bifunctional, and monofunctional Si represent Q, T, D, and M, respectively. Further, the number of Si's which take part in the binding via oxygen atoms is denoted with a number superscript. The denoted examples corresponding to the structural formulae are set forth below.

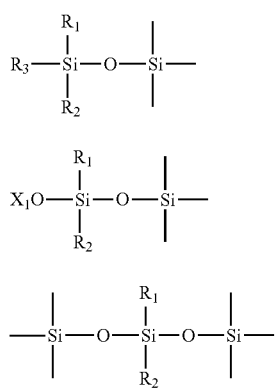

-continued

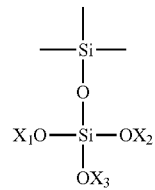

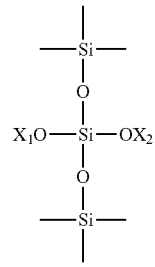

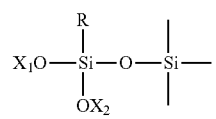

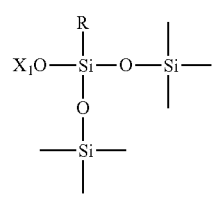

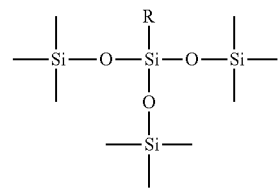

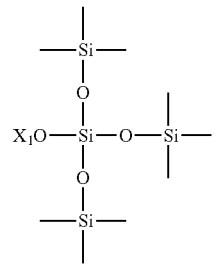

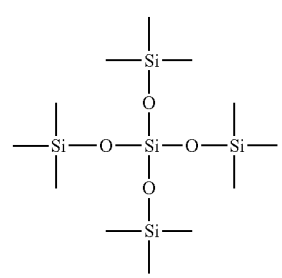

In the formulae, R, $R_1$, $R_2$, and $R_3$ represent substituents in which the elements directly bonded to the Si are not oxygen atoms, and $X_1$, $X_2$, and $X_3$ represent substituents in which the elements directly bonded to the oxygen atoms are not Si atoms.

By surface-treating with a silane coupling agent having a molecular weight of 600 or less, the number of silanol groups on the surface of the inorganic fine particles, including an Si atom, is decreased, and the change in the NMR peaks is shown due to generation of Si—O—Si bonds. When evaluating the dispersed silica particles, the solvent is evaluated with reduced pressure at 25° C., and thus, powders of silica are obtained and used for measurement.

The NMR measurement of the present invention is carried out by an $^{29}$Si CP-MAS method and the values measured using the following apparatuses are used:

AVANCE-300 type console manufactured by Bruker corporation, BL-7 CP-MAS Probe,
Width for measurement: 18,000 Hz
Frequency at observation: 59.621 MHz
MAS spinning speed: 4,000 Hz
1H-90° pulse width: 5.0 ms
Contact time: 5 ms
Pulse repeating time: 5 s CP and MAS methods of solid high-resolution NMR are described in New edition of Modern Chemistry, 11 "High-Resolution NMR—Basis and New Development—", edited by Hajime Sito and Isao Morishimo, Tokyo Kagaku Dojin, 1987, pp. 40 to 50.

Using the peak area of thus measured NMR signals, the following values are calculated and determined.

M/Q is defined as below, and is a standard for a ratio at which a monofunctional silane coupling agent is chemically bonded to an Si atom on the surface. A larger M/Q indicates a larger degree of the surface treatment.

$$M/Q=M/(Q^1+Q^2+Q^3+Q^4)$$

(wherein M represents the peak area of an NMR signal with respect to the structure M).

D/Q is defined as below, and is a standard for a ratio at which a bifunctional silane coupling agent is chemically bonded to an Si atom on the surface. A larger D/Q indicates a larger degree of the surface treatment.

$$D/Q=(D^1+D^2)/(Q^1+Q^2+Q^3+Q^4)$$

(wherein D represents the peak area of an NMR signal with respect to the structure D).

T/Q is defined as below, and is a standard for a ratio at which a trifunctional silane coupling agent is chemically bonded to an Si atom on the surface. A larger T/Q indicates a larger degree of the surface treatment.

$$T/Q=(T^1+T^2+T^3)/(Q^1+Q^2+Q^3+Q^4)$$

(wherein $T^i$ (i=1 to 3) represents the peak area of an NMR signal with respect to the structure $T^i$).

When the inorganic fine particles are surface-treated in the state of a dispersion, the NMR can be measured using the particles obtained by removing the dispersion solvent under reduced pressure at 25° C.

Ratio of Inorganic Fine Particles of Component (B) and Component (A)

When the component (A) has no crosslinkable functional group, the amount of the component (A) relative to the component (B) is preferably from 10 to 150% by mass, and more preferably from 15 to 100% by mass. When component (A) has a crosslinkable functional group, the amount is preferably from 10 to 200% by mass, more preferably from 15 to 150% by mass, and still more preferably from 50 to 150% by mass. The amount within these ranges is preferred from the viewpoints of the uneven distribution of the particles in the upper part, and the coating film strength.

<Component (C): Curable Binder Having No Fluorine Atom in Molecule>

The coating composition of the present invention contains a curable binder having no fluorine atom in the molecule as a component (C). In a preferred embodiment of the component (C), a monomer or oligomer having a reactive group that crosslinks by heat or ionizing radiation is preferred; a resin component having a polyfunctional monomer or polyfunctional oligomer containing a bifunctional or higher group is more preferred; and a resin component having a polyfunctional monomer or polyfunctional oligomer containing a trifunctional or higher group is still more preferred.

As the component (C), those having higher surface free energy than the component (A) are preferred. A resin that is capable of forming a cured layer having a surface free energy of 30 mN/m or more is preferred; a resin that is capable of forming a cured layer having a surface free energy in the range from 35 to 80 mN/m is more preferred; and a resin that is capable of forming a cured layer having a surface free energy in the range from 40 to 60 mN/m is particularly preferred. Further, the difference in the surface free energy between the component (A) and the component (C) is preferably 5 mN/m or more, and more preferably from 10 mN/m to 40 mN/m. Within these ranges, a layer separation structure is easily formed when the coating composition of the present invention is used. Even though the surface free energy after curing is too high, reduction of the reflectance, unevenness, or the like may occur in some cases. The surface free energy is preferably at least the lower limit of the range as above from the viewpoints of strength and coating properties.

In order to make the inorganic fine particles of the component (B) cover the surface by the compound having a polyalkylene oxide group of the component (A) and make them distributed unevenly on the outermost surface of the coating film (air-interface side in the coating film), the properties of separation between the component (A) and the component (C) are preferably large.

The properties of separation between the component (A) and the component (C) can be predicted by thermodynamic and kinetic considerations. For example, it is known that when a free energy of mixing ($\Delta G=\Delta H-T\cdot\Delta S$) that is an index from a lattice theory of Flory-Huggins is determined, it is predicted as the degree of polymerization, the volume fraction ($\phi$: also referred to a composition fraction in the document), and a function of an interaction parameter ($\chi$) (see, for example, Bates, "Polymer-Polymer Phase Behavior", Science, Vol. 251, pp. 898-905, 1991, or Strobl, "Physics of Polymers", Springer-Verlag Tokyo, 1998).

This means that when $\Delta G$ is more than zero, the two components move toward separation, whereas when $\Delta G$ is less than zero, the two component move toward mixing. In the present invention, in order to make the component (B) cover the surface due to the component (A) and make it distributed unevenly on the outermost surface of the coating film, it is more preferable that $\Delta G$ of the component (A) and the component (C) be more than zero, and from the viewpoints of further promoting the separation and reducing the disturbance at the interface of the layer, $\Delta G$ is more preferably 0.01 or more.

The functional group included in the curable binder of the component (C) is preferably a photo-, electron beam-, or radiation-polymerizable functional group, and among these, a photopolymerizable functional group is preferred.

Examples of the photopolymerizable functional group include unsaturated polymerizable functional groups such as a (meth)acryloyl group, a vinyl group, a styryl group, and an allyl group, and among these, a (meth)acryloyl group is preferred.

From the viewpoint of improving the scratch resistance, it is preferable that a compound having at least a plurality of unsaturated double bonds in the molecule be included as the curable binder of the component (C).

Specific examples of the curable binder having a photopolymerizable functional group include:

(meth)acrylic acid diesters of alkylene glycol, such as neopentyl glycol acrylate, 1,6-hexanediol (meth)acrylate, and propylene glycol di(meth)acrylate;

(meth)acrylic acid diesters of polyoxyalkylene glycol, such as triethylene glycol di(meth)acrylate, dipropylene glycol di(meth)acrylate, polyethylene glycol di(meth) acrylate, and polypropylene glycol di(meth)acrylate;

(meth)acrylic acid diesters of polyhydric alcohols, such as pentaerythritol di(meth)acrylate; and (meth)acrylic acid diesters of ethylene oxide or propylene oxide adducts, such as 2,2-bis{4-(acryloxy•diethoxy) phenyl}propane and 2,2-bis{4-(acryloxypoly•propoxy) phenyl}propane.

Moreover, epoxy(meth)acrylates, urethane (meth)acrylates, and polyester(meth)acrylates may also be preferably used as the photopolymerizable polyfunctional monomer.

Among these, esters of polyhydric alcohols and (meth) acrylic acids are preferred, and polyfunctional monomers having three or more (meth)acryloyl groups within one molecule are more preferred. Specific examples thereof include trimethylolpropane tri(meth)acrylate, trimethylolethane tri (meth)acrylate, 1,2,4-cyclohexane tetra(meth)acrylate, pentaglycerol triacrylate, pentaerythritol tetra(meth)acrylate, pentaerythritol tri(meth)acrylate, (di)pentaerythritol triacrylate, (di)pentaerythritol pentaacrylate, (di)pentaerythritol tetra(meth)acrylate, (di)pentaerythritol hexa(meth)acrylate, tripentaerythritol triacrylate, and tripentaerythritol hexatriacrylate. In the present specification, the terms "(meth)acrylate", "(meth)acrylic acid", and "(meth)acryloyl" mean "acrylate or methacrylate", "acrylic acid or methacrylic acid", and "acryloyl or methacryloyl", respectively.

As for the monomer binder, monomers differing in the refractive index may be used for controlling the refractive index of each layer. In particular, examples of the high refractive index monomer include bis(4-methacryloylthiophenyl) sulfide, vinyl naphthalene, vinyl phenyl sulfide, and 4-methacryloxyphenyl-4'-methoxyphenylthioether.

In addition, dendrimers described, for example, in JP2005-76005A and JP2005-36105A, and norbornene ring-containing monomers described, for example, in JP2005-60425A may also be used. The polyfunctional monomers may be used in combination of two or more kinds thereof.

For the contents of the component (A), the component (B), and the component (C) in the coating composition of the present invention, the mass ratio of [component (A)+component (B)]/[component (C)] is from 1/199 to 60/40 from the viewpoints of forming two or more layers having different refractive indices in a single coating step and providing hard coating properties, it is preferably from 1/199 to 50/50, more preferably from 1/99 to 19/81, and still more preferably from 1/99 to 10/90.

For the mass ratio of the component (A), the component (B), the component (C), and the component (E) as described later that are used in the coating composition of the present invention, [component (A)+component (B)+component (E)]/ [component (C)] is preferably from 1/199 to 60/40, more preferably from 1/199 to 50/50, still more preferably from 1/99 to 19/81, and particularly preferably from 1/99 to 10/90.

<Component (D): Solvent>

As the solvent (D) used in the present invention, various solvents can be used, for example, in that they can dissolve or disperse the respective components therein, in that they easily form a uniform surface state in the coating step and a drying step, in that they can ensure a solution preservation property, and in that they have appropriate saturated vapor pressures.

The solvent may be used singly or in combination of two or more kinds thereof.

The component (D) is preferably a solvent mixture of at least two or more kinds of the following solvents.

(D-1): A volatile solvent having a difference in the solubility parameter from any one of the component (A) and the component (C) of 1 to 10. (D-2): A volatile solvent having a boiling point of 100° C. or lower.

In addition, (D-3): a volatile solvent having a boiling point of higher than 100° C. may also be preferably included.

Particularly, from the viewpoint of drying load, a solvent having a boiling point of 100° C. or lower at a normal pressure and room temperature as a main component and a solvent having a boiling point of 100° C. or higher so as to adjust the drying speed in a small amount (1 to 50 parts by mass, more preferably 2 to 40 parts by mass, and particularly preferably 3 to 30 parts by mass, of a solvent having a boiling point of 100° C. or higher with respect to 100 parts by mass of a solvent) are preferably included. The difference of the boiling points of the two kinds of solvents is preferably is 25° C. or higher, particularly preferably 35° C. or higher, and more preferably 50° C. or higher. By using a combination of at least two kinds of organic solvent having different boiling points, uneven distribution of the inorganic fine particles in the upper part and separation of the binder is easily performed. Further, a solvent having a difference in the solubility parameter from 1.0 to 10 from the component (A) or the component (C) in a small amount (1 to 50 parts by mass, more preferably 2 to 40 parts by mass, and particularly preferably 3 to 30 parts by mass, of a solvent having a boiling point of 100° C. or lower with respect to 100 parts by mass of a solvent) is preferably included. By adding a solvent having poor solubility, the binder separating properties are promoted.

Examples of the solvent having a boiling point of 100° C. or lower include hydrocarbons such as hexane (boiling point: 68.7° C.), heptane (98.4° C.), cyclohexane (80.7° C.), and benzene (80.1° C.); halogenated hydrocarbons such as dichloromethane (39.8° C.), chloroform (61.2° C.), carbon tetrachloride (76.8° C.), 1,2-dichloroethane (83.5° C.), and trichloroethylene (87.2° C.); ethers such as diethyl ether (34.6° C.), diisopropyl ether (68.5° C.), dipropyl ether (90.5° C.), and tetrahydrofuran (66° C.); esters such as ethyl formate (54.2° C.), methyl acetate (57.8° C.), ethyl acetate (77.1° C.), isopropyl acetate (89° C.), and dimethyl carbonate (90.3° C.); ketones such as acetone (56.1° C.) and methyl ethyl ketone (79.6° C.); alcohols such as methanol (64.5° C.), ethanol (78.3° C.), 2-propanol (82.4° C.), and 1-propanol (97.2° C.); cyano compounds such as acetonitrile (81.6° C.) and propionitrile (97.4° C.); and carbon disulfide (46.2° C.). Among these, ketones and esters are preferred, and ketones are particularly preferred. Among the ketones, 2-methyl ethyl ketone is particularly preferred.

Examples of the solvent having a boiling point of 100° C. or higher include octane (125.7° C.), toluene (110.6° C.), xylene (138° C.), tetrachloroethylene (121.2° C.), chlorobenzene (131.7° C.), dioxane (101.3° C.), dibutyl ether (142.4° C.), isobutyl acetate (118° C.), cyclohexanone (155.7° C.), 2-methyl-4-pentanone (same as MIBK, 115.9° C.), 1-butanol (117.7° C.), N,N-dimethylformamide (153° C.), N,N-dimethylacetamide (166° C.), and dimethyl sulfoxide (189° C.). Among these, cyclohexanone and 2-methyl-4-pentanone are preferred.

In the present invention, it is preferable to use a volatile solvent having a difference in SP values (solubility parameters) from any one of the component (A) and the component (C) of 1 to 10.

As a solvent having a difference in the solubility parameter from the component (A) from 1.0 to 10, a solvent having an absolute value of the solubility parameter from 20 to 30 is preferred; a solvent having an absolute value of the solubility parameter from 21 to 27 is more preferred; and a solvent having an absolute value of the solubility parameter from 22 to 26 is still more preferred. Examples thereof include propylene glycol monoethyl ether (solubility parameter=23.05), ethyl acetate (solubility parameter=23.65), methanol (solubility parameter=28.17), ethanol (solubility parameter=25.73), and 2-butanol (solubility parameter=22.73), and preferably propylene glycol monoethyl ether.

While the coating composition is coated and the drying proceeds, a solvent having an absolute value of the solubility parameter of 20 or more has a strong tendency to have reduced compatibility with the component (A), and in order to enhance the layer separating properties, it is appropriate to use a solvent having a difference in the solubility parameter of 1.0 or more. In addition, when preparing the coating composition, a solvent having an absolute value of the solubility parameter of 30 or more has an increased tendency to hardly dissolve the component (A) therein, and as a result, it is appropriate to use a solvent having a difference in the solubility parameter of 10 or less.

Furthermore, as a solvent having a difference in the solubility parameter from the component (C) from 1.0 to 10, a solvent having an absolute value of the solubility parameter from 10 to 20 is preferred, and a solvent having an absolute value of the solubility parameter from 12 to 18 is more preferred.

Examples of these solvents include 1,1,2,2-tetrafluoro-1-(2,2,2-trifluoroethoxy)ethane (solubility parameter=14.54), trifluoromethylbenzene (solubility parameter=16.76), perfluoroheptylethyl acetate (solubility parameter=14.79), 1,1,2,2,3,3,4,4,5,5,6,6-dodecafluorohexylethyl acetate (solubility parameter=16.72), and methyl trifluoroacetate (solubility parameter=15.73), and preferably 1,1,2,2-tetrafluoro-1-(2,2,2-trifluoroethoxy)ethane. By using a solvent having a difference in the solubility parameter from 1.0 to 10 in combination, it is easy to satisfy minimum requisite solubility while maintaining suitable layer separating properties.

(Solubility Parameter)

The solubility parameter is a numerical value for a degree of solubilization in a solvent or the like, and is the same concept as polarity commonly used in an organic compound. A larger solubility parameter indicates higher polarity. The component (A) used in the present invention is preferably a fluorine-containing polymer, and the solubility parameter as calculated by a Fedor calculation method is, for example, 19 or less. The mixture DPHA:dipentaerythritol pentaacrylate and dipentaerythritol hexaacrylate of the component (C) as described in the item above has a solubility parameter of 21.4. The SP value above is a value calculated by, for example, a calculation method of Fedor (SP value Base-Application and Calculation Method p. 66: Hideki Yamamoto: Johokiko Co., Ltd., (published Mar. 31, 2005).

Regarding its blending ratio, the organic solvent that is component (D) in the coating composition of the present invention is preferably added such that the solid content concentration of the coating composition is from 2 to 70% by mass; more preferably added such that the solid content concentration of the coating composition is from 3 to 60% by mass; and particularly preferably added such that the solid content concentration of the coating composition is from 5 to 50% by mass. When the solid content concentration is too low, there is a fear, for example, that time will be taken for a step of drying the coating film, or unevenness in the film thickness (state where the film thickness is uneven) will easily occur. Further, when the solid content concentration is too high, there is a fear, for example, that uneven distribution of the inorganic fine particles in the coating film will not occur sufficiently, the coating amount will be low, or the coating unevenness will be easily shown.

<Curable Compound Containing Fluorine Atom (E)>

The coating composition of the present invention preferably contains a fluorine atom-containing curable compound as a component (E). By incorporating the component (E), the uneven distribution of the component (A) and the component (B) in the upper part is improved and the failure in the surface state is reduced, and there is also an effect of providing the layer having uneven distribution in the upper part of the layer with a low refractive index. Further, in order to improve the scratch resistance of the antireflection film in the present invention, it is preferable to make the fluorine atom-containing curable compound (E) be distributed unevenly in the upper part in the coating film so as to enhance the hardness of the outermost layer or the slip characteristic.

The fluorine atom-containing curable compound (E) may be any one of a polymer and a monomer, but in the case of a fluorine-containing polymer, a polymer has a molecular weight of 1000 or more, and has a fluorine-containing moiety and a moiety having a functional group capable of taking part in a crosslinking reaction. On the other hand, when a fluorine-containing monomer is used, the polymerizable group of the polyfunctional fluorine monomer preferably has any group selected from an acryloyl group, a methacryloyl group, and —C(O)OCH=$CH_2$.

Furthermore, as a component (E), a fluorine-containing polymer and a fluorine-containing monomer may be mixed and used, each of which will be described in detail below.

[Fluorine-Containing Polymer]

The fluorine-containing polymer that can be used as a component (E) preferably has a structure represented by the following general formula (3).

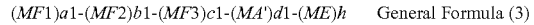

$(MF1)_{a1}$-$(MF2)_{b1}$-$(MF3)_{c1}$-$(MA')_{d1}$-$(ME)_h$     General Formula (3)

In the general formula (3), a1, b1, c1, d1, and h each represent the molar fraction of the respective constituents, representing values satisfying the relationships of $0 \leq a1 \leq 70$, $0 \leq b1 \leq 70$, $30 \leq a1+b1 \leq 70$, $0 \leq c1 \leq 50$, $5 \leq d1 \leq 50$, and $0 \leq h \leq 50$, respectively.

(MF1) represents a constituent unit that is polymerized from a monomer represented by $CF_2$=CF—$Rf_1$. $Rf_1$ represents a perfluoroalkyl group having 1 to 5 carbon atoms.

(MF2) represents a constituent unit that is polymerized from a monomer represented by $CF_2$=CF—$ORf_{12}$. $Rf_{12}$ represents a fluorine-containing alkyl group having 1 to 30 carbon atoms.

(MF3) represents a constituent unit that is polymerized from a monomer represented by $CH_2$=$CR_o$-L-$Rf_{13}$. $R_o$ represents a hydrogen atom, a halogen atom, or a methyl group, L represents a divalent linking group, and $Rf_{13}$ represents a fluorine-containing alkyl group having 1 to 20 carbon atoms.

(MA') represents a constituent unit having at least one crosslinkable group.

(ME) represents an optional constituent unit.

(MF1) to (MF3) are the same as described for the fluorine-containing polymer of the general formula (1) above, and their preferred structures or the like are also the same.

It is necessary for the fluorine atom-containing curable compound (E) to include a repeating unit having a crosslinkable moiety, and it is more preferable that the crosslinkable moiety be at least any one of a reactive group having an unsaturated double bond, a ring-opening polymerization reactive group, a group having an active hydrogen atom, a group capable of being substituted with a nucleophilic agent, and an acid anhydride.

The (MA') of the general formula (3) represents a constituent containing at least one crosslinking moiety (a reactive moiety capable of taking part in a crosslinking reaction).

Examples of the crosslinking moiety include a group having a reactive unsaturated double bond (for example, a (meth)acryloyl group, an allyl group, and a vinyloxy group), a ring-opening polymerization reactive group (for example, an epoxy group, an oxetanyl group, and an oxazolyl group), a group having an active hydrogen atom (for example, a hydroxyl group, a carboxyl group, an amino group, a carbamoyl group, a mercapto group, a β-ketoester group, and a hydrosilyl group), an acid anhydride, and a group capable of being substituted with a nucleophilic agent (for example, an active halogen atom and a sulfonic acid ester).

The crosslinking group of (MA') is preferably a polymerizable group, more preferably a group having a reactive unsaturated double bond or a ring-opening polymerization reactive group, and still more preferably a group having a reactive unsaturated double bond. Preferred specific examples of the constituent represented by (MA') include MA-1 to MA-23 in the general formula (1) above. In addition, other preferred specific examples of the constituent represented by (MA') are set forth below, but the present invention should not be construed to be limited thereto.

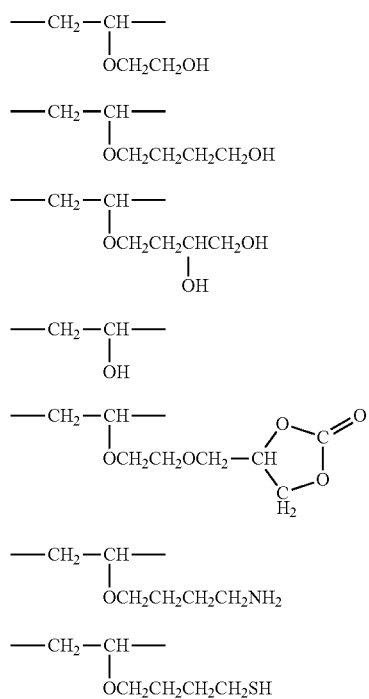

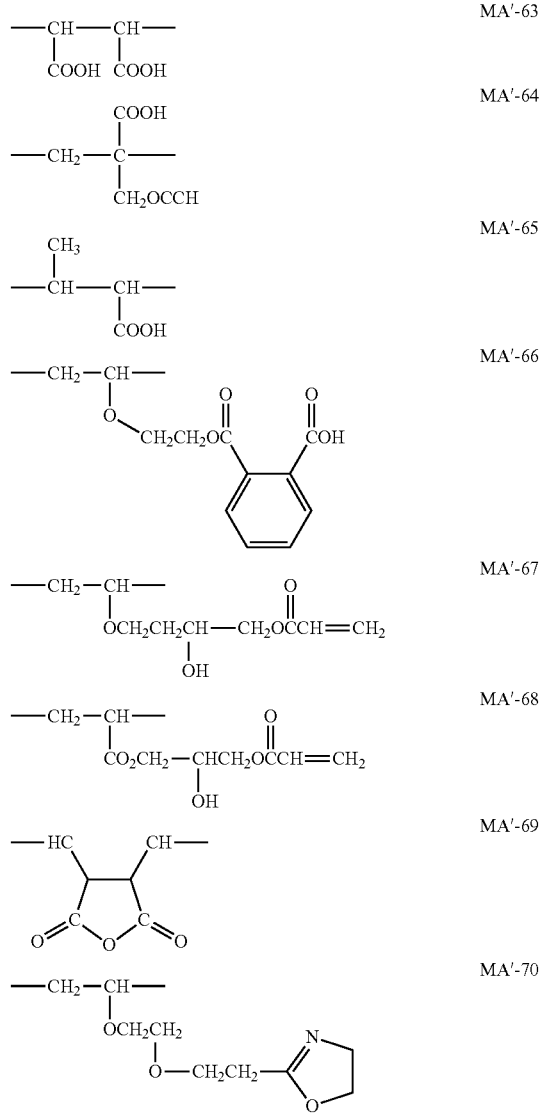

(ME) in the general formula (3) represents an optional constituent unit. (ME) is not particularly limited as long as it is a constituent unit that can be obtained from monomers copolymerizable with monomers forming constituent units represented by (MF1), (MF2), and (MF3), and monomers forming a constituent unit represented by (MA), and can be appropriately selected using adhesion property to a base material, Tg of polymer (contributing to film hardness), solubility in a solvent, transparency, slipperiness, and dust resistance/antifouling property.

Examples of the monomer for forming (ME) include vinyl ethers such as methyl vinyl ether, ethyl vinyl ether, n-butyl vinyl ether, cyclohexyl vinyl ether, and isopropyl vinyl ether, and vinyl esters such as vinyl acetate, vinyl propionate, vinyl butyrate, and vinyl cyclohexanecarboxylate.

(ME) preferably contains a constituent having a polysiloxane structure. When (ME) includes a polysiloxane structure, uneven distribution in the upper part in the coating film, and effects of low reflection of the obtained film, improvement of the surface state of the coating film, and the like, are easily attained. Further, with the polysiloxane structure, the slipperiness of a laminate and the antifouling property can be improved.

It is preferable that both of the component (A) and the component (E) be fluorine-containing copolymers and at least two kinds of the constituents forming the respective copolymers in common Particularly, when the component (A) is a fluorine-containing polymer represented by the general formula (1), all of the respective components of the component (A), the component (B), and the component (E), having similar structures, are easily distributed unevenly in the upper part. In order to exhibit this effect remarkably, it is preferable that the compound of the general formula (1) and the compound of the general formula (3) have at least two kinds of the constituent units forming the respective copolymers in common and it is more preferable that the compound of the general formula (1) and the compound of the general formula (3) have at least three kinds of the constituent units forming the respective copolymers in common.

As a method for introducing a polysiloxane structure, the same method as the method as described above for the compound of the general formula (1) can be used.

In the general formula (3), a to d, a1, b1, c1, d1, and h each represent the molar fraction of the respective constituents, representing values satisfying the relationships of $0 \leq a1 \leq 70$, $0 \leq b1 \leq 70$, $30 \leq a1+b1 \leq 70$, $0 \leq c1 \leq 50$, $5 \leq d1 \leq 50$, and $0 \leq h \leq 50$, respectively.

In order to attain a low refractive index, it is preferable to increase the molar fraction (%) a1+b1 of the component (MF1) and the component (MF2), but from the standpoint of the polymerization reactivity, in a general solution-based radical polymerization reaction, the introduction is limited to about 50 to 70%, and the higher introduction rate is usually difficult. In the present invention, the lower limit of a1+b1 is preferably 40 or more, and more preferably 45 or more.

Furthermore, the introduction of (MF3) also contributes to a low refractive index. As described above, the molar fraction c of the component (MF3) satisfies $0 \leq c1 \leq 50$ and preferably $5 \leq c1 \leq 20$.

The sum of the molar ratios of the fluorine-containing monomer components of a1, b1, and c1 is preferably in the range of $40 \leq a1+b1+c1 \leq 90$, and more preferably $50 \leq a1+b1+c1 \leq 75$.

When the ratio of the polymer unit represented by (MA') is too small, the strength of the cured film is weakened. In the present invention, particularly, the molar fraction of the component (MA') is preferably in the range of $5 \leq d1 \leq 40$, and particularly preferably in the range of $15 \leq d1 \leq 30$.

The molar fraction h of the optional constituent represented by (ME) is preferably in the range of $0 \leq h \leq 50$, more preferably in the range of $0 \leq h \leq 20$, and still more preferably in the range of $0 \leq h \leq 10$.

According to the present invention, it is preferable that the fluorine atom-containing curable compound (E) have a functional group with high polarity in its molecule from the standpoint of improvement of the surface state of a coating film and improvement of the scratch resistance of a film. Therefore, it is preferable that (ME) have a functional group with high polarity in its molecule. As the functional group with high polarity, a hydroxyl group, an alkylether group, a glycidyl group, an oxatanyl group, or a carboxyl group is preferred, and a hydroxyl group or an alkylether group is more preferred.

The molar fraction of the polymerization unit having the functional group is preferably from 0.1 to 15%, and more preferably from 1 to 10%.

Furthermore, as described above, it is preferable to introduce a polysiloxane structure into the fluorine-containing polymer from the standpoint of the surface state of the coating film and the scratch resistance. The content of the polysiloxane structure in the fluorine-containing polymer is preferably from 0.5 to 15% by mass, and more preferably from 1 to 10% by mass, in terms of a mass ratio with respect to the entire polymer.

The number average molecular weight of the fluorine-containing polymer is preferably from 1,000 to 1,000,000, more preferably 5,000 to 500,000, and still more preferably from 10,000 to 100,000.

Specific examples of the copolymer represented by the general formula (3) are set forth below, but the present invention should not be construed to be limited thereto. Incidentally, in Table 2 below, the copolymer is denoted by a combination of the monomers (MF1), (MF2), and (MF3), and the constituents (MA') and (ME) that form the fluorine-containing polymer represented by the general formula (3) by polymerization. In the Table, a to d represent the molar ratio (%) of monomers of the respective components. Further, an indication of wt % for the component (ME) in the Table means % by mass of the component in the entire polymer. With respect to the component(s) other than EVE in the column of "(ME)" in Table 2, the contents (% by mass: wt %) of the components in the entire polymer are indicated in the order from the left to the right following the molar ratio of EVE in the column "h".

TABLE 2

|  | (MF1) | (MF2) | (MF3) | (MA') | (ME) | a | b | c | d | h | (Mw) |
|---|---|---|---|---|---|---|---|---|---|---|---|
| P-1 | HFP | — | — | (MA-8) | EVE | 50 | — | — | 30 | 20 | 2.0 |
| P-2 | HFP | — | — | (MA-8) | EVE/VPS-1001 | 50 | — | — | 30 | 20/2 wt % | 2.3 |
| P-3 | HFP | FPVE | — | (MA-8) | EVE/VPS-1001 | 45 | 5 | — | 30 | 20/2 wt % | 2.2 |
| P-4 | HFP | FPVE | — | (MA-8) | EVE/VPS-0501 | 45 | 5 | — | 30 | 20/2 wt % | 2.0 |
| P-5 | HFP | FPVE | — | (MA-8) | EVE/FM-0721 | 45 | 5 | — | 30 | 20/2 wt % | 2.0 |
| P-6 | HFP | FPVE | — | (MA-8) | EVE/FM-0725 | 45 | 5 | — | 30 | 20/2 wt % | 2.5 |
| P-7 | HFP | FPVE | MF3-3 | (MA-8) | EVE/FM-0721 | 45 | 5 | 5 | 30 | 15/2 wt % | 2.0 |
| P-8 | HFP | FPVE | — | (MA-9) | EVE/FM-0721 | 45 | 5 | — | 30 | 20/2 wt % | 2.0 |
| P-9 | HFP | FPVE | — | (MA-8)/(MA-56) | EVE/FM-0721 | 45 | 5 | — | 25/5 | 20/2 wt % | 1.9 |
| P-10 | HFP | — | — | (MA-1) | EVE | 50 | — | — | 35 | 15 | 2.2 |
| P-11 | HFP | — | — | (MA-1) | EVE/VPS-1001 | 50 | — | — | 35 | 15/2 wt % | 2.3 |
| P-12 | HFP | FPVE | — | (MA-1) | EVE/VPS-1001 | 45 | 5 | — | 35 | 15/2 wt % | 2.1 |
| P-13 | HFP | FPVE | — | (MA-1) | EVE/VPS-0501 | 45 | 5 | — | 35 | 15/2 wt % | 2.0 |
| P-14 | HFP | FPVE | — | (MA-1) | EVE/FM-0721 | 45 | 5 | — | 35 | 15/2 wt % | 2.1 |
| P-15 | HFP | FPVE | — | (MA-1) | EVE/FM-0725 | 45 | 5 | — | 35 | 15/2 wt % | 2.4 |
| P-16 | HFP | FPVE | MF3-3 | (MA-1) | EVE/FM-0721 | 45 | 5 | 5 | 35 | 10/2 wt % | 2.0 |
| P-17 | HFP | FPVE | — | (MA-2) | EVE/FM-0721 | 45 | 5 | — | 35 | 15/2 wt % | 2.2 |
| P-18 | HFP | FPVE | — | (MA-1)/(MA-56) | EVE/FM-0721 | 45 | 5 | — | 30/5 | 15/2 wt % | 2.0 |
| P-19 | HFP | — | — | (MA-56) | EVE | 50 | — | — | 25 | 25 | 2.6 |
| P-20 | HFP | — | — | (MA-56) | EVE/VPS-1001 | 50 | — | — | 25 | 25/2 wt % | 2.7 |

TABLE 2-continued

|  | (MF1) | (MF2) | (MF3) | (MA') | (ME) | a | b | c | d | h | (Mw) |
|---|---|---|---|---|---|---|---|---|---|---|---|
| P-21 | HFP | FPVE | — | (MA-56) | EVE/VPS-1001 | 45 | 5 | — | 25 | 25/2 wt % | 2.7 |
| P-22 | HFP | FPVE | — | (MA-56) | EVE/VPS-0501 | 45 | 5 | — | 25 | 25/2 wt % | 2.5 |
| P-23 | HFP | FPVE | — | (MA-56) | EVE/FM-0721 | 45 | 5 | — | 25 | 25/2 wt % | 2.5 |
| P-24 | HFP | FPVE | — | (MA-56) | EVE/FM-0725 | 45 | 5 | — | 25 | 25/2 wt % | 2.7 |
| P-25 | HFP | FPVE | MF3-3 | (MA-56) | EVE/FM-0721 | 40 | 5 | 5 | 25 | 25/2 wt % | 2.7 |
| P-26 | HFP | FPVE | — | (MA-57) | EVE/FM-0721 | 45 | 5 | — | 25 | 25/2 wt % | 2.6 |
| P-27 | HFP |  |  | (MA-21) | EVE/FM-0721 | 50 | — | — | 30 | 20/2 wt % | 2.6 |
| P-28 | HFP |  |  | (MA-22) | EVE/FM-0721 | 50 | — | — | 30 | 20/2 wt % | 2.4 |

(Mw) represents mass average molecular weight. (Value in ten thousands)
The respective abbreviations in the Table above indicate the following:
HFP: Hexafluoropropylene
FPVE: Perfluoropropyl vinyl ether
EVE: ethyl vinyl ether
VPS-1001: Azo group-containing polydimethylsiloxane, molecular weight of polysiloxane moiety: about 10,000, manufactured by Wako Pure Chemicals Industries, Ltd.
FM-0721: Methacryloyl-modified dimethylsiloxane, average molecular weight: 5,000, manufactured by Chisso Corp.
FM-0725: One-end methacryloyl-modified dimethylsiloxane, average molecular weight: 10000, manufactured by Chisso Corp.
VPS-0501: Azo group-containing polydimethylsiloxane, molecular weight of polysiloxane moiety: about 5,000, manufactured by Wako Pure Chemicals Industries, Ltd.

Furthermore, when the fluorine-containing polymer contains a hydroxyl group as a crosslinkable group, the composition according to the present invention preferably contains a compound (curing agent) capable of reacting with the hydroxyl group in the fluorine-containing polymer.

The curing agent preferably has two or more moieties reacting with the hydroxyl group, and more preferably four or more moieties reacting with the hydroxyl group.

The structure of the curing agent is not particularly limited as long as it has the above-described number of functional groups capable of reacting with a hydroxyl group. Examples thereof include polyisocyanates; partial condensates of isocyanate compounds; multimers or polyhydric alcohols; addition products with low molecular weight polyester films or the like; blocked polyisocyanate compounds in which isocyanate groups are blocked with a blocking agent such as phenol; aminoplasts; and polybasic acids or anhydrides thereof.

As the curing agent, an aminoplast capable of undergoing a crosslinking reaction with a hydroxyl group-containing compound under an acidic condition is preferred from the standpoint of compatibility between stability in preservation and activity of a crosslinking reaction and the standpoint of strength of the film formed. The aminoplast is a compound containing an amino group which is capable of reacting with a hydroxyl group present in the fluorine-containing polymer, that is, a hydroxyalkylamino group or an alkoxyalkylamino group, or a carbon atom adjacent to a nitrogen atom and substituted with an alkoxy group. Specific examples thereof include a melamine-based compound, a urea-based compound, and a benzoguanamine-based compound.

The melamine-based compound is ordinarily known as a compound having a skeleton in which a nitrogen atom is connected to a triazine ring, and specifically includes melamine, alkylated melamine, methylolmelamine, and alkoxylated methylmelamine. In particular, methylated melamine and alkoxylated methylmelamine obtained by reacting melamine and formaldehyde under a basic condition and derivatives thereof are preferred, and alkoxylated methylmelamine is particularly preferred from the standpoint of preservation stability. Incidentally, the methylolated melamine and alkoxylated methylmelamine are not particularly limited, and various kinds of resins obtained by a method as described, for example, in "Plascic Zairyo kouza (Plastic Material Course) [8] Urea/Melamine Resins" (The Nikkan Kogyo Shimbun Ltd.) may also be used.

Furthermore, as the urea compound, in addition to urea, polymethylolated urea and alkoxylated methyl urea which is a derivative thereof, and a compound having a glycol uryl skeleton or 2-imidazolidinone skeleton which is a cyclic urea structure are also preferred. With respect to the amino compound, for example, the urea derivative, various resins described, for example, in Urea/Melamine Resins described above may be used.

As a compound which is suitably used as the curing agent, a melamine compound and a glycol uryl compound are particularly preferred from the standpoint of compatibility with the fluorine-containing polymer. In particular, it is preferable from the standpoint of reactivity that the curing agent be a compound containing a nitrogen atom and two or more carbon atoms substituted with an alkoxy group adjacent to the nitrogen atom. Particularly preferable compounds are a compound having a structure represented by the following general formula H-1 or H-2, and a partial condensate thereof.

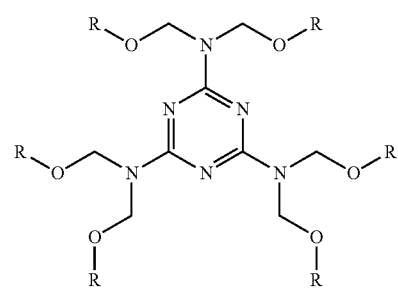

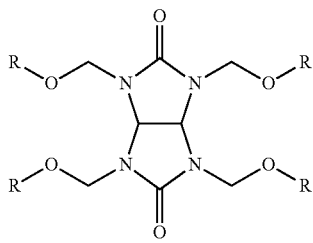

H-2

In the formulae, R represents an alkyl group having 1 to 6 carbon atoms or a hydroxyl group.

The amount of the aminoplast added to the fluorine-containing polymer is preferably from 1 to 50 parts by mass, more preferably from 3 to 40 parts by mass, and still more preferably from 5 to 30 parts by mass, based on 100 parts by mass of the fluorine-containing polymer. When the amount is 1 part by mass or more, durability as a thin layer can be sufficiently exhibited, whereas when it is 50 parts by mass or less, a low refractive index can be maintained, which is thus preferable.

In the reaction of the fluorine-containing polymer containing a hydroxyl group and the curing agent, it is preferable to use a curing catalyst. In the system, since the curing is promoted by an acid, it is desired to use an acidic substance as the curing catalyst. However, when a common acid is added, the crosslinking reaction also progresses in the coating solution to cause failure (unevenness, repellency, or the like). Therefore, in order to achieve both the preservation stability and curing activity in a thermo-curing system, it is more preferred to add a compound generating an acid by heating or a compound generating an acid by light as the curing catalyst. Specific compounds are described in paragraphs [0220] to [0230] of JP2007-298974A.

[Fluorine-Containing Monomer]

The fluorine-containing monomer that can be used as a component (E) is a compound having an atomic group (hereinafter also referred to as a "fluorine-containing core portion") mainly composed of plural fluorine atoms and carbon atoms (provided that oxygen atom(s) and/or hydrogen atom(s) may be partially contained), which is not substantially involved in polymerization, and a polymerizable group, for example, a radical polymerizable group, an ionic polymerizable group, and a condensation polymerizable group, through a linking group, for example, an ester bond or an ether bond. The fluorine-containing monomer preferably has two or more polymerizable groups.

The fluorine-containing monomer is preferably a compound (polymerizable fluorine-containing compound) represented by the following general formula (I).

$$Rf\{-(L)_m-Y\}_n \qquad \text{General Formula (I)}$$

(in the general formula (I), Rf represents an n-valent chained or cyclic group containing at least a carbon atom and a fluorine atom, which may contain at least any one of an oxygen atom and a hydrogen atom, n represents an integer of 2 or more, L represents a single bond or a divalent linking group, m represents 0 or 1, and Y represents a polymerizable group).

In the general formula (I), Y represents a polymerizable group. Y is preferably a radical polymerizable group, an ionic polymerizable group or a condensation polymerizable group, more preferably a polymerizable unsaturated group or a ring-opening polymerizable group, and still more preferably a polymerizable unsaturated group. Specifically, a group selected from a (meth)acryloyl group, an allyl group, an alkoxysilyl group, an α-fluoroacryloyl group, an epoxy group, and —C(O)OCH=CH$_2$ is still more preferred. Among them, from the standpoint of polymerizability, a (meth)acryloyl group, an ally group, an α-fluoroacryloyl group, an epoxy group or —C(O)OCH=CH$_2$ each having radical polymerizability or ionic polymerizability is more preferred, a (meth)acryloyl group, an allyl group, an α-fluoroacryloyl group or —C(O)OCH=CH$_2$ each having radical polymerizability is particularly preferred, and a (meth)acryloyl group or —C(O)OCH=CH$_2$ is most preferred.

Furthermore, the polymerizable fluorine-containing compound may be a crosslinking agent having a polymerizable group as a crosslinkable group.

Examples of the crosslinkable group include a silyl group having a hydroxyl group or a hydrolyzable group (for example, an alkoxysilyl group or an acyloxysilyl group), a group having a reactive unsaturated double bond (for example, a (meth)acryloyl group, an allyl group, and a vinyloxy group), a ring-opening polymerization reactive group (for example, an epoxy group, an oxetanyl group, and an oxazolyl group), a group having an active hydrogen atom (for example, a hydroxyl group, a carboxyl group, an amino group, a carbamoyl group, a mercapto group, a β-ketoester group, a hydrosilyl group, and a silanol group), and a group capable of being substituted with an acid anhydride or a nucleophilic agent (for example, an active halogen atom and a sulfonic acid ester).

L represents a single bond or a divalent linking group, and is preferably an alkylene group having 1 to 10 carbon atoms, an arylene group having 6 to 10 carbon atoms, —O—, —S—, —N(R)— or a divalent linking group obtained by the combination of two or more of these groups. However, R represents a hydrogen atom or an alkyl group having 1 to 5 carbon atoms.

When L represents an alkylene group or an arylene group, the alkylene group or arylene group represented by L is preferably substituted with a halogen atom, and more preferably substituted with a fluorine atom.

Here, the calculated value of the intercrosslink molecular weight refers to a total atomic weight of all atomic groups sandwiched between (a) and (a), (b) and (b), or (a) and (b), when all polymerizable groups in the polymerizable fluorine-containing compound undergo polymerization to form a polymer, wherein (a) is a carbon atom substituted with 3 or more carbon atoms and/or silicon atoms and/or oxygen atoms in total and (b) is a silicon atom substituted with 3 or more carbon atoms and/or oxygen atoms in total. When the calculated value of intercrosslink molecular weight increases, the fluorine content in the fluorine-containing monomer can be increased to reduce the reflectance and to improve the conductivity and antifouling property, although the strength and hardness of the coated film decreases to lead to insufficient scratch resistance and abrasion resistance of the surface of the coated film. On the other hand, when the calculated value of intercrosslink molecular weight decreases, the intercrosslink density increases to improve the film strength, although the fluorine content decreases to lead to increase in the reflectance. From the standpoint of crosslink density and fluorine content, thus, the calculated value of intercrosslink molecular weight when all polymerizable groups in the polymerizable fluorine-containing compound undergo polymerization is preferably 2,000 or less, more preferably less than 1,000, and most preferably more than 50 and less than 800. The polymerizable fluorine-containing compound preferably contains a carbon atom substituted with 3 or more carbon atoms and/or silicon atoms and/or oxygen atoms in total (exclusive of an oxygen atom of a carbonyl group) in its molecule. The inclusion of the carbon atom makes it possible to build a sophisticated crosslink network structure at the curing, thereby tending to increase the hardness of the coating film.

A more preferable embodiment of the polymerizable fluorine-containing compound represented by the general formula (I) includes a compound represented by the following general formula (I-1), (I-2), or (I-3).

(I-1):

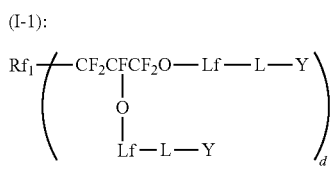

(I-2):

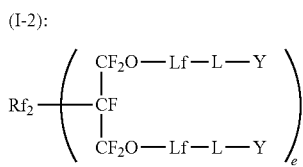

(I-3):

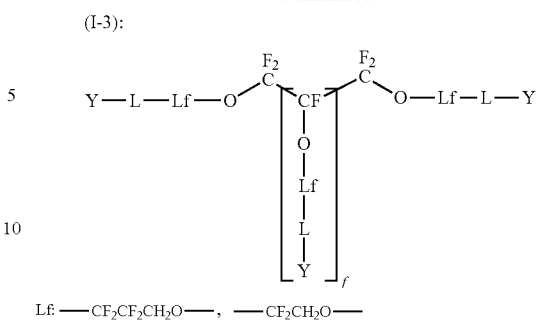

Lf: —CF$_2$CF$_2$CH$_2$O—, —CF$_2$CH$_2$O—

In the formulae (I-1) to (I-3), Rf$_1$ represents an oxygen atom, a group composed of substantially only carbon atoms and fluorine atoms, or a group composed of only carbon atoms, fluorine atoms, and oxygen atoms, each of the group being a d-valent organic group. Rf$_2$ represents an oxygen atom, a group composed of substantially only carbon atoms and fluorine atoms, or a group composed of only carbon atoms, fluorine atoms and oxygen atoms, each of the group being an e-valent organic group. In the formula, Lf represents —CF$_2$CF$_2$CH$_2$O— or —CF$_2$CH$_2$O— (binding to the oxygen atom on the carbon atom side). L and Y have the same meanings as L and Y defined in the general formula (I), respectively, d and e each independently represent an integer of 2 or more, and f represents an integer of 1 or more.

A number of carbon atoms included in Rf$_1$ and Rf$_2$ is preferably from 0 to 30, and more preferably from 0 to 10.

A still more preferable embodiment of the polymerizable fluorine-containing compound represented by the general formula (I-1), (I-2), or (I-3) includes a compound represented by the following general formula (I-1'), (I-2'), or (I-3').

(I-1'):

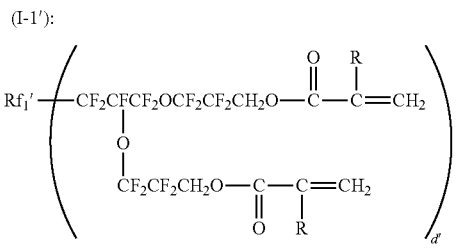

(I-2'):

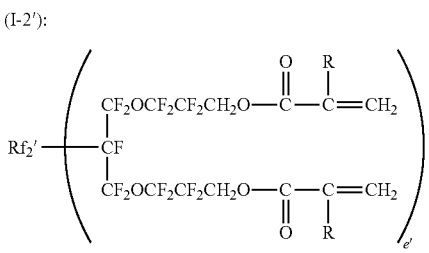

(I-3'):

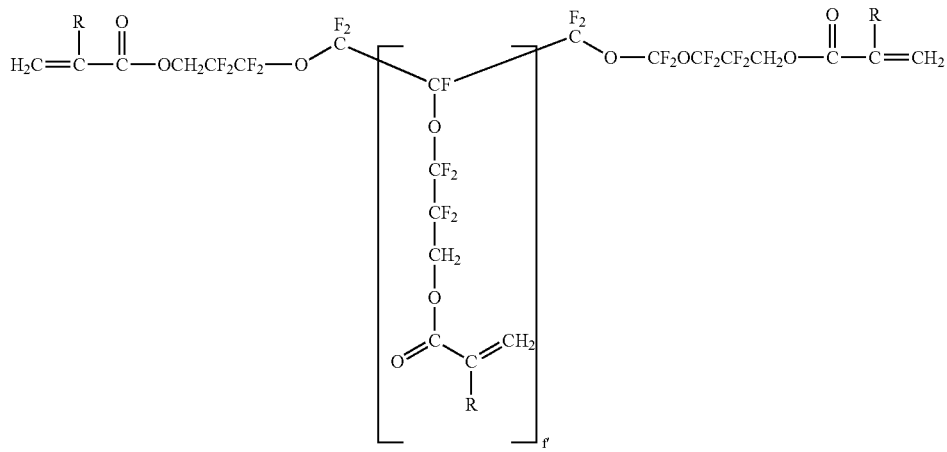

In the formulae (I-1') to (I'-3), Rf$_1$' represents an oxygen atom, a group substantially composed of only carbon atoms and fluorine atoms, or a group composed of only carbon atoms, fluorine atoms, and oxygen atoms, each of the group being a d'-valent organic group. Rf$_2$' represents an oxygen atom, a group substantially composed of only carbon atoms and fluorine atoms, or a group composed of only carbon atoms, fluorine atoms, and oxygen atoms, each of the group being an e'-valent organic group. R represents a hydrogen atom, a fluorine atom, an alkyl group (preferably an alkyl group having 1 to 5 carbon atoms) or a fluoroalkyl group (preferably a perfluoroalkyl group having 1 to 5 carbon atoms), d' and e' each independently represent an integer of 2 or 3, and f' represents an integer of 1 to 4.

A number of carbon atoms included in Rf$_1$' or Rf$_2$' is preferably from 0 to 30, and more preferably from 0 to 10.

Specific examples of the polymerizable fluorine-containing compound represented by the general formula (I) of the present invention are set forth below, but the present invention should not be construed to be limited thereto.

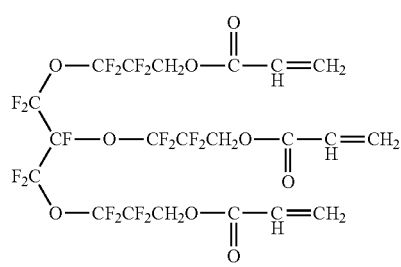

F-1

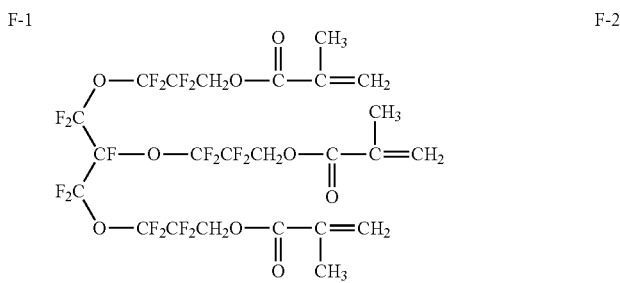

F-2

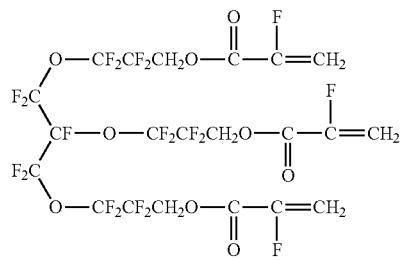

F-3

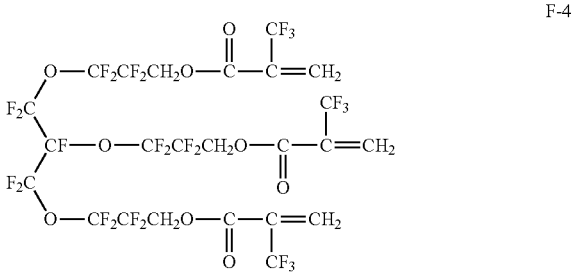

F-4

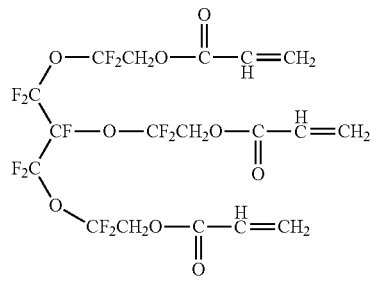

F-5

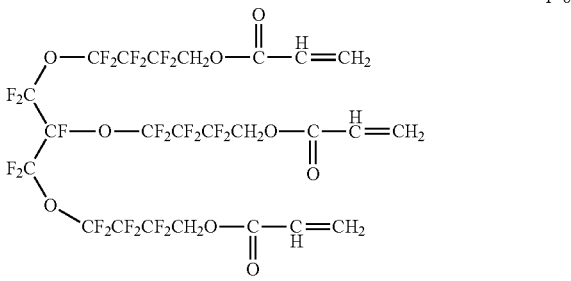

F-6

-continued
F-7
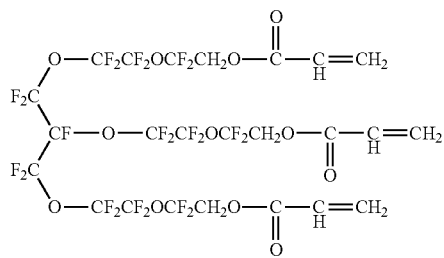
F-8
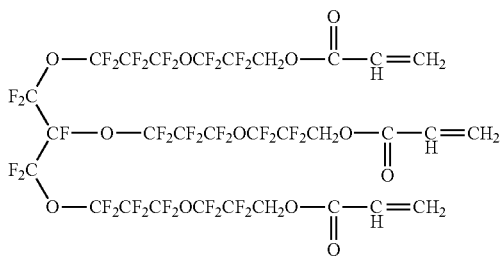
F-9
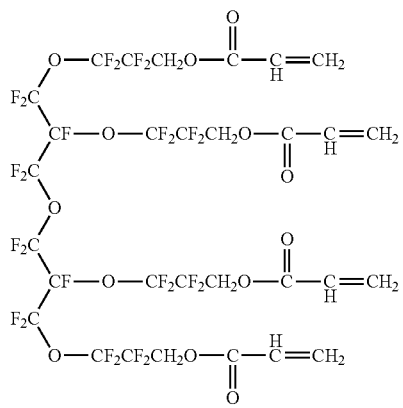
F-10
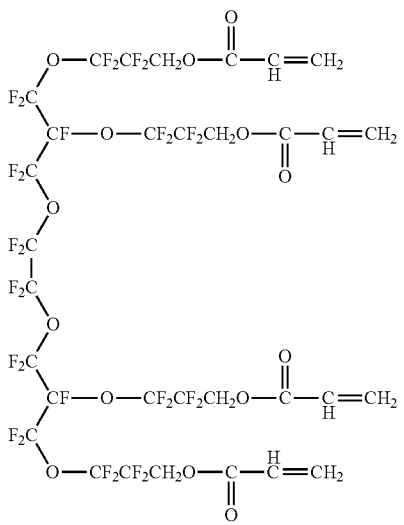
F-11
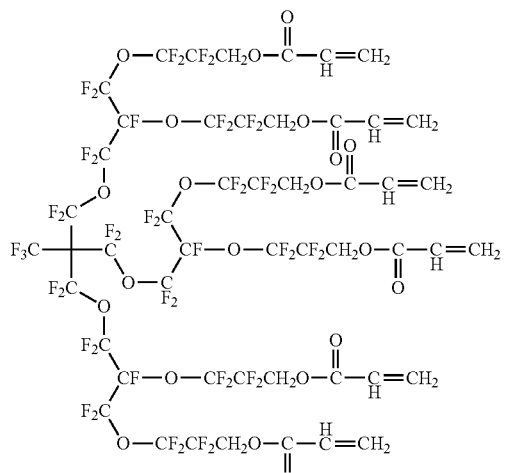
F-12
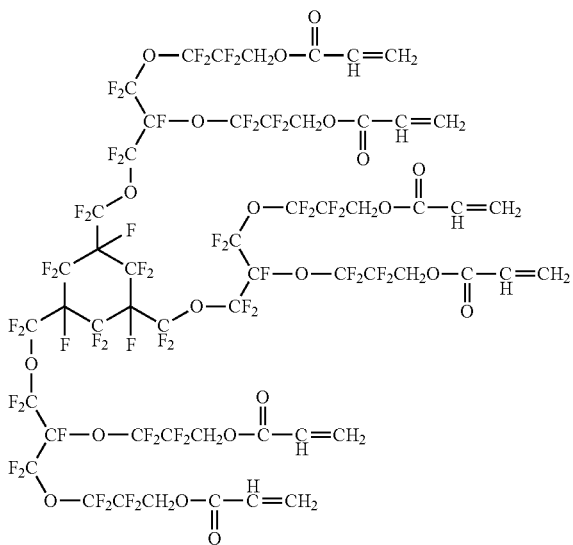

-continued
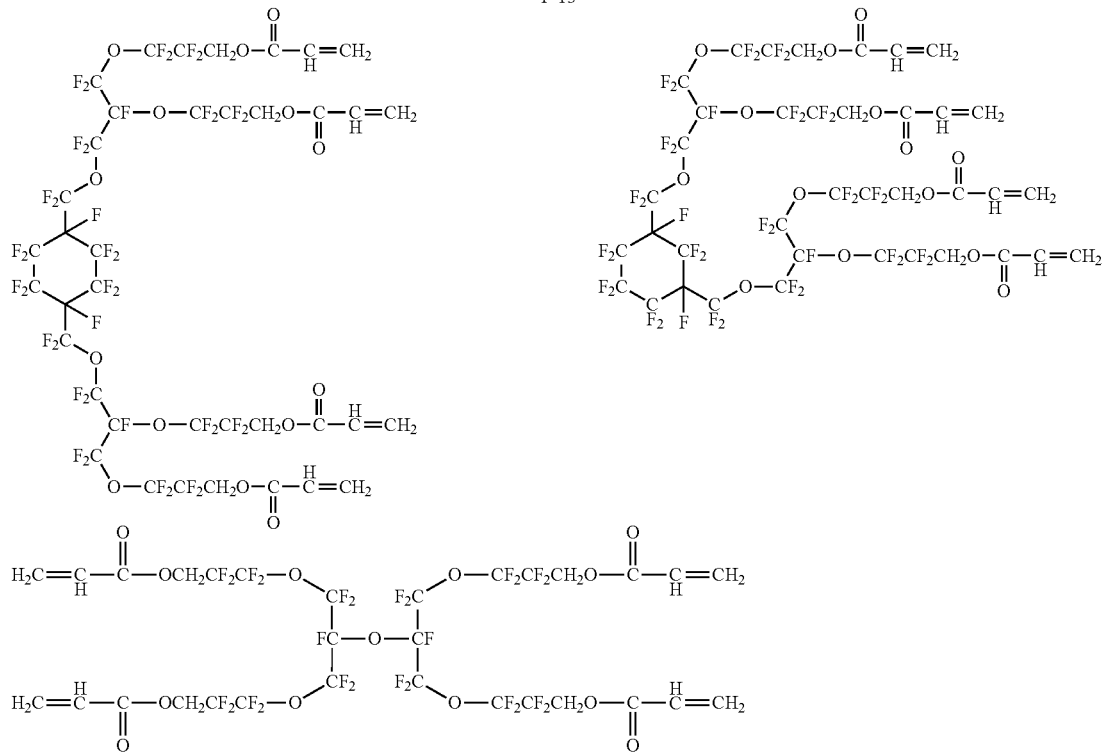
F-13
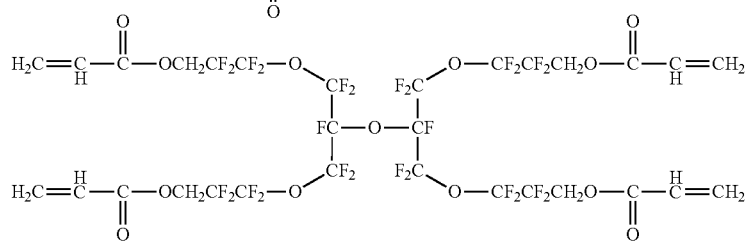
F-14
F-15
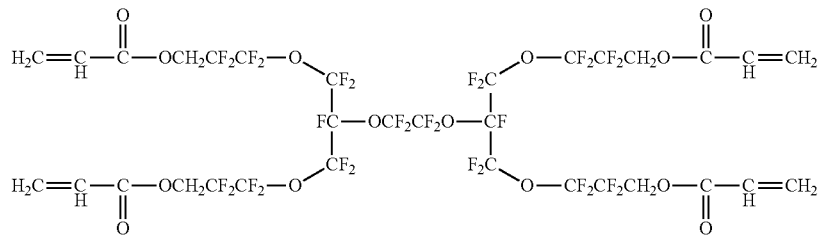
F-16
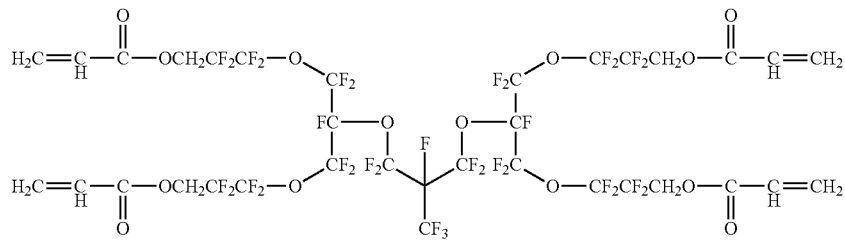
F-17
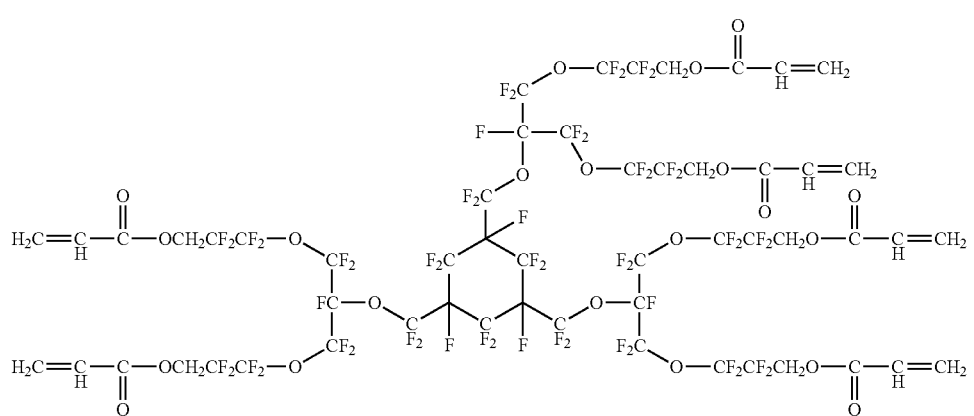
F-18

-continued
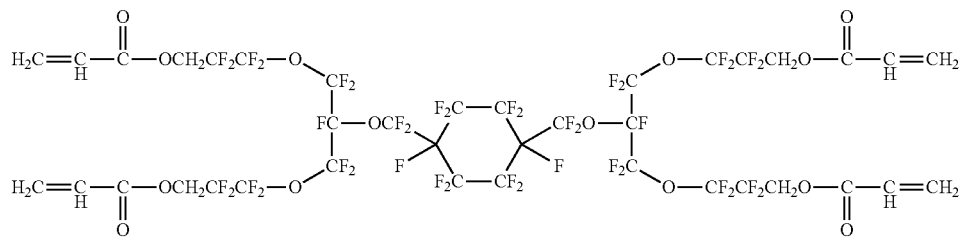
F-19
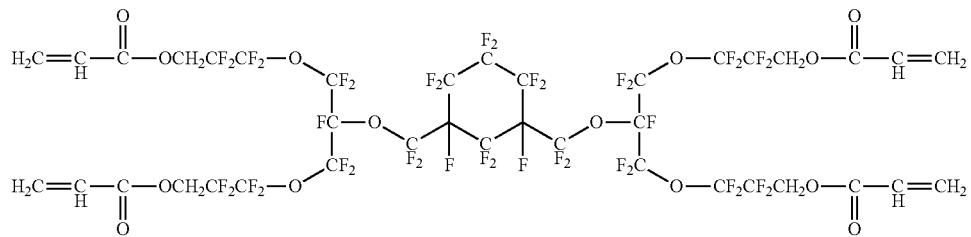
F-20
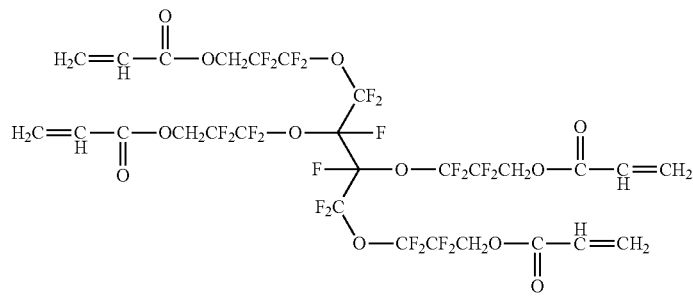
F-21
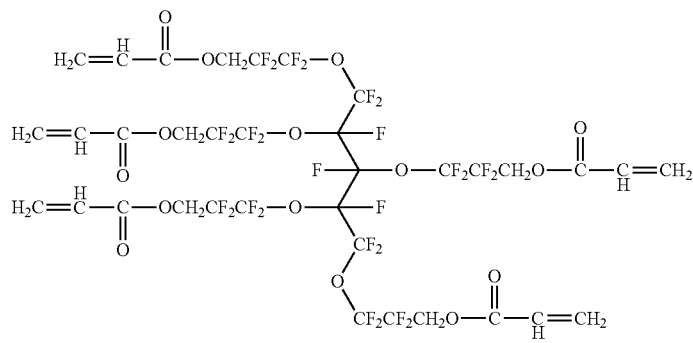
F-22
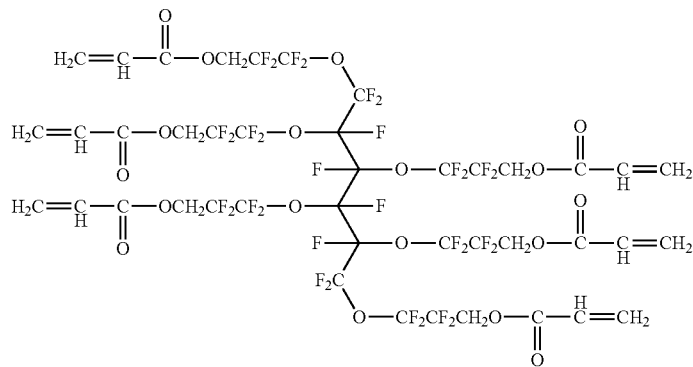
F-23

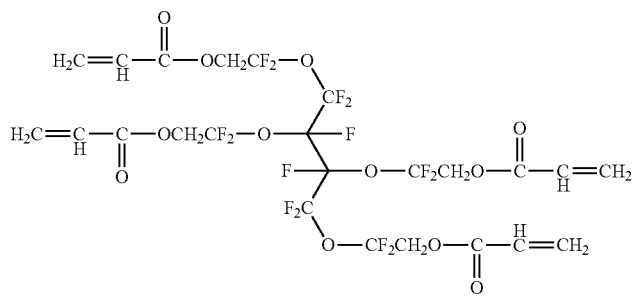

F-24

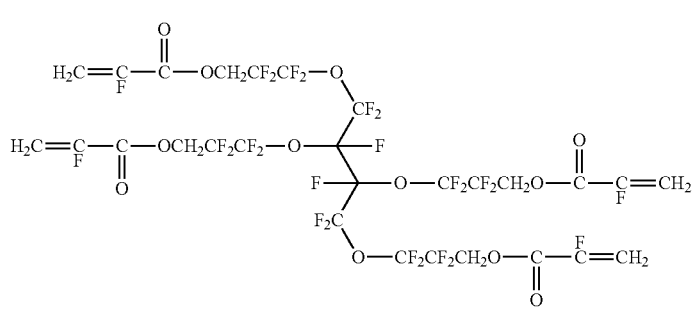

F-25

The production method of the fluorine-containing compound represented by the general formula (1) of the present invention is not particularly limited and the fluorine-containing compound can be produced, for example, by a combination of known methods as described below. In the following description, the same symbols as those used hereinbefore have the same meanings as defined above unless otherwise particularly indicated.

Step 1: A step of obtaining a methyl ester represented by $Rf(CO_2CH_3)_a$ by an aqueous phase fluorination reaction of a compound represented by $Rh(CO_2R_1)_a$ or $Rh(CH_2OCOR_2)_a$ described in U.S. Pat. No. 5,093,432A and WO00/56694A and a subsequent reaction with methanol.

(in the formula, $R_1$ represents a lower alkyl group, for example, a methyl group or an ethyl group, $R_2$ represents an alkyl group, preferably a fluorine-containing alkyl group, and more preferably a perfluoroalkyl group, and Rh represents a group capable of forming Rf by the aqueous phase fluorination reaction).

Step 2: A step of obtaining an alcohol represented by $Rf(CH_2OH)_a$ by reducing the compound represented by $Rf(CO_2CH_3)_a$ with a reducing agent, for example, lithium aluminum hydride or sodium borohydride.

Step 3: A step of obtaining a compound represented by $Rf(CH_2O-L-H)_a$ by adding as a block or at random at least one of ethylene carbonate, ethylene oxide and glycidyl alcohol to the compound represented by $Rf(CH_2OH)_a$. This step is not necessary in the case of b=c=0.

Step 4: A step of obtaining a compound $Rf(CH_2O-L-Y)_a$ represented by the general formula (1) by introducing a polymerizable group to the compound represented by $Rf(CH_2O-L-H)_a$.

Here, when Y is $-COC(R_0)=CH_2$, as the reaction of introducing a polymerizable group, an esterification reaction of the alcohol of $Rf(CH_2O-L-H)_a$ with an acid halide of $XCOC(R_0)=CH_2$ (wherein X represents a halogen atom, preferably a chlorine atom) or dehydration condensation of the alcohol of $Rf(CH_2O-L-H)_a$ with a carboxylic acid of $HOCOC(R_0)=CH_2$ can be utilized. When Y is another polymerizable group, for example, a nucleophilic substitution reaction of the alcohol of $Rf(CH_2O-L-H)_a$ with a corresponding halide can be utilized.

Preferable specific examples of the fluorine-containing monomer are set forth below, but the present invention should not be construed to be limited thereto.

Furthermore, from the standpoint of improvement of the surface state of a coating film, increase in the conductivity and improvement of the scratch resistance of the film in a case of using together with the π-conjugated system conductive polymer, in addition to X-2 to X-4, X-6, X-8 to X-14, and X-21 to X-32 described in paragraphs [0023] to [0027] of JP2006-28409A, Compound (X-33) set forth below is also preferably used as the fluorine-containing monomer.

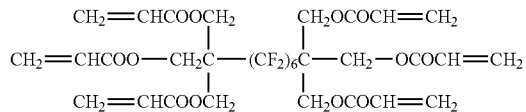

F-26

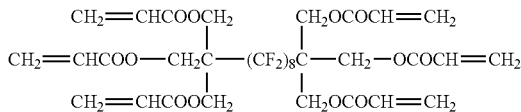

F-27

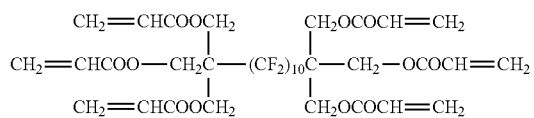
F-28
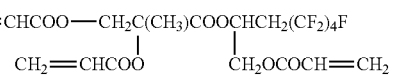
F-29
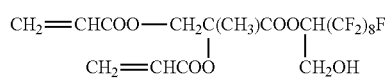
F-30
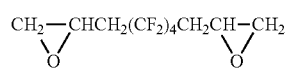
F-31
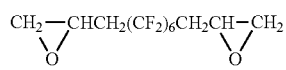
F-32
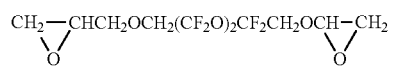
F-33
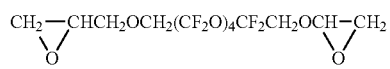
F-34
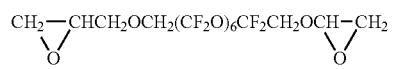
F-35
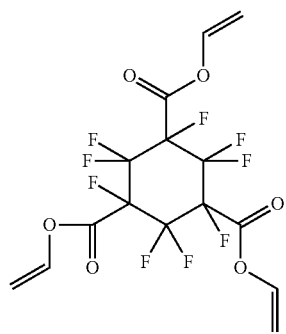
F-36
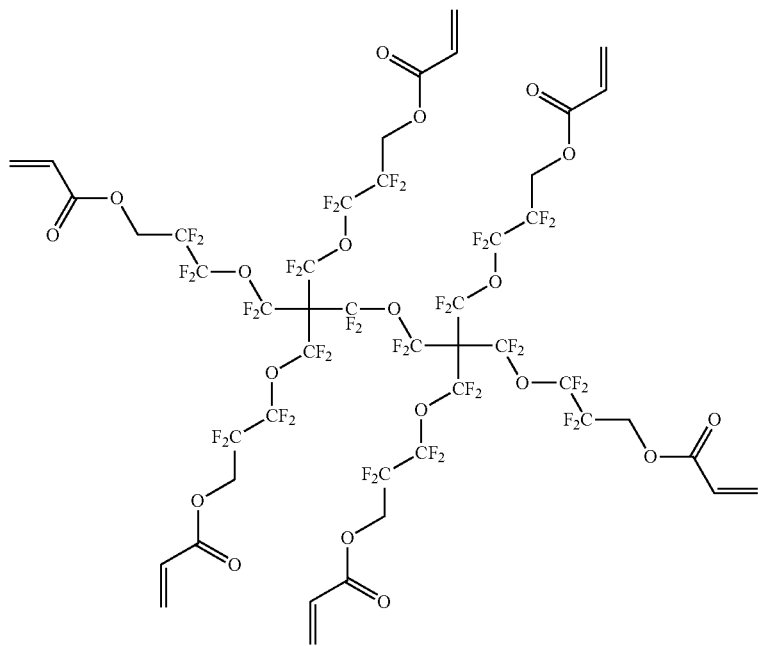
F-37

F-38
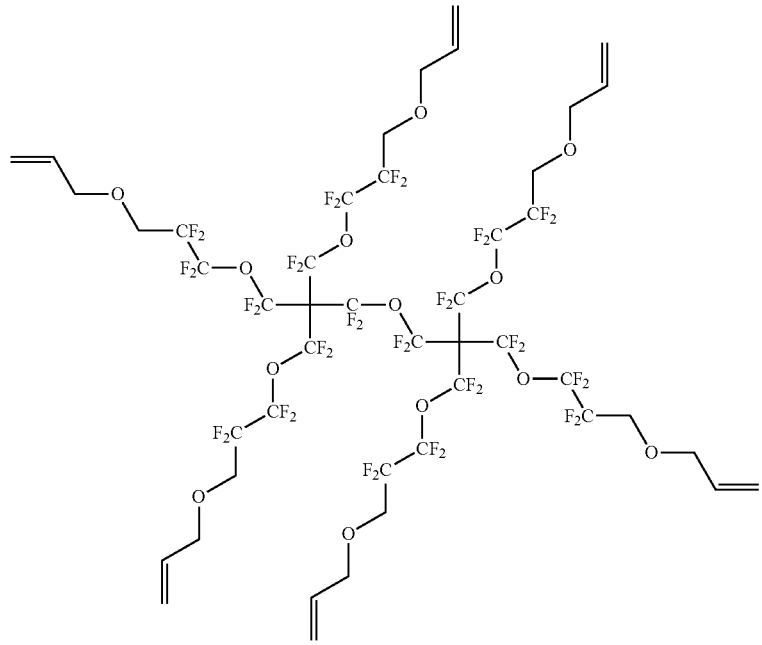
F-39
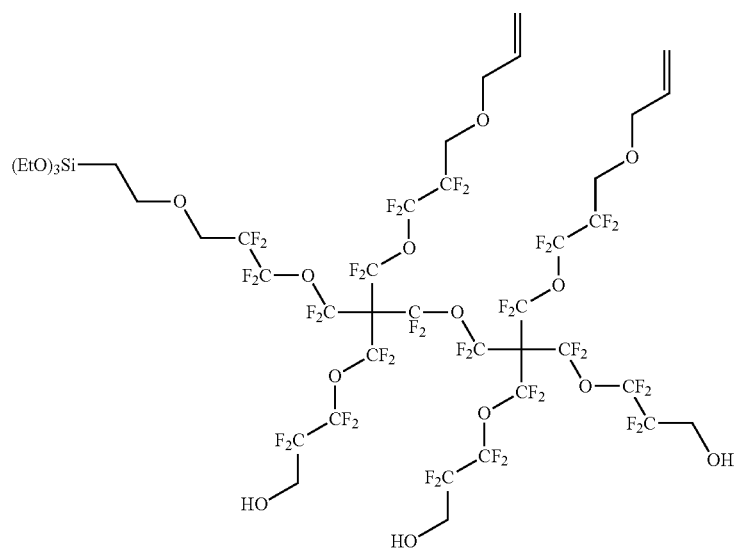

-continued
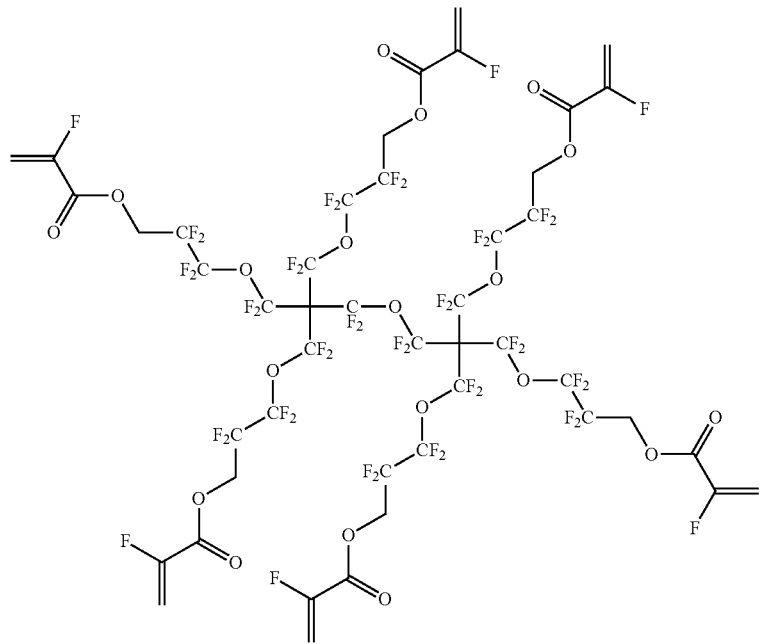
F-40
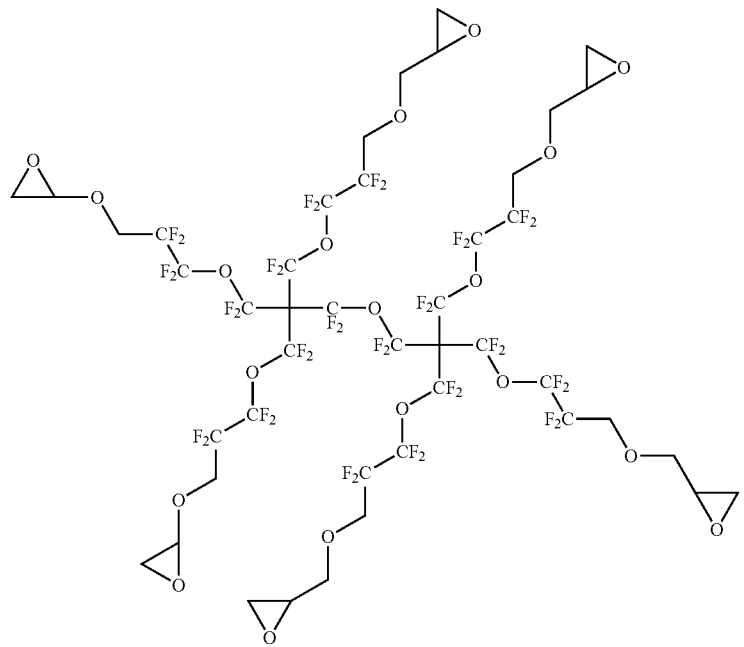
F-41

-continued
F-42
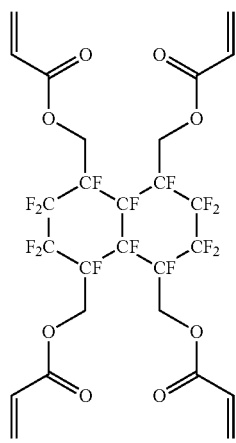
F-43
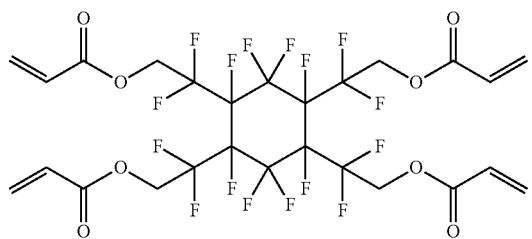
F-44
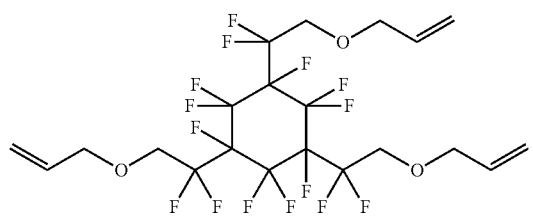
F-45
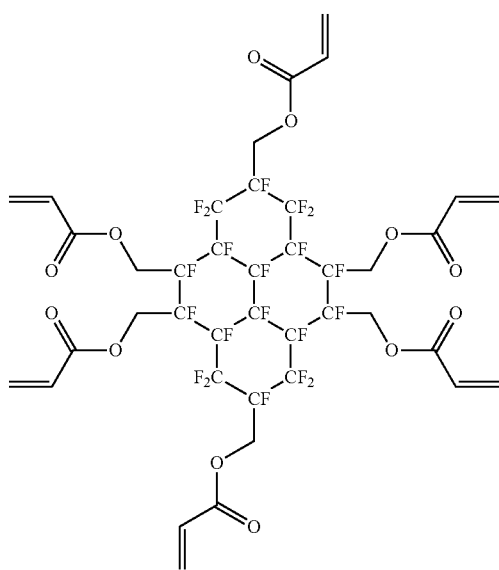
F-46
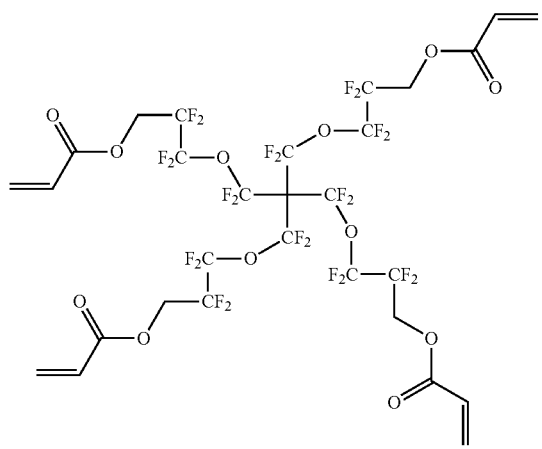
F-47
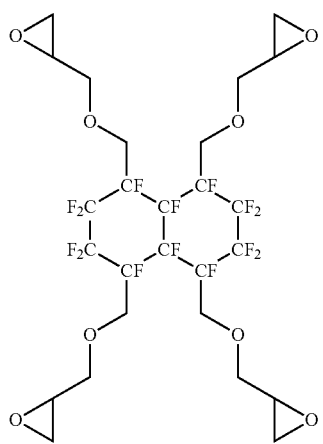

F-48
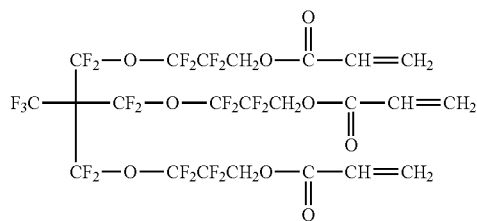
Moreover, the compounds shown below are also preferably used.
F-49
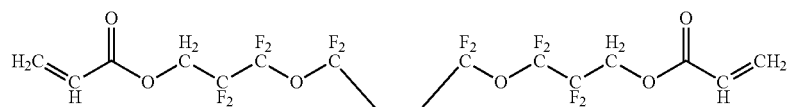
F-50
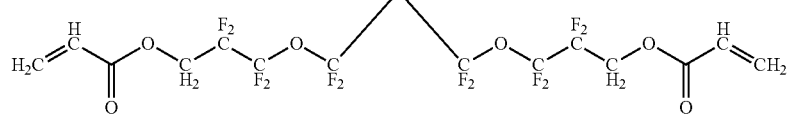
F-51
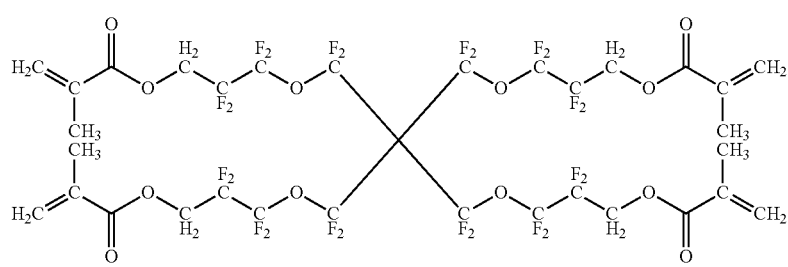
F-52
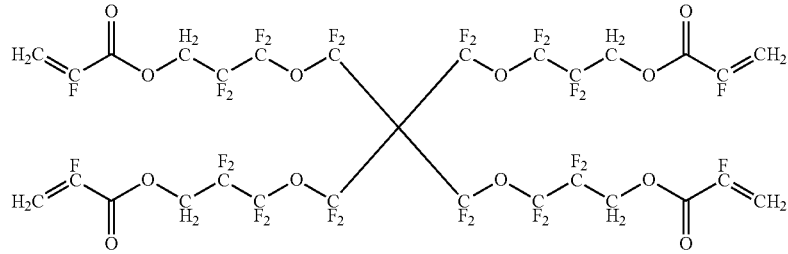
F-53
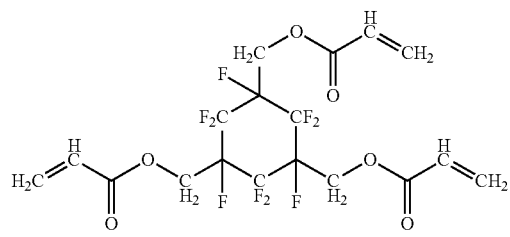
F-54
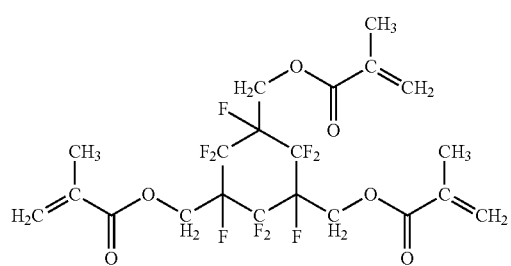

-continued
F-55
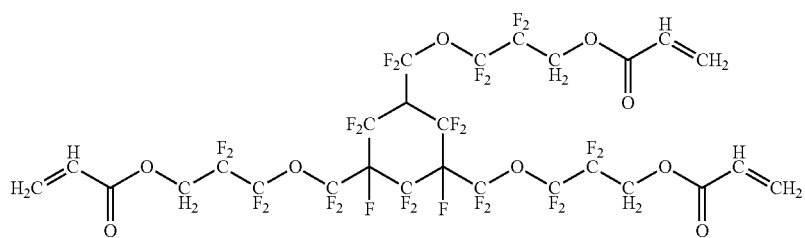
F-56
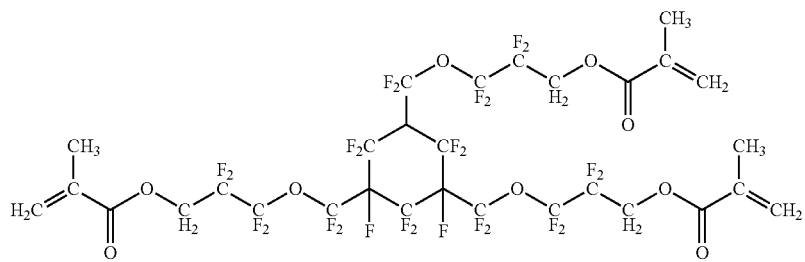
F-57
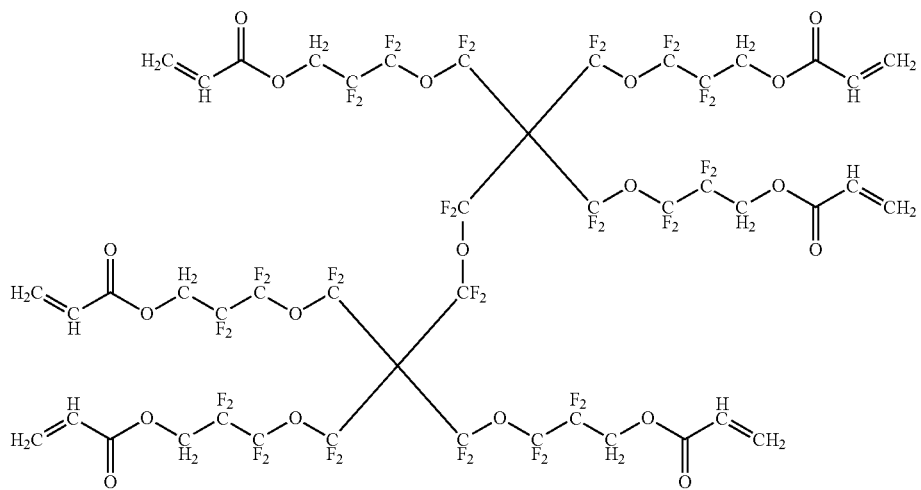
F-58
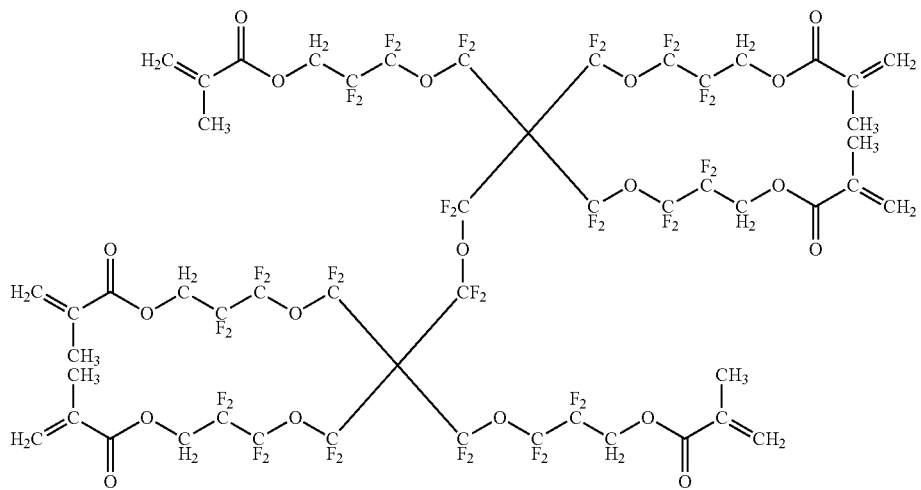

-continued
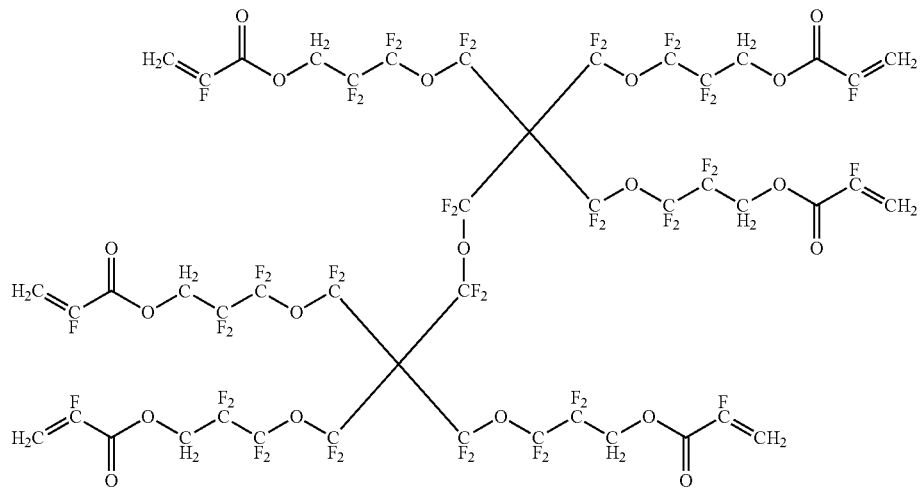
F-59
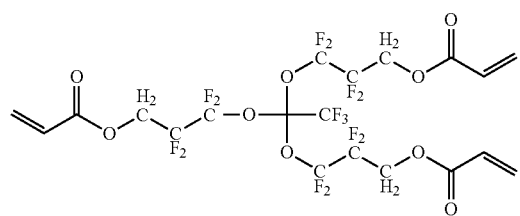
F-60
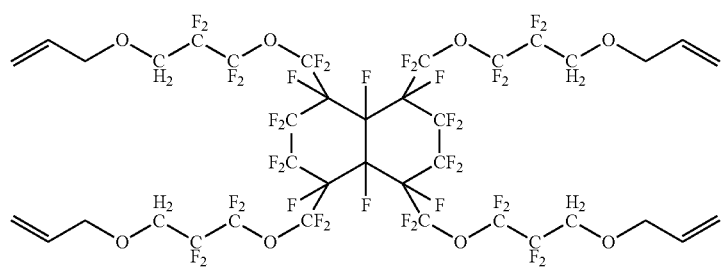
F-61
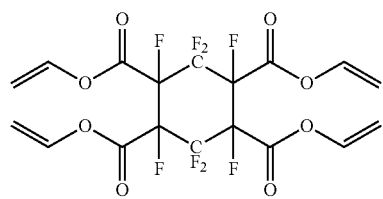
F-62
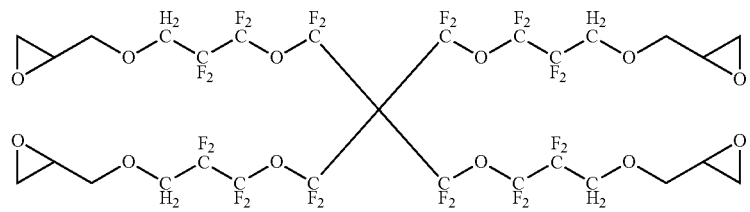
F-63

-continued
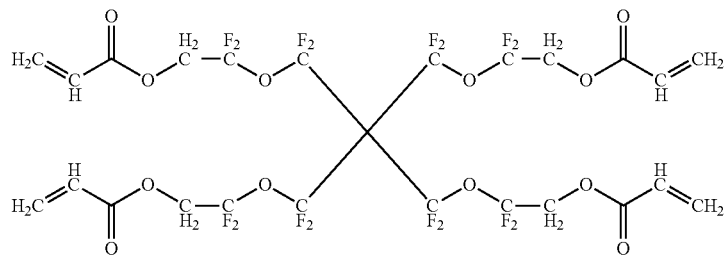
F-64
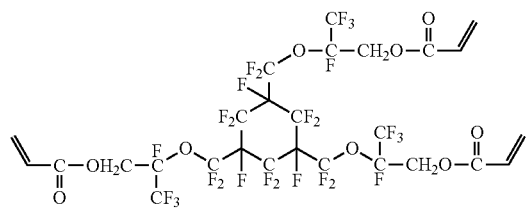
F-65
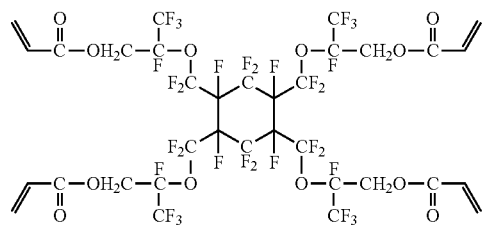
F-66
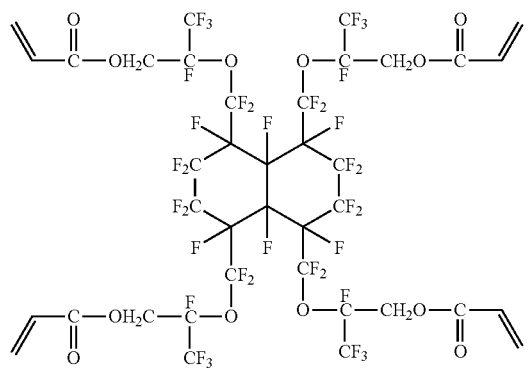
F-67
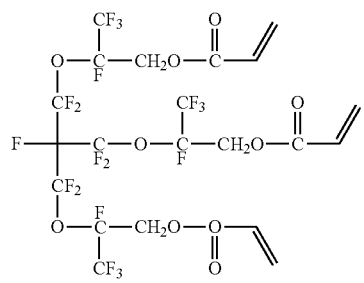
F-68
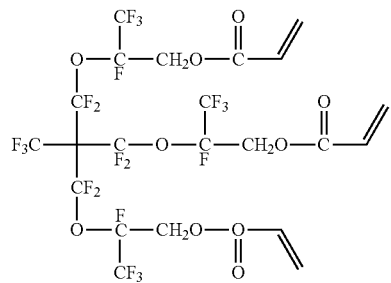
F-69
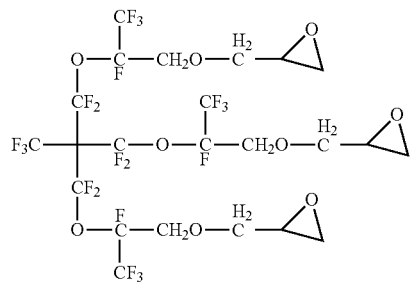
F-70
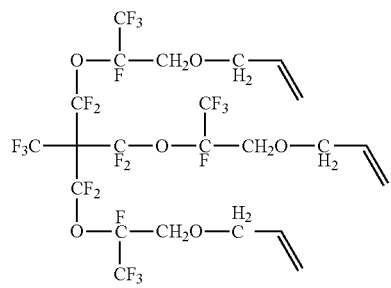
F-71
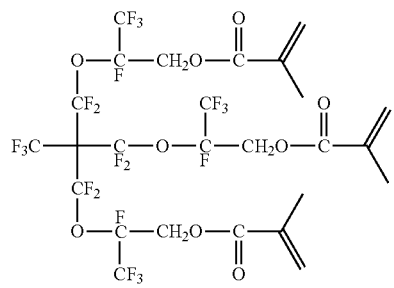
F-72

-continued
F-73
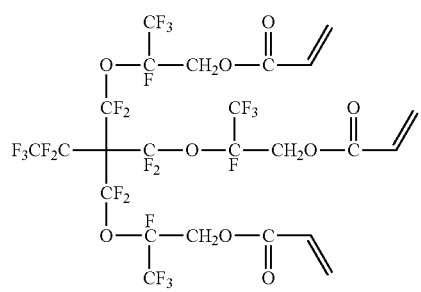
F-74
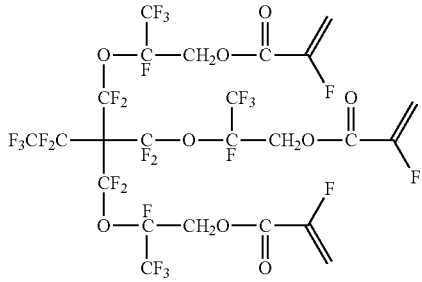
F-75
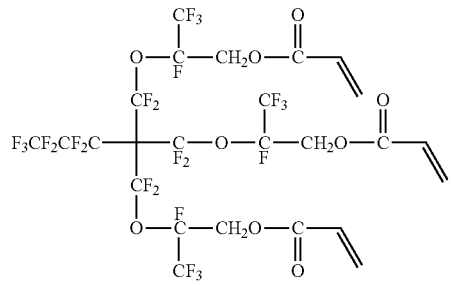
F-76
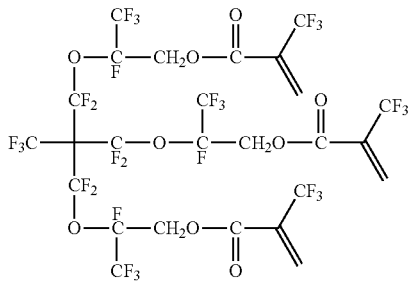
F-77
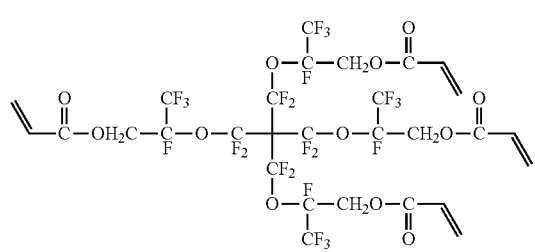
F-78
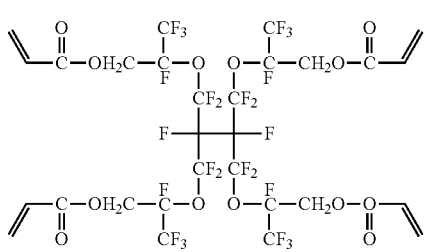
F-79
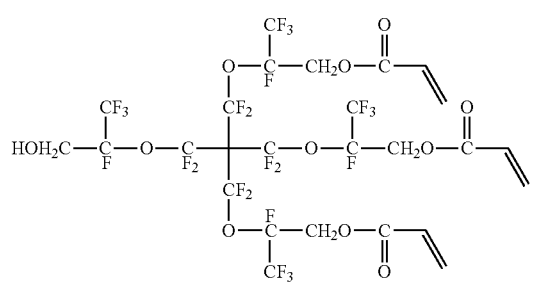
F-80
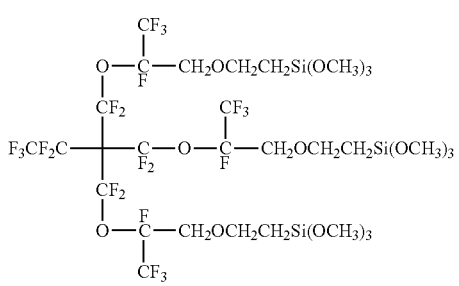
F-81
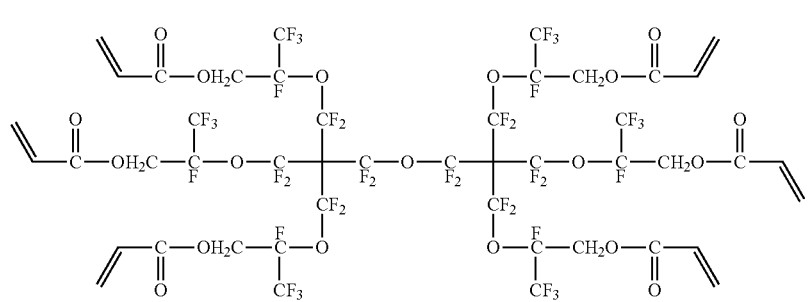

-continued

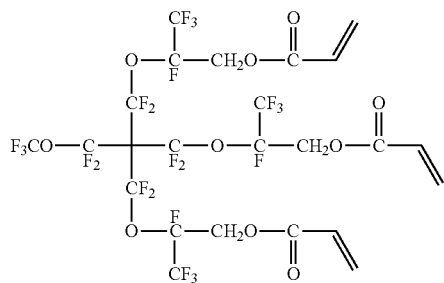

F-82

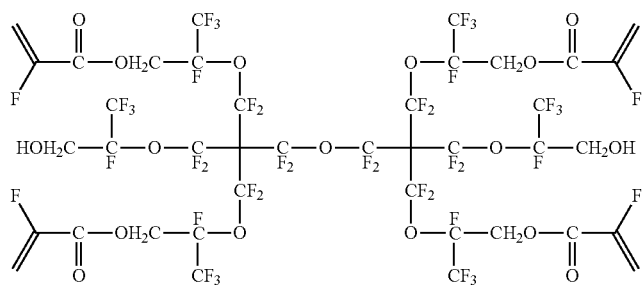

F-83

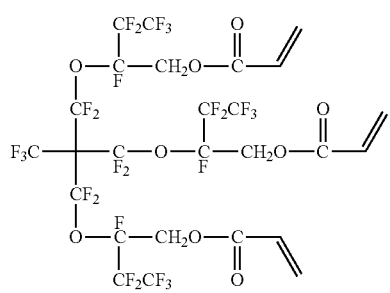

F-84

Furthermore, from the standpoint of compatibility with other binders or non-fluorine-containing monomers, a monomer having a repeating unit of an alkyl chain substituted with a fluorine atom via an ether bond, represented by the general formula (II) set forth below may be used as the fluorine-containing monomer.

    General Formula (II)

(in the general formula (II), X represents —F or —CF$_3$, n2 represents an integer of 1 to 20, and Y represents a polymerizable group).

The preferable range and specific examples of Y are the same as those described for Y in the general formula (I).

Specific examples of the fluorine-containing polyfunctional monomer represented by the general formula (II) are set forth below, but the present invention should not be construed to be limited thereto:

FP-1: $CH_2$=CH—COOCH$_2$(CF$_2$CF$_2$—O)$_2$CH$_2$OCOCH=CH$_2$

FP-2: $CH_2$=CH—COOCH$_2$(CF$_2$CF$_2$—O)$_4$—CH$_2$OCOCH=CH$_2$

FP-3: $CH_2$=C(CH$_3$)—COOCH$_2$(CF$_2$CF$_2$—O)$_2$CH$_2$OCOC(CH$_3$)=CH$_2$

FP-4: $CH_2$=C(CH$_3$)—COOCH$_2$(CF$_2$C(CF$_3$)F—O)$_4$—CH$_2$OCOC(CH$_3$)=CH$_2$

FP-5: $CH_2$=C(CH$_3$)—COOCH$_2$(CF$_2$C(CF$_3$)F—O)$_8$CH$_2$OCOC(CH$_3$)=CH$_2$

Furthermore, from the standpoint of capability of forming a crosslinking structure and high strength and hardness of the cured film, fluorine-containing polyfunctional (meth)acrylic esters described below can also be preferably used as the fluorine-containing monomer. Specific examples thereof include 1,3-bis{(meth)acryloyloxy}-2,2-difluoropropane, 1,4-bis{(meth)acryloyloxy}-2,2,3,3-tetrafluorobutane, 1,5-bis{(meth)acryloyloxy}-2,2,3,3,4,4-hexafluoropentane, 1,6-bis{(meth)acryloyloxy}-2,2,3,3,4,4,5,5-octafluorohexane, 1,7-bis{(meth)acryloyloxy}-2,2,3,3,4,4,5,5,6,6-decafluoroheptane, 1,8-bis{(meth)acryloyloxy}-2,2,3,3,4,4,5,5,6,6,7,7-dodecafluorooctane, 1,9-bis{(meth)acryloyloxy}-2,2,3,3,4,4,5,5,6,6,7,7,8,8-tetradecafluorononane, 1,10-bis{(meth)acryloyloxy}-2,2,3,3,4,4,5,5,6,6,7,7,8,8,9,9-hexadecafluorodecane, 1,11-bis{(meth)acryloyloxy}-2,2,3,3,4,4,5,5,6,6,7,7,8,8,9,9,10,10-octadecafluoroundecane, 1,12-bis{(meth)acryloyloxy}-2,2,3,3,4,4,5,5,6,6,7,7,8,8,9,9,10,10,11,11-eicosafluorododecane, 1,8-bis{(meth)acryloyloxy}-2,7-dihydroxy-4,4,5,5-tetrafluorooctane, 1,7-bis{(meth)acryloyloxy}-2,8-dihydroxy-4,4,5,5-tetrafluorooctane, 2,7-bis{(meth)acryloyloxy}-1,8-dihydroxy-4,4,5,5-tetrafluorooctane, 1,10-bis {(meth)acryloyloxy}-2,9-dihydroxy-4,4,5,5,6,6,7,7-octafluorodecane, 1,9-bis{(meth)acryloyloxy}-2,10-dihydroxy-4,4,5,5,6,6,7,7-octafluorodecane, 2,9-bis{(meth)acryloyloxy}-1,10-dihydroxy-4,4,5,5,6,6,7,7-octafluorodecane, 1,2,7,8-tetrakis {(meth)acryloyloxy}-4,4,5,5-tetrafluorodecane, 1,2,8,9-tetrakis {(meth)acryloyloxy}-4,4,5,5,6,6-hexafluorononane, 1,2,9,10-tetrakis {(meth)acryloyloxy}-4,4,5,5,6,6,7,7-octafluorodecane, 1,2,10,11-tetrakis {(meth)acryloyloxy}-4,4,5,5,6,6,7,7,8,8-decafluoroundecane, 1,2,11,12-tetrakis {(meth)acryloyloxy}-4,4,5,5,6,6,7,7,8,8,9,9-dodecafluoro-dodecane, 1,10-bis(α-fluoroacryloyloxy)-2,9-dihydroxy-4,4,5,5,6,6,7,7-octafluorodecane, 1,9-bis(α-fluoroacryloyloxy)-2,10-dihydroxy-4,4,5,5,6,6,7,7-octafluorodecane, 2,9-bis(α-fluoroacryloyloxy)-1,10-dihydroxy-4,4,5,5,6,6,7,7-octafluorodecane, 1,2,9,10-tetrakis(α-fluoroacryloyloxy)-4,4,5,5,6,6,7,7-octafluorodecane, and 1,2,11,12-tetrakis(α-fluoroacryloyloxy)-4,4,5,5,6,6,7,7,8,8,9,9-dodecafluorododecane.

The fluorine-containing polyfunctional (meth)acrylic ester can be produced by a known method. For instance, it may be produced by a ring-opening reaction of a corresponding fluorine-containing epoxy compound with (meth)acrylic acid or an esterification reaction of a corresponding fluorine-containing polyhydric alcohol or a fluorine-containing meth(acrylate) having a hydroxyl group obtained as an intermediate compound in the ring-opening reaction described above with (meth)acrylic chloride.

(Fluorine Content in Fluorine-Containing Monomer)

The fluorine content in the fluorine-containing monomer is preferably 25.0% by mass or more, more preferably from 45.0 to 80.0% by mass, and most preferably from 50.0 to 80.0% by mass, based on the molecular weight of the fluorine-containing monomer, from the viewpoints of phase separation from the component (C) and reduction in the surface energy for uneven distribution in the upper part in the coating film. When the fluorine content is more than 80.0% by mass, the strength and hardness of the coated film decrease to lead insufficient scratch resistance and abrasion resistance of the surface of the coated film, although the content of fluorine atoms in the cured film is high.

As the fluorine atom-containing curable compound (E) of the present invention, a fluorine-containing polymer is preferred from the standpoint of stability of the surface state of the film. Further, from the standpoint of improvement of the solubility of the coating composition and improvement of the adhesion property, a fluorine-containing curable monomer is preferred. A combined use of the fluorine-containing polymer and the fluorine-containing curable monomer is particularly preferred because these properties can be achieved at a high level.

[Structure of Antireflection Film]

The antireflection film of the present invention is an antireflection film obtained by the method above.

A cured film substantially having a layer structure with two layers can be obtained by including, in this order, a step for coating the coating composition of the present invention on a base material to form a coating film, a step of volatilizing the solvent from the coating film for drying the coating film, and a step of curing the coating film to form a cured layer. The two layers formed by such separation are constituted with a low refractive index layer in which the component (B) is distributed unevenly in the air-interface side, and a high refractive index layer in which other constituents are present. In the present invention, it is preferable that the low refractive index layer is composed of the components derived from the component (B) and the component (A) as main components, and the high refractive index layer be composed of the components derived from the component (C). In the present invention, it is preferable that the component (A) and the component (B) are present at a concentration of 1.5 times or more, more preferably 2.0 times or more, and most preferably 3.0 to 200 times, the average density of the total layers in the coating film formed from the coating composition of the present invention in the low refractive index layer. Further, it is preferable that the component (B) be present at a density of 20 to 90% by volume, more preferably 30 to 80% by volume or more, and most preferably 40 to 70% by volume in the low refractive index layer.

The multilayer structure having different refractive indices of the cured film obtained by coating the composition may have a structure including at least two layers of a low refractive index layer in which the component (B) is distributed unevenly in the air-interface side and a high refractive index layer in which other constituents are present, and may have, within a range not degrading the substantial performance, a layer in which the constituents are mixed (a layer in which a component derived from the component (A) and a component derived from the component (C) are mixed, or a layer in which a component derived from the component (B) and a component derived from the component (C) are mixed, a layer in which a component derived from the component (A), a component derived from the component (B), and a component derived from the component (C) are mixed, and the like) around the interface between the two layers.

Furthermore, when a cured film is formed by incorporating a component (E) in the coating composition of the present invention, it is preferable that a component derived from the component (E) of the present invention be present in a layer configured such that the component (B) and the component (A) are distributed unevenly.

The multilayer structure of a cured film of the antireflection film of the present invention can be identified, for example, by the observation of the cross-sectional TEM of the obtained film or with C60 sputtering ESCA. From the cross-sectional TEM, the distribution state of the component (B) in the film can be observed, and further, in the C60 sputtering ESCA, by analyzing the strength ratio of fluorine atoms or silicon atoms in the direction of a depth (film thickness), the composition distribution in the direction of a film thickness of the components derived from the components (A), (C), and (E) can be confirmed.

For example, by a cross-sectional TEM, it can be observed that the component (B) is present mainly in the air-interface side, and in the C60 sputtering ESCA, it is observed that, for example, a layer having fluorine or silicon atoms mainly in the air-interface side is present, the fluorine or silicon atoms are reduced from the depth with a film thickness of 10 nm to 100 nm from the surface in the air-interface side, and from the depth of 300 nm, a region in which fluorine or silicon atoms are not substantially detected is present.

When the coating composition of the present invention is coated and dried, phase separation between components derived from the component (A) and the component (C) having a positive (zero or more) free energy of mixing occurs, and the separation is initiated. At this time, in order to obtain a fluorine component or silicone component having a low surface energy, the components derived from the component (A) are distributed unevenly at a hydrophobic interface (air-interface) and the component (B) coated with the components derived from the component (A) is distributed unevenly in the upper part in the coating film at the same time, and therefore, it is possible to form a layer in which the components substantially derived from the component (B) and the component (A) are distributed unevenly. Since all of the components of the component (B) and the component (A) are low refractive index materials, it is possible to form a low refractive index layer on the upper layer (air-interface side). Simultaneously, since the component (C) is distributed unevenly on the lower layer (base material interface side), it is possible to form a layer substantially mainly composed of a component derived from the component (C). Since the component derived from the component (C) is a higher refractive index than the components derived from the component (B) and the component (A), a high refractive index layer can be formed, and thus a difference in the refractive index can be generated, which leads to antireflection ability.

Furthermore, it can be said that by making the component derived from the component (A) be distributed unevenly in the upper part in the coating film, improvement of scratch resistance and excellence in terms of cost with a small amount of use can be attained.

In addition, when the component (E) having small surface energy like the component (A) is used, it is possible to form a layer in which the component (E) is unevenly distributed in the upper part, and the components derived from the component (B) and the component (A), and the component derived from the component (E) are substantially distributed unevenly. Since the component (E) is a curable fluorine polymer or monomer, effects of excellent scratch resistance and further improvement of the surface state of a coating film are exhibited.

The film thickness of the low refractive index layer prepared by a step of coating the coating composition of the present invention on a base material to form a coating film, a step of volatilizing the solvent from the coating film for drying the coating film, and a step of curing the coating film to form a cured layer is a region in which in a cross-sectional TEM photograph of the coating film, the inorganic fine particles as the component (B) are present at a concentration of 1.5 times or more the average density of the entire layer of the coating film formed from the coating composition of the present invention, and is preferably from 40 to 300 nm, more preferably from 50 to 200 nm, and still more preferably from 60 to 150 nm.

The film thickness of the high refractive index layer having as a main component the component (C) prepared by a step of coating the coating composition of the present invention on a base material to form a coating film, a step of volatilizing the solvent from the coating film for drying the coating film, and a step of curing the coating film to form a cured layer is a value calculated by subtracting the film thickness of the low refractive index layer from the total film thickness determined by a cross-sectional TEM, and is preferably from 60 to 20,000 nm, more preferably from 300 to 15,000 nm, and still more preferably from 500 to 10,000 nm. The film thickness is determined by optical fitting based on the reflectance measured by measurement of mirror surface reflectance or by observation of cross-sectional TEM. The high refractive index layer having the component (C) as a main component preferably provides hard coat performance. For example, as the component (C), esters of polyhydric alcohols and (meth)acrylic acids are preferred. More preferably, a polyfunctional monomer having three or more (meth)acryloyl groups in one molecule is preferred.

The film thickness of the cured layer (low refractive index layer+high refractive index layer) prepared by a step of coating the coating composition of the present invention on a base material to form a coating film, a step of volatilizing the solvent from the coating film for drying the coating film, and a step of curing the coating film to form a cured layer is determined by cross-sectional TEM, and is preferably from 100 to 20,300 nm (0.1 to 20.3 μm), more preferably from 350 to 20,000 nm, still more preferably from 400 to 20,000 nm, and particularly preferably from 560 to 10,000 nm. In view of hard coat properties, the thickness of the high refractive index layer is preferably from 500 nm to 20,000 nm.

The refractive index of the low refractive index layer in which the component (B) of the antireflection film of the present invention is distributed unevenly is preferably in the range from 1.25 to 1.48, more preferably in the range from 1.28 to 1.45, and still more preferably in the range from 1.30 to 1.40. When the refractive index is too high, the antireflection performance is lowered, whereas when the refractive index is too low, the scratch resistance is lowered.

The refractive index of the high refractive index layer in which the component derived from the component (C) of the antireflection film of the present invention as a main component is preferably in the range from 1.48 to 1.80, more preferably in the range from 1.48 to 1.70, and still more preferably in the range from 1.50 to 1.60.

When the coating composition is coated on the base material, the refractive index and the film thickness of a layer having a multilayer structure can be optimally designed, and an intermediate refractive index layer for further lowering the reflectance, an antistatic functional layer for preventing the attachment of foreign materials, a hard coat layer for providing physical strength, and an antiglare layer for providing antiglare properties can be provided.

When an antireflection film is prepared by using the production method of the present invention, the coating composition of the present invention is desirably coated on a transparent film as a base material. In this case, as embodiments of preferred antireflection films having good optical characteristics, physical characteristics, or the like, configurations of [film base material/high refractive index layer/low refractive index layer], [film base material/hard coat layer/high refractive index layer/low refractive index layer], [film base material/undercoat layer/high refractive index layer/low refractive index layer], [film base material/conductive layer/high refractive index layer/low refractive index layer], [film base material/interference unevenness preventing layer/high refractive index layer/low refractive index layer], [film base material/light diffusible layer/high refractive index layer/low refractive index layer], and [film base material/adhesive layer/high refractive index layer/low refractive index layer] may be exemplified.

[Base Material]

As a base material, any one of base materials that can be used in the present invention is usable as long as various layers can be laminated thereon, but from the viewpoint of high productivity due to continuous transporting, a film base material is preferred.

The film base material is not particularly limited as long as it has excellent light transmittance to visible light (preferably a light transmittance of 90% or more) and excellent transparency (preferably a haze value of 1% or less). Specific examples thereof include films formed with transparent polymers including polyester-based polymers such as polyethylene terephthalate and polyethylene naphthalate; cellulose-based polymers such as diacetyl cellulose and triacetyl cellulose; polycarbonate-based polymers; and acryl-based polymers such as polymethyl methacrylate. Additional examples include films formed with transparent polymers including styrene-based polymers such as polystyrene and acrylonitrile/styrene copolymer; olefin-based polymers such as polyethylene, polypropylene, polyolefins having a cyclic or norborene structure, and an ethylene/propylene copolymer; vinyl chloride-based polymers; and amide-based polymers such as nylon and aromatic polyamides. Further examples include films formed with transparent polymers including imide-based polymers, sulfone-based polymers, polyethersulfone-based polymers, polyetherketone-based polymers, polyphenylenesulfide-based polymers, vinyl alcohol-based polymers, vinylidene chloride-based polymers, vinyl butyral-based polymers, arylate-based polymers, polyoxymethylene-based polymers, epoxy-based polymers, and a mixture of these polymers. Particularly, films with low optical birefringence are suitably used.

Still more preferable specific examples of the base material in the present invention include (meth)acryl-based resin film.

The (meth)acryl-based resin film includes a (meth)acryl-based resin. The (meth)acryl-based resin film can be obtained, for example, by subjecting a molding material including a resin component containing a (meth)acryl-based resin as a main component to molding in an extrusion molding device.

The Tg (glass transition temperature) of the (meth)acryl-based resin is preferably 115° C. or higher, more preferably 120° C. or higher, still more preferably 125° C. or higher, and particularly preferably 130° C. or higher. When the (meth) acryl-based resin film includes a (meth)acryl-based resin having a Tg (glass transition temperature) of 115° C. or higher as a main component, the film can have excellent durability. The upper limit value of the Tg of the (meth)acryl-based resin is not particularly limited, but is preferably 170° C. or lower in view of molding properties and the like.

Any appropriate (meth)acryl-based resin may be adopted as the (meth)acryl-based resin. Examples thereof include poly(meth)acrylates such as polymethyl methacrylate, a methyl methacrylate-(meth)acrylate copolymer, a methyl methacrylate-(meth)acrylate copolymer, a methyl methacrylate-acrylate-(meth)acrylate copolymer, a methyl(meth)acrylate-styrene copolymer (an MS resin and the like), and polymers each having an alicyclic hydrocarbon group (such as a methyl methacrylate-cyclohexyl methacrylate copolymer and a methyl methacrylate-norbornyl(meth)acrylate copolymer). Among these, a poly $C_{1-6}$ alkyl (meth)acrylate such as polymethyl(meth)acrylate is preferred. A methyl methacrylate-based resin including methyl methacrylate as a main component (50 to 100% by weight, and preferably 70 to 100% by weight) is more preferred.

Specific examples of the (meth)acryl-based resin include Acrypet VH and Acrypet VRL20A, both manufactured by Mitsubishi Rayon Co., Ltd., and a (meth)acryl-based resin having a high Tg value obtained through intramolecular cross-linking or an intramolecular cyclization reaction.

In the present invention, a (meth)acryl-based resin having a glutaric anhydride structure, a (meth)acryl-based resin having a lactone ring structure, and a (meth)acryl-based resin having a glutarimide structure are preferred as the (meth) acryl-based resin since the resins each have high heat resistance, high transparency, and high mechanical strength.

Examples of the (meth)acryl-based resin having a glutaric anhydride structure include (meth)acryl-based resins each having a glutaric anhydride structure described in, for example, JP2006-283013A, JP2006-335902A, and JP2006-274118A.

Examples of the (meth)acryl-based resin having a lactone ring structure include (meth)acryl-based resins each having a lactone ring structure described in, for example, JP2000-230016A, JP2001-151814A, JP2002-120326A, JP2002-254544A, and JP2005-146084A.

Examples of the (meth)acryl-based resin having a glutarimide structure include (meth)acryl-based resins each having a glutarimide structure described in, for example, JP2006-309033A, JP2006-317560A, JP2006-328329A, JP2006-328334A, JP2006-337491A, JP2006-337492A, JP2006-337493A, JP2006-337569A, and JP2007-009182A.

The content of the (meth)acryl-based resin in the (meth) acryl-based resin film is preferably from 50 to 100% by weight, more preferably 50 to 99% by weight, still more preferably 60 to 98% by weight, and particularly preferably 70 to 97% by weight. When the content of the (meth)acryl-based resin in the (meth)acryl-based resin film is less than 50% by weight, high heat resistance and high transparency inherent in the (meth)acryl-based resin may not be sufficiently reflected.

The content of the (meth)acryl-based resin in the molding material to be used upon molding the (meth)acryl-based resin film is preferably from 50 to 100% by weight, more preferably 50 to 99% by weight, still more preferably 60 to 98% by weight, and particularly preferably 70 to 97% by weight. When the content of the (meth)acryl-based resin in the molding material to be used upon molding the (meth)acryl-based resin film is less than 50% by weight, high heat resistance and high transparency inherent in the (meth)acryl-based resin may not be sufficiently reflected.

In addition to the (meth)acryl-based resins, the (meth) acryl-based resin film may include other thermoplastic resins. Examples of the other thermoplastic resin include olefin-based polymers such as polyethylene, polypropylene, an ethylene-propylene copolymer, and poly(4-methyl-1-pentene); halogenated vinyl-based polymers such as vinyl chloride, vinylidene chloride, and a chlorinated vinyl resin; acryl-based polymers such as polymethyl methacrylate; styrene-based polymers such as polystyrene, a styrene-methyl methacrylate copolymer, a styrene-acrylonitrile copolymer, and an acrylonitrile-butadiene-styrene block copolymer; polyesters such as polyethylene terephthalate, polybutylene terephthalate, and polyethylene naphthalate; polyamides such as nylon 6, nylon 66, and nylon 610; polyacetal; polycarbonate; polyphenylene oxide; polyphenylene sulfide; polyether ether ketone; polysulfone; polyether sulfone; polyoxybenzylene; polyamideimide; and rubber polymers such as an ABS resin and an ASA resin blended with polybutadiene-based rubber and acryl-based rubber.

The content ratio of the other thermoplastic resin in the (meth)acryl-based resin film is preferably from 0 to 50% by weight, more preferably 0 to 40% by weight, still more preferably 0 to 30% by weight, and particularly preferably 0 to 20% by weight.

The (meth)acryl-based resin film may include additives. Examples of the additives include antioxidants such as a hindered phenol-based antioxidant, a phosphorus-based antioxidant, and a sulfur-based antioxidant; stabilizers such as a light stabilizer, a weathering stabilizer, and a heat stabilizer; reinforcing materials such as glass fibers and carbon fibers; UV-absorbing agents such as phenyl salicylate, (2,2'-hydroxy-5-methylphenyl)benzotriazole, and 2-hydroxybenzophenone; a near infrared ray absorbing agent; flame retardants such as tris(dibromopropyl)phosphate, triallyl phosphate, and antimony oxide; antistatic agents such as anionic, cationic, and nonionic surfactants; colorants such as an inorganic pigment, an organic pigment, and a dye; an organic filler and an inorganic filler; a resin modifier; an organic filling agent and an inorganic filling agent; a plasticizer; a lubricant; an antistatic agent; a flame retardant; and a retardation reducing agent.

The content ratio of the additives in the (meth)acryl-based resin film is preferably from 0 to 5% by weight, more preferably 0 to 2% by weight, and still more preferably 0 to 0.5% by weight.

Although a method of producing a (meth)acryl-based resin film is not particularly limited, for example, a (meth)acryl-based resin and another polymer, additives, or the like are thoroughly mixed in advance by any suitable mixing method to obtain a thermoplastic resin composition, and then the composition may be molded into a film. Alternatively, the (meth)acryl-based resin and the other polymers, additives, or the like may be formed into separate solutions. After that, the solutions are mixed to obtain a homogenous mixed solution, and then, the solution may be molded into a film.

For producing the thermoplastic resin composition, for example, the film materials are preblended with any suitable mixer such as an Omni mixer, and then, the obtained mixture is extruded and kneaded. In this case, the mixer to be used for extrusion and kneading is not particularly limited, and for example, any suitable mixer such as a uniaxial extruder and a biaxial extruder, or a pressure kneader may be used.

Examples of the method of molding a film include any suitable film molding methods such as a solution casting method, a melt extrusion method, a calendering method, and a compression molding method. Among these film molding methods, a solution casting method and a melt extrusion method are preferred.

Examples of a solvent to be used in the solution casting method include aromatic hydrocarbons such as benzene, toluene, and xylene; aliphatic hydrocarbons such as cyclohexane and decalin; esters such as ethyl acetate and butyl acetate; ketones such as acetone, methyl ethyl ketone, and methyl isobutyl ketone; alcohols such as methanol, ethanol, isopropanol, butanol, isobutanol, methyl cellosolve, ethyl cellosolve, and butyl cellosolve; ethers such as tetrahydrofuran and dioxane; halogenated hydrocarbons such as dichloromethane, chloroform, and carbon tetrachloride; dimethylformamide; and dimethylsulfoxide. These solvents may be used alone or in combination of two or more kinds thereof.

Examples of an apparatus for performing the solution casting method include a drum-type casting machine, a band-type casting machine, and a spin coater.

Examples of the melt extrusion method include a T-die method and an inflation method. The molding temperature is preferably from 150 to 350° C., and more preferably from 200 to 300° C.

In the case of molding a film by the T-die method, a T-die is attached to a tip end of a known uniaxial extruder or a biaxial extruder, and a film extruded in a film shape is taken up to obtain a roll-shaped film. At this time, when a stretching force is applied in an extrusion direction while appropriately adjusting the temperature of a take-up roll, the film may be also stretched uniaxially. Further, when a film is stretched in a direction perpendicular to the extrusion direction, simultaneous biaxial stretching, sequential biaxial stretching, or the like may also be performed.

The (meth)acryl-based resin film may be any of an unstretched film and a stretched film. In the case where the film is a stretched film, the film may be any of a uniaxially stretched film and a biaxially stretched film. In the case where the film is a biaxially stretched film, the film may be any of a simultaneously biaxially stretched film and a sequentially biaxially stretched film. In the case where the film is stretched biaxially, the mechanical strength and film performance are enhanced. When another thermoplastic resin is mixed into the (meth)acryl-based resin film, a retardation may be prevented from increasing even if the film is stretched, and hence, optical isotropy may be held.

The stretching temperature is preferably in the vicinity of a glass transition temperature of a thermoplastic resin composition that is a film material, and specifically, the temperature is preferably (glass transition temperature-30° C.) to (glass transition temperature+100° C.), more preferably (glass transition temperature-20° C.) to (glass transition temperature+80° C.). When the stretching temperature is less than (glass transition temperature-30° C.), there is a possibility that a sufficient stretching ratio may not be obtained. On the contrary, when the stretching temperature is more than (glass transition temperature+100° C.), flow of the resin composition occurs, which may prevent stable stretching.

The stretching ratio defined as an area ratio is preferably from 1.1 to 25 times, more preferably from 1.3 to 10 times. The stretching ratio of less than 1.1 times may not lead to the enhancement of toughness involved in stretching. When the stretching ratio is more than 25 times, the effect to be obtained by enhancing the stretching ratio may not be recognized.

The stretching speed is preferably from 10 to 20,000%/min, and more preferably from 100 to 10,000%/min in one direction. When the stretching speed is less than 10%/min, it takes time to obtain a sufficient stretching ratio and a production cost may be high. When the stretching speed is more than 20,000%/min, a stretched film may, for example, be broken.

The (meth)acryl-based resin film may be subjected to heat treatment (annealing) or the like after stretching treatment in order to stabilize its optical isotropy and mechanical characteristics. As the conditions of the heat treatment, any suitable conditions may be adopted.

The thickness of the (meth)acryl-based resin film is preferably from 5 to 200 μm, and more preferably from 10 to 100 μm. When the thickness is less than 5 μm, crimping may be increased when the durability test of the polarizing plate is conducted, in addition to the decrease in strength. When the thickness is more than 200 μm, moisture permeability as well as transparency are degraded, and in the case of using a water-based adhesive, the drying speed of water that is a solvent of the water-based adhesive may be decreased.

The wetting tension of the surface of the (meth)acryl-based resin film is preferably 40 mN/m or more, more preferably 50 mN/m or more, and still more preferably 55 mN/m or more. When the wetting tension of the surface is at least 40 mN/m or more, the adhesion strength between the (meth)acryl-based resin film and the polarizer is further enhanced. In order to adjust the wetting tension of the surface, any suitable surface treatment may be performed. Examples of the surface treatment include corona discharge treatment, plasma treatment, ozone spraying, UV-ray irradiation, flame treatment, and chemical treatment. Among these, corona discharge treatment and plasma treatment are preferably used.

The thickness and the width of the film base material can be appropriately determined. The thickness of the film base material is generally from about 10 to 500 μm, particularly preferably from 20 to 300 μm, and more preferably from 30 to 200 μm, considering workability such as strength and handleability, or provision of a thin layer. A width of the film base material of 100 to 5,000 mm, preferably 800 to 3,000 mm, and more preferably 1,000 to 2,000 mm is suitably used. Further, the refractive index of the film base material is not particularly limited, but is usually from about 1.30 to 1.80, and particularly preferably from 1.40 to 1.70.

The surface of the base material is preferably smooth, and preferably has a value of an arithmetic mean roughness Ra of 1 μm or less, more preferably from 0.0001 to 0.5 μm, and still more preferably from 0.001 to 0.1 μm. The arithmetic mean roughness (Ra) in the antireflection film of the present invention can be measured in accordance with JIS B 0601.

[Method for Producing Antireflection Film]

The antireflection film of the present invention can be produced by a step of coating the coating composition, a step of drying, and a step of curing, and as described above, by using the film base material, a coating step, a drying step, and a curing step can be carried out, and high productivity can be realized. Here, the laminate thus obtained is a film-shaped laminate, that is, an antireflection film is prepared. Each of the steps will be described below. Further, the production method of the present invention may include other steps, in addition to the above-described steps.

(Coating Step)

As a coating method in the production method of the present invention, a known method such as a dip coating method, an air knife coating method, a curtain coating method, a roller coating method, a wire bar coating method, a gravure coating method, an extrusion coating method (see US2681294A), and a microgravure coating method may be used, and among these, a microgravure coating method and a die coating method are preferably used from the viewpoint of high productivity and uniformity of the coating film.

[Step of Extruding onto Support Using Slot Die]

In order to supply the film of the present invention with high productivity, an extrusion method (die coating method) is preferably used. Particularly, as for a die coater that can be preferably used in a region having a wet coating method (20 cc/m² or less), such as a hard coat layer and an antireflection layer, reference may be made to, for example, JP2007-293313A or the like, and this shall apply to the present invention.

(Drying Step)

In the production method of the present invention, the coating composition of the present invention is coated on a base material, and then transported to a web in a zone so as to dry the solvent. The temperature of the drying zone at that time is preferably from 0° C. to 140° C., and more preferably from 10° C. to 120° C., and it is also preferable to adjust the first half of the drying zone, for example, to a relatively low temperature and adjust the second half to a relatively high temperature. However, it is essential to adjust the temperature to no higher than the temperature at which the components other than the solvent included in the coating composition start to volatilize. The drying step other than the preferred drying condition is not limited, and an ordinary method that can be used for drying after coating can be used.

(Curing Method)

In the present invention, the coating film that has been subjected to a coating step and a drying step may be cured by ultraviolet ray irradiation and/or heat of the laminate. Here, the curing by ultraviolet ray irradiation refers to curing a film by irradiating a dried film with ultraviolet rays using a light source such as a low-pressure mercury lamp, a medium-pressure mercury lamp, a high-pressure mercury lamp, an ultrahigh-pressure mercury lamp, a carbon arc lamp, a metal halide lamp, and a xenon lamp, or an ArF excimer laser, a KrF excimer laser, an excimer lamp, and a synchrotron radiation light.

The condition for ultraviolet ray irradiation varies depending on individual lamps used for the ultraviolet ray irradiation, but the amount of light irradiated is preferably from 20 to 10,000 mJ/cm², more preferably from 100 to 2,000 mJ/cm², and particularly preferably from 150 to 1,000 mJ/cm².

In the case of curing by ultraviolet ray irradiation, the individual layers may be irradiated one by one, or may be irradiated after lamination. For the purpose of promoting the curing of the surface of the laminate during ultraviolet ray irradiation, the oxygen concentration may be decreased by purging nitrogen gas or the like. The oxygen concentration in the environment for curing is preferably 5% or less. With the low refractive index layer that is an outermost layer of the laminate as in the antireflection film of the present invention, the oxygen concentration is preferably 0.1% or less, more preferably 0.05% or less, and most preferably 0.02% or less.

The laminate obtained by the production method of the present invention preferably has a layer including particles. Further, the laminate preferably has an antireflection function.

[Hard Coat Layer]

The antireflection film of the present invention may be provided with a hard coat layer on one side of the base material in order to impart the physical strength.

The film thickness of the hard coat layer is generally from about 0.5 μm to 50 μm from the viewpoints of provision of sufficient durability or impact resistance, curling, productivity, or cost. The preferable film thickness is from 1 μm to 30 μm, more preferably from 2 μm to 20 μm, and most preferably from 3 μm to 15 μm.

Furthermore, the strength of the hard coat layer is preferably H or higher, more preferably 2H or more, still more preferably 3H or more, and most preferably 5H or more, in the pencil hardness test.

In addition, in the Taber test according to JIS K5400, the abrasion loss for a specimen from before to after the test is preferably smaller.

For the refractive index of the hard coat layer, from the standpoints of optical design, reflectance, color, unevenness, or cost, the refractive index is preferably in the range of 1.48 to 1.75, more preferably in the range of 1.49 to 1.65, and still more preferably in the range of 1.50 to 1.55.

In the case of imparting an antiglare function in the surface scattering, a surface haze (a value obtained by subtracting an internal haze from the entire haze value, in which the internal haze value can be measured by removing the irregularities on the film surface from the material having the same refractive index as the film surface) is preferably from 0.1% to 20%, more preferably from 0.2% to 5%, and particularly preferably from 0.2% to 2%. When the surface haze is too high, the bright room contrast is deteriorated, whereas when the surface haze is too low, the glare is deteriorated.

Furthermore, when the hard coat layer includes light-transmissive particles to impart the internal scattering, a preferred range of the internal haze varies depending on the purpose, but when the shape of a liquid crystal panel, color unevenness, brightness unevenness, glare, or the like is not easily shown by the internal scattering, or to impart a function to magnifying the viewing angle by the scattering, the internal haze value is preferably from 0% to 60%, more preferably from 1% to 40%, and particularly preferably from 10% to 35%. When the internal haze is too high, the front contrast decreases and the blurring increases. When the internal haze is too small, the combination of the raw materials used is restricted and the adjustment of characteristic values other than antiglare properties becomes difficult, and further, the cost becomes high. On the other hand, when focusing on the front contrast, the internal haze is preferably from 0% to 30%, more preferably from 1% to 20%, and most preferably from 1% to 10%.

Furthermore, for the shape of the surface irregularities of the hard coat layer, the arithmetic mean roughness (Ra) is preferably 0.30 μm or less, more preferably from 0.01 to 0.20 μm, and still more preferably from 0.01 to 0.12 μm. When Ra is high, there are sometimes problems, for example, the blurring is seen and uniformity in the layer formed on the hard coat layer is difficult to obtain.

[Conductive Layer]

The antireflection film of the present invention may be provided with a conductive layer for the purpose of antistatic properties, and thus, adhesion of foreign materials on the surface of an antireflection film surface can be prevented. The conductive layer may be provided as a single layer other than the respective layers or can also be provided as a combination layer in which one of the layers laminated is combined with a conductive layer.

The film thickness of the conductive layer is preferably from 0.01 μm to 10 μm, more preferably from 0.03 μm to 7 μm, and most preferably from 0.05 μm to 5 μm. The surface resistivity SR (Ω/sq) of the conductive layer is preferably from 5 to 12, more preferably from 5 to 11, and most preferably from 6 to 10 in terms of log SR. The surface resistivity of the conductive layer can be measured by a known measurement method, and may be measured, by for example, a four-probe method.

[Interference Unevenness Preventing Layer]

The antireflection film of the present invention may be provided with an interference unevenness preventing layer for the purpose of preventing the interference unevenness, and thus, the interference unevenness in the antireflection film surface can be prevented. The interference unevenness indicates that the difference in the refractive index of a layer (for example, a hard coat layer) coated on a base material causes interference of the reflected light and color change in response to the film thickness unevenness, and therefore, for the purpose of preventing such a state, the refractive index is continuously changed between base materials and a layer coated on the base material. In this regard, there is a method for preventing the interference unevenness (see, for example, JP2003-205563A and JP2003-131007A). Such an interference unevenness preventing layer may be provided on the layer of a base material.

[Protective Film for Polarizing Plate]

In the case of using the antireflection film of the present invention for a liquid crystal display device, in the preparation of a polarizing plate, it is preferable to improve the adhesion with a polarizing film having polyvinyl alcohol as a main component by hydrophilizing the surface of a transparent support (base material) on the opposite side to the side having a low refractive index layer, that is, the surface on the side to which the polarizing film is stuck, in order that a protective film is used as a film for protecting the film surface of a polarizing plate (film for protecting a polarizing plate).

As a film base material in the antireflection film, a triacetyl cellulose film and a (meth)acrylic resin film are particularly preferably used. As a method for preparing a protective film for a polarizing plate in the present invention, there may be considered two methods including (1) a method in which each layer (for example, the hard coat layer, the middle refractive index layer, and the optical functional layer) is coated on one surface of the transparent support having been previously subjected to a saponification treatment; and (2) a method in which after coating each of the above-described layers on one surface of the transparent support, the side to which the polarizing film is stuck is subjected to a saponification treatment. However, in the method (1), since even the surface on which a hard coat layer is to be coated is hydrophilized, it is difficult to ensure the adhesion properties between the support and the hard coat layer. Therefore, the method (2) is preferable.

[Saponification Treatment]

(1) Dipping Method

As a method for subjecting an antireflection film to a saponification treatment, a dipping method may be exemplified. The dipping method is a method in which the antireflection film is dipped in an alkaline liquid, thereby saponifying all of the surfaces having reactivity with an alkali on the entire surface of the film. Since this method does not require special equipment, it is preferable from the viewpoint of cost. A sodium hydroxide aqueous solution is preferable as the alkaline liquid. A concentration of the alkaline liquid is preferably from 0.5 to 3 mol/L, and particularly preferably from 1 to 2 mol/L; and a liquid temperature of the alkaline liquid is preferably from 30 to 70° C., and particularly preferably from 40 to 60° C.

Though the above-described combination of the saponification conditions are preferably a combination of relatively mild conditions, they may be set up by the raw materials and configuration of the antireflection film, and a desired contact angle.

After dipping in the alkaline liquid, it is preferable that the film be thoroughly washed with water or that the film be dipped in a dilute acid, thereby neutralizing an alkaline component such that the alkaline component does not remain in the film.

By carrying out the saponification treatment, the surface of the transparent support opposite to the surface on which the antireflection film is provided is hydrophilized. The protective film for a polarizing plate is provided for use after making the hydrophilized surface of the transparent support adhere to the polarizing film.

The hydrophilized surface is effective for improving the adhesion to the adhesive surface made of, as a main component, polyvinyl alcohol.

With respect to the saponification treatment, it is preferable from the viewpoint of adhesion to the polarizing film that the contact angle of the surface of the transparent support in the opposite side to the side at which the low refractive index layer is provided with respect to water be low as far as possible. On the other hand, in the dipping method since even the surface having the low refractive index layer thereon is damaged by the alkali at the same time over, it is important to adopt necessary and minimum reaction conditions. In the case where the contact angle of the transparent support on the surface in the opposite side to the side at which the low refractive index layer is provided, namely the sticking surface of the antireflection film, with respect to water is employed as an index of the damage which the antireflection layer receives due to the alkali, particularly when the transparent support is triacetyl cellulose, the contact angle is preferably from 20° to 50°, more preferably from 30° to 50°, and still more preferably from 40° to 50°. When the contact angle is not more than 50°, a problem of adhesion properties to the polarizing film is not caused, and therefore, such is preferable. On the other hand, when the contact angle is 20° or more, the damage which the antireflection layer receives is not large, the physical strength and light resistance are not hindered, which is thus preferable.

(2) Method of Coating Alkaline Liquid

As a measure for avoiding the damage to the antireflection layer in the above-described dipping method, a method is preferably adopted of coating an alkaline liquid by coating an alkaline liquid only on the surface on the opposite side to the surface on which the antireflection layer is provided, followed by heating, washing with water and drying. In this case, the "coating" as referred to herein means that the alkaline liquid or the like is brought into contact with only the surface on which the saponification is carried out. At this time, it is preferred to carry out the saponification treatment such that the contact angle of the sticking surface of the antireflection film with respect to water is from 10° to 50°.

In all of the above-described saponification methods (1) and (2), since the saponification can be carried out after winding out the film from the support in a rolled state and forming the respective layers, it may be added after the production step and achieved in a series of operations. Furthermore, by continuously carrying out a sticking step to polarizing plates made of a similarly wound out support collectively, it is possible to prepare polarizing plates with good efficiency as compared with the case of carrying out the same operations sheet by sheet.

[Polarizing Plate]

The polarizing plate using the antireflection film of the present invention has the antireflection film as a protective film that protects a polarizing film and at least one of the front and back sides of the polarizing film. The polarizing plate using the antireflection film of the present invention is preferably a lamination having two sheets of protective films that protect both sides of the polarizing film, and in an embodiment, at least one of the protective films is the above-described antireflection film.

The polarizing plate has an antireflection film on at least one of the protective films of the polarizing film (protective film for a polarizing plate). The transparent support of the antireflection film is adhered to the polarizing film via an adhesive layer including polyvinyl alcohol or polyester urethane, and the protective film of one polarizing film is adhered to the main surface on the opposite side to the main surface to which the antireflection film is adhered, via an adhesive layer. Further, the main surface on the opposite side to which the polarizing film of one protective film is adhered has an adhesive layer.

By using the antireflection film of the present invention as a protective film for a polarizing plate, a polarizing plate having physical strength and an excellent antireflection function can be prepared, and it is possible to largely reduce the cost.

Moreover, by preparing a polarizing plate using the antireflection film of the present invention for one of the protective films for a polarizing plate and an optically compensatory film having optical anisotropy as described later for the other protective film of the polarizing film, respectively, it is possible to prepare a polarizing plate having improved contrast of a liquid crystal display device in a bright room and capable of extremely widening a viewing angle in the up and down, left and right directions and the oblique direction.

[Image Display Device]

Examples of the image display device having the antireflection film of the present invention include a liquid crystal display device (LCD), a plasma display panel device (PDP), an organic light emitting diode device (OLED), a cathode ray tube display device (CRT), a field emission display device (FED), and a surface-conduction electron-emitter display device (SED). Among these, the antireflection film of the present invention is preferably used as a surface film of the liquid crystal panel image screen. Examples of the image display device having a polarizing plate having the antireflection film of the present invention include image display devices such as a liquid crystal display device (LCD) and an organic light emitting diode device (OLED). The image display device of the present invention is used by attaching the polarizing plate having the antireflection film of the present invention to glass of a liquid crystal cell of the image display device directly or via another layer.

The polarizing plate using the antireflection film according to the present invention can be preferably used for transmission type, reflection type, or semi-transmission type liquid crystal display devices of a twisted nematic (TN) mode, a super twisted nematic (STN) mode, a vertical alignment (VA) mode, an in-plane switching (IPS) mode, an optically compensatory bend cell (OCB) mode, or the like.

Furthermore, when used for a transmission type or semi-transmission type liquid crystal display device, a display device having higher visibility can be obtained using a commercially available brightness enhancing film (a polarizing separation film having a polarizing selective layer; for example, D-BEF, manufactured by Sumitomo 3M Limited, etc.) in combination.

In addition, a combination with a λ/4 plate can be used for reducing reflected light from the surface and the inside as a polarizing plate for a reflection type liquid crystal or a surface protective plate for OLED.

EXAMPLES

The present invention will be described in detail with reference to Examples, but the present invention should not be construed to be limited thereto. Further, "parts" and "%" are values on a mass basis unless otherwise indicated.

Example 1

Fabrication of Undercoat Layer-Adhered Base Material

[Preparation of Coating Liquid (Sub-1) for Undercoat Layer]

The respective components were mixed in the composition shown in Table 3 below, the solid content concentration was adjusted to 40% by mass with a solvent of MEK (methyl ethyl ketone)/MIBK (methyl isobutyl ketone)/cyclohexanone=45/45/10 (mass ratio), and the mixture was filtered through a filter made from polypropylene having a pore size of 30 μm to prepare a coating liquid for an undercoat layer.

TABLE 3

| | Coating Liquid Sub-1 |
| --- | --- |
| Binder | DPCA - 20/40 parts by mass |
| Polymerization initiator | IRGACURE 184/2 parts by mass |
| Silica sol | MIBK - ST/10 parts by mass (in terms of solid content) |

The compounds used above are shown below:
DPCA-20: Partially caprolactone-modified polyfunctional acrylate (manufactured by Nippon Kayaku Co., Ltd.)
Silica sol: MIBK-ST, dispersion at a solid content concentration of 30% with an MIBK solvent, silica fine particles having an average particle size of about 15 nm, and a refractive index of 1.45 (manufactured by Nissan Chemical Industries, Ltd.)
IRGACURE 184: Polymerization initiator [manufactured by Ciba Specialty Chemicals Inc.]

[Formation of Undercoat Layer]

On a triacetyl cellulose film, TAC-TD80U, manufactured by FUJIFILM Corp. having a thickness of 80 μm and a width of 1340 mm, a coating liquid for an undercoat layer (Sub-1) was coated by a die coater under the condition of a transportation speed of 30 m/min, and dried at 60° C. for 150 seconds, and the coated layer was cured by irradiation with ultraviolet rays at an illuminance of 400 mW/cm$^2$ and an irradiation dose of 150 mJ/cm$^2$ using an air-cooled metal halide lamp (manufactured by Eye Graphics Co., Ltd.) in which output power is 160 W/cm while purging the system with nitrogen (oxygen concentration of 0.5% or less), thereby forming an undercoat layer having a film thickness after curing of 6 μm. Thus formed triacetyl cellulose film (TAC-1) with the undercoat layer was taken as a base material to be used for evaluation of the coating composition as described later.

[Preparation of Hollow Silica Particle Dispersion S-1]

Ten parts by mass of γ-acryloyloxypropyl trimethoxysilane (a molecular weight as defined herein of 192), 1.51 parts by mass of diisopropoxyaluminum ethyl acetate, and 500 parts by mass of methyl ethyl ketone were added to 500 parts by mass of a hollow silica fine particle sol A (isopropyl alcohol silica sol, average particle diameter 45 nm, silica concentration 20%, and silica particle refractive index 1.30), mixed, and then 3 parts by mass of ion exchange water was added thereto. This mixed liquid was reacted at 60° C. for 8 hours, and then cooled to room temperature, and 1.8 parts by mass of acetylacetone was added thereto to obtain a dispersion. Thereafter, while adding cyclohexanone thereto so as to maintain the content of silica to be substantially constant, solvent replacement was carried out by distillation under reduced pressure at a pressure of 30 Torr (about 40 hPa), and finally, the concentration was adjusted to obtain a hollow silica particle dispersion S-1, which had been surface-modified with a silane coupling agent having a polymerizable functional group with a solid content concentration of 21.7% (silica concentration of 20%).

[Preparation of Hollow Silica Particle Dispersion S-2]

Cyclohexanone was added to a hollow silica fine particle sol A (isopropyl alcohol silica sol, average particle diameter 45 nm, silica concentration 20%, and silica particle refractive index 1.30) while maintaining the content of silica to be substantially constant, and solvent replacement was carried out by distillation under reduced pressure at a pressure of 30 Torr to obtain a hollow silica particle dispersion S-2 with a silica concentration of 20%.

[Preparation of Hollow Silica Particle Dispersion S-3]

Trimethylmethoxysilane (a molecular weight as defined herein of 90) (4.4 parts by mass), 1.51 parts by mass of diisopropoxyaluminum ethyl acetate, and 500 parts by mass of methyl ethyl ketone were added to 500 parts by mass of a hollow silica fine particle sol A (isopropyl alcohol silica sol, average particle diameter 45 nm, silica concentration 20%, and silica particle refractive index 1.30), mixed, and then 3 parts by mass of ion exchange water was added thereto. This mixed liquid was reacted at 60° C. for 8 hours, and then cooled to room temperature, and 1.8 parts by mass of acetylacetone was added thereto to obtain a dispersion. Thereafter, while adding cyclohexanone thereto so as to maintain the content of silica to be substantially constant, solvent replacement was carried out by distillation under reduced pressure at a pressure of 30 Torr, and finally, the concentration was adjusted to obtain a hollow silica particle dispersion S-3, which had been surface-modified with a trimethylsilyl group with a solid content concentration of 21.7%.

[Preparation of Hollow Silica Particle Dispersion S-4]

A mixture (Ab-1) (a molecular weight as defined herein of 660) (28 parts by mass) including a silane coupling agent (exemplary compounds (A-4) and (A-5)) as described in Production Example 1 of [0131] of JP2007-238897A, 1.51 parts by mass of diisopropoxyaluminum ethyl acetate, and 500 parts by mass of methyl ethyl ketone, were added to 500 parts by mass of a hollow silica fine particle sol A (isopropyl alcohol silica sol, average particle diameter 45 nm, silica concentration 20%, and silica particle refractive index 1.30), mixed, and then 3 parts by mass of ion exchange water was added thereto. This mixed liquid was reacted at 60° C. for 8 hours, and then cooled to room temperature, and 1.8 parts by mass of acetylacetone was added thereto to obtain a dispersion. Thereafter, while adding cyclohexanone thereto so as to maintain the content of silica to be substantially constant, solvent replacement was carried out by distillation under reduced pressure at a pressure of 30 Torr, and finally, the concentration was adjusted to obtain a hollow silica particle dispersion S-4, which had been surface-modified with a solid content concentration of 21.7%.

[Preparation of One-Liquid Coating Composition for Forming Two Layers]

IPF-1 (2.0 parts by mass) was used as a component (A) and adjusted to have a solid content of 30% by mass with MEK solvent. MEK-ST-L of the component (B) (2.0 parts by mass (in terms of a solid fraction)) was mixed with the component (A), and the mixture was diluted with a solvent of MEK/PGME (propylene glycol monomethyl ether)/cyclohexanone at 90/5/5 (mass ratio) to give a solution having a 5%-by-mass solid content concentration, which was left to stand at 25° C. for 24 hours. Thereafter, 60 parts by mass of DPHA as a component (C) and 2.0 parts by mass of IRGACURE 127 as a photopolymerization initiator were mixed in, and the mixture was adjusted with the same solvent composition to have a solid content concentration of 13% by mass to give a coating composition of the present invention (Comp-1).

In the same manner as for (Comp-1), the respective components were mixed as in Table 4 below to prepare a coating composition having a solid content of 13% by mass. The addition amounts of the respective components in Table 4 below represent "parts by mass". The inorganic fine particles of the component (B) are in parts by mass of the solid content excluding the solvent.

TABLE 4

| | Component A | | Component B | | Component C | | |
|---|---|---|---|---|---|---|---|
| | Type | Addition amount | Type | Addition amount | Type | Addition amount | Component D Type |
| Comp-1 | IPF-1 | 2.0 | MEK-ST-L | 2.0 | DPHA | 60 | MEK/PGME/cyclohexanone = 90/5/5 |
| Comp-2 | IPF-2 | 2.0 | MEK-ST-L | 2.0 | DPHA | 60 | MEK/PGME/cyclohexanone = 90/5/5 |
| Comp-3 | IPF-3 | 2.0 | MEK-ST-L | 2.0 | DPHA | 60 | MEK/PGME/cyclohexanone = 90/5/5 |
| Comp-4 | IPF-4 | 2.0 | MEK-ST-L | 2.0 | DPHA | 60 | MEK/PGME/cyclohexanone = 90/5/5 |
| Comp-5 | IPF-9 | 2.0 | MEK-ST-L | 2.0 | DPHA | 60 | MEK/PGME/cyclohexanone = 90/5/5 |
| Comp-6 | IPF-21 | 2.0 | MEK-ST-L | 2.0 | DPHA | 60 | MEK/PGME/cyclohexanone = 90/5/5 |
| Comp-7 | IPF-29 | 2.0 | MEK-ST-L | 2.0 | DPHA | 60 | MEK/PGME/cyclohexanone = 90/5/5 |
| Comp-8 | P-1 | 2.0 | MEK-ST-L | 2.0 | DPHA | 60 | MEK/PGME/cyclohexanone = 90/5/5 |
| Comp-9 | Comparative A-1 | 2.0 | MEK-ST-L | 2.0 | DPHA | 60 | MEK/PGME/cyclohexanone = 90/5/5 |
| Comp-10 | IPF-1 | 2.0 | S-1 | 2.0 | DPHA | 60 | MEK/PGME/cyclohexanone = 90/5/5 |

TABLE 4-continued

| | | | | | | | |
|---|---|---|---|---|---|---|---|
| Comp-11 | IPF-2 | 2.0 | S-1 | 2.0 | DPHA | 60 | MEK/PGME/cyclohexanone = 90/5/5 |
| Comp-12 | IPF-3 | 2.0 | S-1 | 2.0 | DPHA | 60 | MEK/PGME/cyclohexanone = 90/5/5 |
| Comp-13 | IPF-11 | 2.0 | S-1 | 2.0 | DPHA | 60 | MEK/PGME/cyclohexanone = 90/5/5 |
| Comp-14 | | | S-1 | 2.0 | DPHA | 60 | MEK/PGME/cyclohexanone = 90/5/5 |
| Comp-15 | IPF-1 | 2.0 | S-2 | 2.0 | DPHA | 60 | MEK/PGME/cyclohexanone = 90/5/5 |
| Comp-16 | IPF-2 | 2.0 | S-2 | 2.0 | DPHA | 60 | MEK/PGME/cyclohexanone = 90/5/5 |
| Comp-17 | IPF-3 | 2.0 | S-2 | 2.0 | DPHA | 60 | MEK/PGME/cyclohexanone = 90/5/5 |
| Comp-18 | IPF-3 | 2.0 | S-3 | 2.0 | DPHA | 60 | MEK/PGME/cyclohexanone = 90/5/5 |
| Comp-19 | IPF-3 | 2.0 | S-4 | 2.0 | DPHA | 60 | MEK/PGME/cyclohexanone = 90/5/5 |
| Comp-20 | IPF-3 | 1.0 | S-1 | 2.0 | DPHA | 60 | MEK/PGME/cyclohexanone = 90/5/5 |
| Comp-21 | IPF-3 | 1.0 | S-1 | 2.0 | DPHA | 60 | MEK/PGME/cyclohexanone = 90/5/5 |
| Comp-22 | IPF-3 | 1.0 | S-1 | 2.0 | DPHA | 60 | MEK/PGME/cyclohexanone = 90/5/5 |
| Comp-23 | IPF-2 | 1.0 | S-1 | 2.0 | DPHA | 60 | MEK/PGME/cyclohexanone = 90/5/5 |
| Comp-24 | IPF-2 | 1.0 | S-1 | 2.0 | DPHA | 60 | MEK/PGME/cyclohexanone = 90/5/5 |
| Comp-25 | IPF-4 | 2.0 | S-1 | 2.0 | DPHA | 60 | MEK/PGME/cyclohexanone = 90/5/5 |
| Comp-26 | IPF-4 | 2.0 | S-1 | 2.0 | DPHA/TMPTA = 60/40 | 60 | MEK/PGME/cyclohexanone = 90/5/5 |
| Comp-27 | IPF-4 | 2.0 | S-1 | 2.0 | DPHA/TMPTA = 30/70 | 60 | MEK/PGME/cyclohexanone = 90/5/5 |
| Comp-28 | IPF-4 | 2.0 | S-1 | 2.0 | DPHA | 60 | MEK |
| Comp-29 | IPF-4 | 2.0 | S-1 | 2.0 | DPHA | 60 | Cyclohexanone |
| Comp-30 | IPF-4 | 2.0 | S-1 | 2.0 | DPHA | 60 | MEK/cyclohexanone = 80/20 |
| Ln-1 | | | MEK-ST-L | 2.0 | | | MEK/PGME/cyclohexanone = 90/5/5 |
| Ln-2 | | | S-1 | 2.0 | | | MEK/PGME/cyclohexanone = 90/5/5 |
| HC-1 | | | | | DPHA | 60 | MEK/PGME/cyclohexanone = 90/5/5 |

| | Component E | | Initiator | | | |
|---|---|---|---|---|---|---|
| | Type | Addition amount | Type | Addition amount | ΔG | Note |
| Comp-1 | | | Irg.127 | 2.0 | 0.034 | The present invention |
| Comp-2 | | | Irg.127 | 2.0 | 0.026 | The present invention |
| Comp-3 | | | Irg.127 | 2.0 | 0.022 | The present invention |
| Comp-4 | | | Irg.127 | 2.0 | 0.021 | The present invention |
| Comp-5 | | | Irg.127 | 2.0 | 0.010 | The present invention |
| Comp-6 | | | Irg.127 | 2.0 | 0.043 | The present invention |
| Comp-7 | | | Irg.127 | 2.0 | 0.010 | The present invention |
| Comp-8 | | | Irg.127 | 2.0 | 0.006 | Comp. Ex. |
| Comp-9 | | | Irg.127 | 2.0 | −0.007 | Comp. Ex. |
| Comp-10 | | | Irg.127 | 2.0 | 0.034 | The present invention |
| Comp-11 | | | Irg.127 | 2.0 | 0.026 | The present invention |
| Comp-12 | | | Irg.127 | 2.0 | 0.022 | The present invention |
| Comp-13 | | | Irg.127 | 2.0 | 0.005 | The present invention |
| Comp-14 | P-14 | 2.0 | Irg.127 | 2.0 | | Comp. Ex. |
| Comp-15 | | | Irg.127 | 2.0 | 0.034 | The present invention |

TABLE 4-continued

| | | | | | | |
|---|---|---|---|---|---|---|
| Comp-16 | | | Irg.127 | 2.0 | 0.026 | The present invention |
| Comp-17 | | | Irg.127 | 2.0 | 0.022 | The present invention |
| Comp-18 | | | Irg.127 | 2.0 | 0.022 | The present invention |
| Comp-19 | | | Irg.127 | 2.0 | 0.022 | Comp. Ex. |
| Comp-20 | P-3 | 1.0 | Irg.127 | 2.0 | 0.022 | The present invention |
| Comp-21 | F-49 | 1.0 | Irg.127 | 2.0 | 0.022 | The present invention |
| Comp-22 | P-3/F-49 = 1/1 | 1.0 | Irg.127 | 2.0 | 0.022 | The present invention |
| Comp-23 | P-3 | 1.0 | Irg.127 | 2.0 | 0.026 | The present invention |
| Comp-24 | P-3/PE-3ARf = 1/1 | 1.0 | Irg.127 | 2.0 | 0.026 | The present invention |
| Comp-25 | | | Irg.127 | 2.0 | 0.021 | The present invention |
| Comp-26 | | | Irg.127 | 2.0 | 0.020 | The present invention |
| Comp-27 | | | Irg.127 | 2.0 | 0.019 | The present invention |
| Comp-28 | | | Irg.127 | 2.0 | 0.021 | The present invention |
| Comp-29 | | | Irg.127 | 2.0 | 0.021 | The present invention |
| Comp-30 | | | Irg.127 | 2.0 | 0.021 | The present invention |
| Ln-1 | P-14 | 2.0 | Irg.127 | 0.06 | | Comp. Ex. |
| Ln-2 | P-14 | 2.0 | Irg.127 | 0.06 | | Comp. Ex. |
| HC-1 | | | Irg.127 | 2.0 | | Comp. Ex. |

The compounds used above are shown below:
DPHA: Mixture of dipentaerythritol pentaacrylate and dipentaerythritol hexaacrylate (manufactured by Nippon Kayaku Co., Ltd.)
TMPTA: trimethylolpropane triacrylate (manufactured by Daicel-Cytec Company Ltd.)
PE-3ARf: Triacryloylheptadecafluorononenyl pentaerythritol (manufactured by Kyoeisha Chemical Co., Ltd.)
IRGACURE 127 (Irg. 127): Photopolymerization initiator [manufactured by Ciba Specialty Chemicals Inc.]
MEK-ST-L: Silica dispersion having an average particle size of about 45 nm, solvent MEK (manufactured by Nissan Chemical Industries, Ltd.) refractive index of silica particles = 1.45, trimethylsilyl groups detected on the surface (a molecular weight as defined herein of 90).
Comparative A-1: Compound having a polyalkylene oxide group including no fluorine-containing hydrocarbon structure (in (IPF-2), polymer having a structure unit derived from an HFP monomer substituted with a structure unit derived from an EVE monomer, and a mass average molecular weight of 25,000)
P-1, P-3, and P-14: Exemplary compound of a fluorine-containing polymer as a component (E) (including no polyalkylene oxide group in the molecule)
F-49: Exemplary compound of a fluorine-containing polymer as a component (E) (including no polyalkylene oxide group in the molecule)

[Formation of Laminate]

On the undercoat layer of the base material TAC-1 as described above, the coating composition Comp-1 was coated by a die coater under the condition of a transportation speed of 30 m/min, and dried at 60° C. for 150 seconds, and the coated layer was cured by irradiation with ultraviolet rays at an illuminance of 400 mW/cm$^2$ and an irradiation dose of 400 mJ/cm$^2$ using an air-cooled metal halide lamp (manufactured by Eye Graphics Co., Ltd.) in which output power is 160 W/cm while purging the system with nitrogen (oxygen concentration of 0.1% or less), thereby forming a laminate (antireflection film) 101 having a film thickness after curing of 1.6 µm. In the same manner as with the other coating compositions in Table above (Comp-2 to Comp-30), laminates 102 to 130 were prepared. At this time, the coating amount was controlled in the range of 40%±10% such that the minimum wavelength of the reflectance was in the range of 520 to 560 nm in the measurement of reflectance as described later.

Furthermore, as a comparative laminate, on TAC-1 as a base material, a coating liquid (HC-1) for a hard coat layer was coated by a die coater under the condition of a transportation speed of 30 m/min, and dried at 60° C. for 150 seconds, and the coated layer was cured by irradiation with ultraviolet rays at an illuminance of 400 mW/cm$^2$ and an irradiation dose of 400 mJ/cm$^2$ using an air-cooled metal halide lamp (manufactured by Eye Graphics Co., Ltd.) in which output power is 160 W/cm while purging the system with nitrogen (oxygen concentration of 0.1% or less), thereby forming a hard coat layer having a film thickness after curing of 1.5 µm. A coating liquid of a low refractive index layer, Ln-1, was coated thereon under the condition of a transportation speed of 30 m/min, and dried at 60° C. for 150 seconds, and the coated layer was cured by irradiation with ultraviolet rays at an illuminance of 400 mW/cm$^2$ and an irradiation dose of 400 mJ/cm$^2$ using an air-cooled metal halide lamp (manufactured by Eye Graphics Co., Ltd.) in which output power is 160 W/cm while purging the system with nitrogen (oxygen concentration of 0.1% or less), thereby forming a comparative laminate 131 having a film thickness after curing of 95 nm. Further, in the comparative laminate 131, a sample 132 obtained by changing the coating liquid for a low refractive index layer to Ln-2 was prepared.

[Evaluation of Laminates]

For the obtained laminates (antireflection films), evaluation and measurement for the following items were carried out.

[Uneven Distribution of Particles]

The antireflection film sample after curing was cut perpendicular to the thickness direction and its cross-section was observed by a transmission electron microscope, the cross-sectional image was observed in a width direction of 5 µm, and the existence state of the inorganic fine particles were evaluated in five steps below:

A: The inorganic fine particle-containing layer is distributed unevenly in the upper part (on the surface side opposite to the support during curing) with the state of uneven thickness of less than 5%.

B: The inorganic fine particle-containing layer is distributed unevenly in the upper part (on the surface side opposite to the support) with the state of uneven thickness from 5% to less than 10%.

C: The inorganic fine particle-containing layer is distributed unevenly in the upper part (on the surface side opposite to the support) with the state of uneven thickness from 10% to less than 30%, and some of the inorganic fine particles are present in the lower layer.

D: The state in which the thickness of the inorganic fine particle-containing layer is uneven is 30% or more, and the interface between the layer in which the inorganic fine particle-containing layer is distributed unevenly and the lower layer is unclear.

E: The state in which the thickness of the inorganic fine particle-containing layer is uneven is 50% or more, and the interface between the layer in which the inorganic fine particle-containing layer is distributed unevenly and the lower layer is unclear.

The uneven distribution of particles is required to be no lower than Level B.

Furthermore, the state in which the thickness is uneven refers to a ratio of a difference between the maximum thickness of the inorganic fine particle-containing layer and the minimum thickness of the inorganic fine particle-containing layer (thickness difference) relative to the maximum thickness of the inorganic fine particle-containing layer.

[Integral Reflectance]

The back face (support side) of the antireflection film sample was roughened with a sandpaper and then treated with a black ink, thereby putting the back face into a state of no back face reflection. In such a state, a spectral reflectance at an incident angle of 5° in a wavelength range of 380 to 780 nm was measured using a spectrophotometer (manufactured by JASCO Corp.). The mean average value of the integral reflectance in a wavelength range of 450 to 650 was used for the result.

The integral reflectance of the antireflection film sample is preferably 3.0% or less.

[Steel Wool Scratch Resistance]

A rubbing test was carried out using a rubbing tester under the conditions shown below:

Environmental conditions for evaluation: 25° C., 60% RH

Rubbing material: Steel wool (Grade No. 0000, manufactured by Nihon Steel Wool Co., Ltd.) was wound on the rubbing tip (1 cm×1 cm) of the tester which would come into contact with the sample and fixed with a band so as not to move.

Moving distance (one way): 13 cm, Rubbing speed: 13 cm/sec,

Load: 500 g/cm$^2$, Contact area of the tip: 1 cm×1 cm,

Number of times of rubbing: 10 reciprocations.

An oil-based black ink was applied to the rear side of the sample after the rubbing, and the scratch mark in the rubbed portion was visually observed with reflection light and evaluated according to the criteria shown below:

A: No scratch marks were found even when observed extremely carefully.

B: Slight weak scratch mark was found when observed extremely carefully.

C: Weak scratch mark was found.

D: Scratch marks of medium degree were found.

E: Scratch marks were found at a glance.

In the evaluation of the scratch resistance, the criteria of a level B or higher are of high practical value.

[Adhesion Properties]

The antireflection film sample was maintained under the conditions of 25° C. and 60 RH % for 2 hours to conduct humidity conditioning. The surface of the film sample on the low refractive index layer side was notched in a grid-like pattern with 11 vertical lines and 11 horizontal lines, thereby forming 100 squares in total. A polyester adhesive tape (No. 31B) manufactured by Nitto Denko Corp. was attached onto the surface of the film sample. After lapse of 30 minutes, the polyester adhesive tape was rapidly peeled off in the vertical direction from the film sample. A number of squares peeled off was counted on the film sample and evaluated according to the criteria of four steps below. The same procedures for evaluating the adhesion properties as described above were repeated three times and an average value thereof was determined A: No peeling off was recognized at all in the 100 squares.

B: Peeling off of one or two squares was recognized in the 100 squares.

C: Peeling off of 3 to 10 squares was recognized in the 100 squares (within an acceptable range).

D: Peeling off of 11 or more squares was recognized in the 100 squares.

[Method for Calculating Film Thickness]

The antireflection film sample after curing was cut perpendicular to the thickness direction and its cross-section was observed by a transmission electron microscope, and the thickness of a region where the inorganic fine particles as a component (B) were present at a concentration 1.5 times or more the average density of the entire layer (low refractive index layer) of the coating film formed from the coating composition was calculated. Further, the film thickness of the component derived from the high refractive index layer having the component (C) as a main component was calculated as a value obtained by subtracting the film thickness of the low refractive index layer from the total film thickness determined by means of a cross-sectional TEM. However, in the case where there was no low refractive index layer, the film thickness of a cured film was denoted as a film thickness of a high refractive index layer.

[Method for Calculating Free Energy of Mixing]

For the free energy of mixing ($\Delta G=\Delta H-T \cdot \Delta S$) of the component (A) and the component (C), a free energy of mixing ($\Delta G=\Delta H-T \cdot \Delta S$, $\Delta H$; enthalpy, $\Delta S$=entropy, T; absolute temperature) was determined using a lattice theory of Flory-Huggins, and calculated using a degree of polymerization and a volume fraction ($\phi$: also referred to a composition fraction in the document), and an interaction parameter ($\chi$) of the component (A) and the component (C).

[Method for Measuring Refractive Index of Low Refractive Index Layer and High Refractive Index Layer]

The refractive indices of the low refractive index layer and the high refractive index layer were determined by fitting a reflection spectrum obtained by a reflection spectroscopic film thickness meter FE3000 (manufactured by Otsuka Electronics Co., Ltd.) and a reflection spectrum calculated by a multilayer thin film optical model using a Fresnel coefficient.

The results above are shown in Table 5.

TABLE 5

| Sample No. | Base material | Coating composition | Uneven distribution of fine particles | Integral reflectivity | Low refractive index layer | | High refractive index layer | | Scratch resistance | Adhesion property | Note |
|---|---|---|---|---|---|---|---|---|---|---|---|
| | | | | | Refractive index | Film thickness (nm) | Refractive index | Film thickness (µm) | | | |
| 101 | TAC-1 | Comp-1 | B | 3.0% | 1.46 | 97 | 1.52 | 1.5 | C | B | The present invention |
| 102 | TAC-1 | Comp-2 | A | 2.6% | 1.45 | 94 | 1.52 | 1.5 | A | A | The present invention |
| 103 | TAC-1 | Comp-3 | A | 2.7% | 1.45 | 98 | 1.52 | 1.5 | A | A | The present invention |
| 104 | TAC-1 | Comp-4 | A | 2.6% | 1.45 | 95 | 1.53 | 1.5 | A | A | The present invention |
| 105 | TAC-1 | Comp-5 | B | 3.0% | 1.46 | 96 | 1.53 | 1.5 | A | A | The present invention |
| 106 | TAC-1 | Comp-6 | A | 2.6% | 1.45 | 93 | 1.53 | 1.5 | A | A | The present invention |
| 107 | TAC-1 | Comp-7 | B | 3.0% | 1.46 | 95 | 1.53 | 1.5 | A | A | The present invention |
| 108 | TAC-1 | Comp-8 | E | 3.9% | | | 1.51 | 1.6 | B | A | Comp. Ex. |
| 109 | TAC-1 | Comp-9 | E | 4.0% | | | 1.50 | 1.6 | A | A | Comp. Ex. |
| 110 | TAC-1 | Comp-10 | B | 1.6% | 1.38 | 98 | 1.52 | 1.5 | C | B | The present invention |
| 111 | TAC-1 | Comp-11 | B | 1.6% | 1.38 | 93 | 1.52 | 1.5 | B | A | The present invention |
| 112 | TAC-1 | Comp-12 | A | 1.3% | 1.36 | 95 | 1.53 | 1.5 | A | A | The present invention |
| 113 | TAC-1 | Comp-13 | B | 1.6% | 1.38 | 98 | 1.53 | 1.5 | C | B | The present invention |
| 114 | TAC-1 | Comp-14 | E | 3.5% | 1.47 | 95 | 1.50 | 1.5 | A | A | Comp. Ex. |
| 115 | TAC-1 | Comp-15 | B | 1.5% | 1.38 | 95 | 1.53 | 1.5 | B | B | The present invention |
| 116 | TAC-1 | Comp-16 | B | 1.5% | 1.37 | 95 | 1.53 | 1.5 | A | B | The present invention |
| 117 | TAC-1 | Comp-17 | A | 1.3% | 1.36 | 96 | 1.53 | 1.5 | A | B | The present invention |
| 118 | TAC-1 | Comp-18 | B | 1.6% | 1.38 | 96 | 1.53 | 1.5 | A | A | The present invention |
| 119 | TAC-1 | Comp-19 | C | 2.0% | 1.42 | 96 | 1.53 | 1.5 | B | B | Comp. Ex. |
| 120 | TAC-1 | Comp-20 | A | 1.3% | 1.36 | 94 | 1.53 | 1.5 | A | A | The present invention |
| 121 | TAC-1 | Comp-21 | A | 1.2% | 1.36 | 94 | 1.53 | 1.5 | A | A | The present invention |
| 122 | TAC-1 | Comp-22 | A | 1.3% | 1.36 | 95 | 1.53 | 1.5 | A | A | The present invention |
| 123 | TAC-1 | Comp-23 | A | 1.3% | 1.36 | 94 | 1.53 | 1.5 | A | A | The present invention |
| 124 | TAC-1 | Comp-24 | A | 1.3% | 1.36 | 94 | 1.53 | 1.5 | A | A | The present invention |
| 125 | TAC-1 | Comp-25 | A | 1.3% | 1.36 | 94 | 1.53 | 1.5 | A | A | The present invention |
| 126 | TAC-1 | Comp-26 | A | 1.3% | 1.36 | 95 | 1.53 | 1.5 | A | A | The present invention |
| 127 | TAC-1 | Comp-27 | B | 1.4% | 1.37 | 95 | 1.53 | 1.5 | A | A | The present invention |
| 128 | TAC-1 | Comp-28 | B | 1.4% | 1.38 | 92 | 1.53 | 1.5 | B | A | The present invention |
| 129 | TAC-1 | Comp-29 | B | 1.4% | 1.37 | 93 | 1.53 | 1.5 | A | A | The present invention |
| 130 | TAC-1 | Comp-30 | A | 1.3% | 1.36 | 95 | 1.53 | 1.5 | A | A | The present invention |
| 131 | TAC-1 | HC-1/Ln-1 | | 2.6% | 1.45 | 95 | 1.53 | 1.5 | A | C | Comp. Ex. |
| 132 | TAC-1 | HC-1/Ln-2 | | 1.3% | 1.36 | 95 | 1.53 | 1.5 | A | C | Comp. Ex. |

As seen from Table 5 above, for the samples 101 to 107, since the inorganic fine particle-containing layer is distributed unevenly in the upper part of the coating film by one-time coating, two layers having different compositions are formed simultaneously, the production efficiency is high, and as sequentially compared with the coating sample 129, excellent effects in which the uneven distribution of the inorganic fine particles is equivalent, the integral reflectivity is 3.0% or less, the scratch resistance is at a level B or higher, and the adhesion property is at a level B or higher can be obtained. Further, for the samples 101 to 107, since the polyalkylene oxide group-containing fluorine polymer is used in the component (A), as compared with the sample 108, excellent effects in which the uneven distribution of the particles is at a level B or higher, the integral reflectance is 3.0% or less, the scratch resistance is at a level B or higher, and the adhesion property is at a level B or higher can be obtained.

Furthermore, for the samples 101 to 107, since a compound having a fluorine-containing hydrocarbon structure is used in the component (A) of the present invention, excellent effects in which the surface energy of the component (A) can be lowered, the uneven distribution of the particles is at a level B or higher, the integral reflectance is 3.0% or less, the scratch resistance is at a level B or higher, and the adhesion property is at a level B or higher can be obtained (comparison with the sample 109; the sample 109 has no refractive index interface and is formed with uniform layers, and its reflectance is not substantially lowered).

For the samples 110 to 113, 115 to 118, by incorporating the hollow silica particles and the polyalkylene oxide group-containing fluorine polymer (A), the uneven distribution of hollow silica that are low refractive index materials can be B or higher, and as a result, excellent effects in which the integral reflectance is 1.7% or less, the scratch resistance is at a level B or higher, and the adhesion properties is at a level B or higher can be obtained (comparison with the samples 101, 102, 104, and 114).

For the samples 112, 117, and 118, by setting the molecular weight of the silane coupling agent of the component (B) in the present invention to 90 to 600, the dispersibility in an organic solvent is improved and by subjecting the component (B) to interaction with the component (A), excellent effects in which the uneven distribution of hollow silica is at a level B or higher, the integral reflectance is 1.5% or less, the scratch resistance is at a level A or higher, and the adhesion property is at a level B or higher can be obtained.

For the samples 120 to 124, by the use of the component (E) in combination, excellent effects in which the uneven distribution is at a level A, the integral reflectance is 1.3% or less, the scratch resistance is at a level A, and the adhesion property is at a level A, and further an effect of improvement of the surface state can be obtained (comparison with the sample 112).

The component (A) of the samples 125 to 127 and the component (C) having a mixing free energy of zero or more have improved separation of the binder from the fluorine polymer (A), and excellent effects in which the uneven distribution is at a level B or higher, the integral reflectance is 1.4% or less, the scratch resistance is at a level B or higher, and the adhesion property is at a level B or higher can be obtained.

With the use of solvents of MEK, PGME, and cyclohexanone of the samples 128 to 130 in combination, a poor solvent having an SP value difference of (about 4.5) from that of the component (A) improves the phase separation (PGME), and after the phase separation, the time until the diffusion movement of the inorganic fine particles end is obtained with a solvent having a boiling point higher than 100° C. (cyclohexanone), and fast-drying with a solvent having a boiling point of 100° C. or lower (MEK) in order to reduce the surface state defect, failure, or the like up to the concentration for phase separation between the component (A) and the inorganic fine particles (B). As a result, excellent effects in which the uneven distribution is at a level B or higher, the integral reflectance is 1.4% or less, the scratch resistance is at a level B or higher, and the adhesion property is at a level B or higher can be obtained.

Example 2

Preparation of Hollow Silica Particle Dispersion S-5

γ-Acryloyloxypropyl trimethoxysilane (a molecular weight as defined herein of 192) (20 parts by mass), 1.51 parts by mass of diisopropoxyaluminum ethyl acetate, and 500 parts by mass of methyl ethyl ketone were added to 500 parts by mass of a hollow silica fine particle sol A (isopropyl alcohol silica sol, average particle diameter 45 nm, silica concentration 20%, and silica particle refractive index 1.30), mixed, and then 3 parts by mass of ion exchange water was added thereto. This mixed liquid was reacted at 60° C. for 4 hours, and then cooled to room temperature, and 1.8 parts by mass of acetylacetone was added thereto to obtain a dispersion. Thereafter, while adding cyclohexanone thereto so as to maintain the content of silica to be substantially constant, solvent replacement was carried out by distillation under reduced pressure at a pressure of 30 Torr, and finally, the concentration was adjusted to obtain a hollow silica particle dispersion S-5, which had been surface-modified with a silane coupling agent having a polymerizable functional group with a solid content concentration of 20%. The surface modification rate α (T/Q) of the obtained hollow silica S-5 was 6.6%.

[Preparation of Hollow Silica Particle Dispersion S-6]

γ-Acryloyloxypropyl trimethoxysilane (a molecular weight as defined herein of 192) (20 parts by mass), 1.51 parts by mass of diisopropoxyaluminum ethyl acetate, and 500 parts by mass of methyl ethyl ketone were added to 500 parts by mass of a hollow silica fine particle sol A (isopropyl alcohol silica sol, average particle diameter 45 nm, silica concentration 20%, and silica particle refractive index 1.30), mixed, and then 3 parts by mass of ion exchange water was added thereto. This mixed liquid was reacted at 60° C. for 12 hours, and then cooled to room temperature, and 1.8 parts by mass of acetylacetone was added thereto to obtain a dispersion. Thereafter, while adding cyclohexanone thereto so as to maintain the content of silica to be substantially constant, solvent replacement was carried out by distillation under reduced pressure at a pressure of 30 Torr, and finally, the concentration was adjusted to obtain a hollow silica particle dispersion S-6, which had been surface-modified with a silane coupling agent having a polymerizable functional group with a solid content concentration of 20%. The surface modification rate α (T/Q) of the obtained hollow silica S-6 was 9.0%.

[Preparation of Hollow Silica Particle Dispersion S-7]

γ-Acryloyloxypropyl trimethoxysilane (a molecular weight as defined herein of 192) (5 parts by mass), 1.51 parts by mass of diisopropoxyaluminum ethyl acetate, and 500 parts by mass of methyl ethyl ketone were added to 500 parts by mass of a hollow silica fine particle sol A (isopropyl alcohol silica sol, average particle diameter 45 nm, silica concentration 20%, and silica particle refractive index 1.30), mixed, and then 3 parts by mass of ion exchange water was added thereto. This mixed liquid was reacted at 60° C. for 4 hours, and then cooled to room temperature, and 1.8 parts by mass of acetylacetone was added thereto to obtain a dispersion. Thereafter, while adding cyclohexanone thereto so as to maintain the content of silica to be substantially constant, solvent replacement was carried out by distillation under reduced pressure at a pressure of 30 Torr, and finally, the concentration was adjusted to obtain a hollow silica particle dispersion S-7, which had been surface-modified with a silane coupling agent having a polymerizable functional group with a solid content concentration of 20%. The surface modification rate α (T/Q) of the obtained hollow silica S-7 was 3.5%.

The respective components were mixed as in Table 6, and diluted in the solvent (component D) described in Table 6 below to obtain a coating composition having a solid content of 13% by mass.

TABLE 6

| | Component A | | Component B | | Component C | | Component D | Component E | | Initiator | | | |
|---|---|---|---|---|---|---|---|---|---|---|---|---|---|
| | Type | Addition amount | Type | Addition amount | Type | Addition amount | Type | Type | Addition amount | Type | Addition amount | ΔG | Note |
| Comp-201 | IPF-9 | 2.0 | S-2 | 2.0 | DPHA | 60 | MEK/PGME/cyclohexanone = 85/10/5 | | | Irg.127 | 2.0 | 0.010 | The present invention |
| Comp-202 | IPF-9 | 2.0 | S-5 | 2.0 | DPHA | 60 | MEK/PGME/cyclohexanone = 85/10/5 | | | Irg.127 | 2.0 | 0.010 | The present invention |
| Comp-203 | IPF-9 | 2.0 | S-6 | 2.0 | DPHA | 60 | MEK/PGME/cyclohexanone = 85/10/5 | | | Irg.127 | 2.0 | 0.010 | The present invention |
| Comp-204 | IPF-9 | 2.0 | S-7 | 2.0 | DPHA | 60 | MEK/PGME/cyclohexanone = 85/10/5 | | | Irg.127 | 2.0 | 0.010 | The present invention |
| Ln-3 | | | S-5 | 2.0 | | | MEK/PGME/cyclohexanone = 85/10/5 | P-14 | 2.0 | Irg.127 | 0.06 | | Comp. Ex. |
| HC-1 | | | | | DPHA | 60 | MEK/PGME/cyclohexanone = 85/10/5 | | | Irg.127 | 2.0 | | Comp. Ex. |

[Formation of Laminate]

On the undercoat layer of the base material TAC-1 as described above, the coating composition, Comp-201, was coated by a die coater under the condition of a transportation speed of 30 m/min, and dried at 60° C. for 150 seconds, and the coated layer was cured by irradiation with ultraviolet rays at an illuminance of 400 mW/cm² and an irradiation dose of 400 mJ/cm² using an air-cooled metal halide lamp (manufactured by Eye Graphics Co., Ltd.) in which output power is 160 W/cm while purging the system with nitrogen (oxygen concentration of 0.1% or less), thereby forming a laminate 201 having a film thickness after curing of 1.6 µm. With the other coating compositions in Table above (Comp-202, 203, and 204), laminates 202, 203, and 204 were also prepared in the same manner. At this time, the coating amount was controlled in the range of 40%±10% such that the minimum wavelength of the reflectance was in the range of 520 to 560 nm in the measurement of reflectance as described later. Further, in the same manner as for the comparative sample 131, a comparative sample 205 was prepared using HC-1 and Ln-3.

Regarding the antireflection laminate thus obtained, the results of the evaluation in accordance with Example 1, and the results from the evaluation as described below are shown in Table 7.

[Evaluation of Surface-Treated Silica by NMR (Surface Modification Rate)]

First, the dispersion of the respective inorganic fine particles was evaporated to dryness on a rotary evaporator at 25° C. Thereafter, the solid NMR was measured by the method as described above to determine the surface modification rate α (in the case of the present silane coupling agent, α2=T/Q).

1.8% or less, the scratch resistance is at a level C or higher, and the adhesion property is at a level B or higher can be obtained.

Example 3

Production of (Meth)Acrylic Resin Film

A pellet [a mixture of 90 parts by mass of a (meth)acryl-based resin having a lactone ring structure in which $R^1$ is a hydrogen atom and $R^2$ and $R^3$ are methyl groups in the following general formula (1A) {copolymerization monomer mass ratio=methyl methacrylate/2-(hydroxymethyl)methyl acrylate=8/2, lactone ring formation rate: about 100%, content ratio of the lactone ring structure: 19.4%, weight average molecular weight: 133,000, melt flow rate: 6.5 g/10 min (240° C., 10 kgf), Tg 131° C.} and 10 parts by mass of an acrylonitrile-styrene (AS) resin {Toyo-AS AS 20, manufactured by Toyo Styrene Co., Ltd.}; Tg 127° C.] was supplied to a biaxial extruder and melt-extruded in a sheet shape at about 280° C. to obtain a (meth)acryl-based resin sheet having a lactone ring structure with a thickness of 110 µm. The unstretched sheet was stretched longitudinally by 2.0 times and laterally by 2.4 times under a temperature condition of 160° C. to obtain a (meth)acryl-based resin film-1 (thickness: 40 µm, in-plane retardation Δnd: 0.8 nm, and thickness direction retardation Rth: 1.5 nm).

Furthermore, in the same manner as above, a (meth)acryl-based resin film-2 (thickness: 20 µm) and a (meth)acryl-based resin film-3 (thickness: 10 µm) were obtained.

TABLE 7

| Sample No. | Base material | Coating composition | Uneven distribution of fine particles | Integral reflectance | Low refractive index layer | | High refractive index layer | | Scratch resistance | Adhesion properties | Surface modification of inorganic fine particles | Note |
|---|---|---|---|---|---|---|---|---|---|---|---|---|
| | | | | | Refractive index | Film thickness (nm) | Refractive index | Film thickness (µm) | | | | |
| 201 | TAC-1 | Comp-201 | B | 1.6% | 1.38 | 98 | 1.53 | 1.5 | B | B | 0% | The present invention |
| 202 | TAC-1 | Comp-202 | A | 1.4% | 1.37 | 96 | 1.53 | 1.5 | A | A | 6.6% | The present invention |
| 203 | TAC-1 | Comp-203 | B | 1.8% | 1.39 | 92 | 1.52 | 1.5 | C | B | 9% | The present invention |
| 204 | TAC-1 | Comp-204 | A | 1.4% | 1.37 | 94 | 1.53 | 1.5 | A | A | 3.5% | The present invention |
| 205 | TAC-1 | HC-1/Ln-3 | | 1.3% | 1.36 | 95 | 1.53 | 1.5 | A | C | 6.6% | Comp. Ex. |

As seen from Table 7 above, for the samples 201 to 204, since the inorganic fine particle-containing layer is distributed unevenly in the upper part of the coating film by one-time coating, two layers having different compositions are formed simultaneously, the production efficiency is high, and when sequentially compared with the coating sample 205, excellent results in which the uneven distribution of the inorganic fine particles is at a level B or higher, the integral reflectance is (1A)

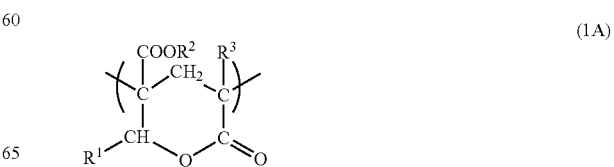

(Corona Discharge Treatment)

One side of the (meth)acryl-based resin film obtained as described above was subjected to a corona discharge treatment (corona discharge electron irradiation amount: 77 W/m²/min).

(Formation of Easy-Adhesion Layer)

16.8 g of polyester urethane (trade name: Superflex 210, solid content: 33%, manufactured by Dai-Ichi Kogyo Seiyaku Co., Ltd.), 4.2 g of a cross-linking agent (polymer including oxazoline, trade name: EPOCROS WS-700, solid content: 25%, manufactured by Nippon Shokubai Co., Ltd.), 2.0 g of 1% by mass ammonia water, 0.42 g of colloidal silica (Quotron PL-3, solid content: 20% by mass, manufactured by Fuso Chemical Co., Ltd.), and 76.6 g of pure water were mixed to obtain an easy-adhesive composition.

The obtained easy-adhesive composition was applied to the corona discharge treated surface of a (meth)acryl-based resin film that had been subjected to a corona discharge treatment with a bar coater (#6) so that the thickness of the easy-adhesive composition after being dried became 350 nm. Thereafter, the (meth)acryl-based resin film was placed in a hot air drier (140° C.) and the easy-adhesive composition was dried for about 5 minutes to form an easy-adhesion layer (0.3 to 0.5 µm).

condition of a transportation speed of 30 m/min, and dried at 60° C. for 150 seconds, and the coated layer was cured by irradiation with ultraviolet rays at an illuminance of 400 mW/cm² and an irradiation dose of 150 mJ/cm² using an air-cooled metal halide lamp (manufactured by Eye Graphics Co., Ltd.) in which output power is 160 W/cm while purging the system with nitrogen (oxygen concentration of 0.5% or less), thereby forming an undercoat layer having a film thickness after curing of 3 µm. The acryl-based resin films (Acryl-1, Acryl-2, and Acryl-3), to each of which the undercoat layer thus formed was attached, were taken as the base materials to be used for evaluation of the coating compositions as described later.

[Formation of Laminate]

On the undercoat layers of the base materials Acryl-1, Acryl-2, and Acryl-3 as described above, the coating compositions Comp-21, Comp-22, and Comp-23 were coated by a die coater under the condition of a transportation speed of 30 m/min, and dried at 60° C. for 150 seconds, and the coated layers were cured by irradiation with ultraviolet rays at an illuminance of 400 mW/cm² and an irradiation dose of 400 mJ/cm² using an air-cooled metal halide lamp (manufactured by Eye Graphics Co., Ltd.) in which output power is 160 W/cm while purging the system with nitrogen (oxygen concentration of 0.1% or less), thereby forming laminates 301 to 309 each having a film thickness after curing of 1.6 µm.

TABLE 8

| Material No. | Base material | Coating composition | Uneven distribution of fine articles | Integral reflectivity | Low refractive index layer | | High refractive index layer | | Scratch resistance | Adhesion property | Note |
| --- | --- | --- | --- | --- | --- | --- | --- | --- | --- | --- | --- |
| | | | | | Refractive index | Film thickness (nm) | Refractive index | Film thickness (µm) | | | |
| 301 | Acryl-1 | Comp-21 | A | 1.2% | 1.36 | 94 | 1.53 | 1.5 | A | A | The present invention |
| 302 | Acryl-1 | Comp-22 | A | 1.3% | 1.36 | 95 | 1.53 | 1.5 | A | A | The present invention |
| 303 | Acryl-1 | Comp-23 | A | 1.3% | 1.36 | 94 | 1.53 | 1.5 | A | A | The present invention |
| 304 | Acryl-2 | Comp-21 | A | 1.2% | 1.36 | 94 | 1.53 | 1.5 | A | A | The present invention |
| 305 | Acryl-2 | Comp-22 | A | 1.3% | 1.36 | 95 | 1.53 | 1.5 | A | A | The present invention |
| 306 | Acryl-2 | Comp-23 | A | 1.3% | 1.36 | 94 | 1.53 | 1.5 | A | A | The present invention |
| 307 | Acryl-3 | Comp-21 | A | 1.2% | 1.36 | 94 | 1.53 | 1.5 | A | A | The present invention |
| 308 | Acryl-3 | Comp-22 | A | 1.3% | 1.36 | 95 | 1.53 | 1.5 | A | A | The present invention |
| 309 | Acryl-3 | Comp-23 | A | 1.3% | 1.36 | 94 | 1.53 | 1.5 | A | A | The present invention |

[Preparation of Coating Liquid (Sub-2) for Undercoat Layer]

The respective components were mixed in the composition shown in the Table 3, the solid content concentration was adjusted to 40% by mass with a solvent of MEK (methyl ethyl ketone)/MIBK (methyl isobutyl ketone)=45/55 (mass ratio), and the mixture was filtered through a filter made from polypropylene having a pore size of 30 µm to prepare a coating liquid for an undercoat layer.

[Formation of Undercoat Layer]

On a (meth)acryl-based resin film-1 (thickness: 40 µm), a (meth)acryl-based resin film-2 (thickness: 20 µm), and a (meth)acryl-based resin film-3 (thickness: 10 µm) on the other face of the easy-adhesion layer, the coating liquid (Sub-2) for an undercoat layer was coated by a die coater under the From the results of Examples and Comparative Examples, it can be seen that the coating composition of the present invention can make the inorganic fine particles be distributed unevenly in the upper part of the coating film, and as a result, a layer containing inorganic fine particles and a layer containing no inorganic fine particles can be formed in a single coating step, and the productivity is high. In addition, the obtained laminate is an antireflection film having excellent scratch resistance and adhesion properties with low reflection.

What is claimed is:

1. A method for producing an antireflection film, comprising, in this order:
    a step of preparing a coating composition formed by mixing the following components (A) to (E);

a step of coating the coating composition on a base material to form a coating film;
a step of volatilizing the solvent from the coating film for drying the coating film; and
a step of curing the coating film to form a cured layer, wherein a multilayer structure having different refractive indices from the coating composition is formed:
(A) a fluorine-containing polymer having a polyalkylene oxide group in the molecule, represented by the following general formula (1);
(B) non-surface-modified inorganic fine particles, or inorganic fine particles that are surface-treated with a silane coupling agent having a molecular weight of 600 or less;
(C) a curable binder having no fluorine atom in the molecule;
(D) a solvent,
provided that the mass ratio of [component (A)+component (B)]/[component (C)] is from 1/199 to 60/40; and
(E) a curable compound having a fluorine atom in the molecule as a component, represented by the following general formula (3);

(MF1)a-(MF2)b-(MF3)c-(MA)d-(MB)e-(MC)f-(MD)g     General Formula (1)

wherein in the general formula (1), a to f each represent the molar fraction of each constituent unit, and g represents % by mass in the fluorine-containing polymer, representing values satisfying the relationships of $0 \le a \le 70$, $0 \le b \le 70$, $0 \le c \le 80$, $30 \le a+b+c \le 90$, $0 \le d \le 50$, $0 \le e \le 50$, $0.1 \le f \le 50$, and $0 \le g \le 15$, respectively;
(MF1) represents a constituent unit that is polymerized from a monomer represented by $CF_2=CF-Rf_1$. $Rf_1$ represents a perfluoroalkyl group having 1 to 5 carbon atoms;
(MF2) represents a constituent unit that is polymerized from a monomer represented by $CF_2=CF-ORf_{12}$. $Rf_{12}$ represents a fluorine-containing alkyl group having 1 to 30 carbon atoms;
(MF3) represents a constituent unit that is polymerized from a monomer represented by $CH_2=CRo-L-Rf_{13}$. $R_o$ represents a hydrogen atom, a halogen atom, or a methyl group, L represents a divalent linking group, and $Rf_{13}$ represents a fluorine-containing alkyl group having 1 to 20 carbon atoms;
(MA) represents a constituent unit having at least one of a group having an unsaturated double bond and a ring-opening polymerization reactive group;
(MB) represents a non-crosslinkable constituent unit;
(MC) represents a constituent unit that is polymerized from a monomer having at least one polyalkylene oxide group of the following general formula (2);

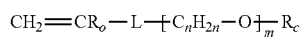     (2)

wherein in the general formula (2), $R_o$ represents a hydrogen atom, a halogen atom, or a methyl group, L represents a divalent linking group, $R_c$ represents a hydrogen atom or an alkyl group having 1 to 10 carbon atoms, m represents an integer of 2 to 50, and n represents an integer of 1 to 5 and when m is 2 or more, a plurality of $-(C_nH_{2n}-O)-$ may be repeating units that are different from each other; and
(MD) represents a constituent unit having at least one polysiloxane structure;

(MF1)a1-(MF2)b1-(MF3)c1-(MA')d1-(ME)h     General Formula (3)

wherein in the general formula (3), a1, b1, c1, d1, and h each represent the molar fraction of the respective constituents, representing values satisfying the relationships of $0 \le a1 \le 70$, $0 \le b1 \le 70$, $30 \le a1+b1 \le 70$, $0 \le c1 \le 50$, $5 \le d1 \le 50$, and $0 \le h \le 50$, respectively;
(MF1) represents a constituent unit that is polymerized from a monomer represented by $CF2=CF-Rf_1$, and $Rf_1$ represents a perfluoroalkyl group having 1 to 5 carbon atoms;
(MF2) represents a constituent unit that is polymerized from a monomer represented by $CF2=CF-ORf_{12}$, and $Rf_{12}$ represents a fluorine-containing alkyl group having 1 to 30 carbon atoms;
(MF3) represents a constituent unit that is polymerized from a monomer represented by $CH_2=CRo-L-Rf_{13}$, and Ro represents a hydrogen atom, a halogen atom, or a methyl group, L represents a divalent linking group, and $Rf_{13}$ represents a fluorine-containing alkyl group having 1 to 20 carbon atoms;
(MA') represents a constituent unit having at least one crosslinkable group; and
(ME) contains a polysiloxane structure.

2. The method for producing an antireflection film according to claim 1, wherein the component (B) is an inorganic fine particles that are surface-treated with a silane coupling agent and the silane coupling agent has a molecular weight of 90 to 600.

3. The method for producing an antireflection film according to claim 1, wherein the inorganic fine particles of the component (B) are metal oxide fine particles having a metal oxide with silicon as a constituent at least on the surface of particles.

4. The method for producing an antireflection film according to claim 3, wherein the component (B) is inorganic fine particles surface-treated with a silane coupling agent and the surface modification rate α thereof is from 0.1% to 9%.

5. The method for producing an antireflection film according to claim 1, wherein L in the general formula (2) is a divalent linking group having 1 to 9 carbon atoms.

6. The method for producing an antireflection film according to claim 1, wherein the component (A) contains a polymerizable functional group in the molecule.

7. The method for producing an antireflection film according to claim 1, wherein the inorganic fine particles of the component (B) are metal oxide fine particles having an average particle diameter of 1 to 150 nm and a refractive index of 1.46 or less.

8. The method for producing an antireflection film according to claim 1, wherein the curable binder of the component (C) contains a compound having at least a plurality of unsaturated double bonds in the molecule.

9. The method for producing an antireflection film according to claim 1, wherein the component (A) and the component (E) are both fluorine-containing copolymers and each of the copolymers has at least two kinds of common constituent units that form a copolymer.

10. The method for producing an antireflection film according to claim 1, wherein the free energy of mixing ($\Delta G = \Delta H - T \cdot \Delta S$) of the curable binder of the component (C) and the fluorine-containing polymer of the component (A) is more than zero.

11. The method for producing an antireflection film according to claim 1, wherein the mass ratio of [component (A)+component (B)+component (E)]/[component (C)] in the coating composition is from 1/199 to 60/40.

12. The method for producing an antireflection film according to claim 1, wherein the solvent of the component (D) contains a volatile solvent having a boiling point of higher than 100° C.

13. The method for producing an antireflection film according to claim 1, wherein the content of component (ME) in the general formula (3) is from 0.5% to 15% by mass in terms of a mass ratio with respect to the entire polymer.

14. The method for producing an antireflection film according to claim 13, wherein the content of component (ME) in the general formula (3) is from 1% to 10% by mass in terms of a mass ratio with respect to the entire polymer.

* * * * *